US007225447B2

(12) United States Patent
Tlaskal et al.

(10) Patent No.: US 7,225,447 B2
(45) Date of Patent: May 29, 2007

(54) METHOD OF HANDLING ASYNCHRONOUS EVENTS

(75) Inventors: Martin Paul Tlaskal, Elizabeth Bay (AU); David Geoffrey Slack-Smith, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 10/234,199

(22) Filed: Sep. 5, 2002

(65) Prior Publication Data

US 2003/0056024 A1 Mar. 20, 2003

(30) Foreign Application Priority Data

Sep. 6, 2001 (AU) .................................. PR7534

(51) Int. Cl.
*G06F 13/00* (2006.01)
(52) U.S. Cl. ............... 719/315; 719/316; 719/318; 719/332; 709/230
(58) Field of Classification Search ............... 719/351, 719/332, 310, 313, 315, 316, 330, 311, 318, 719/328, 331; 709/230
See application file for complete search history.

(56) References Cited

U.S. PATENT DOCUMENTS 5,442,793 A * 8/1995 Christian et al. ........... 719/315
6,516,355 B1 * 2/2003 Hartmann et al. .......... 719/317
6,553,427 B1 * 4/2003 Chang et al. ............... 719/314
6,618,765 B1 * 9/2003 Banctel et al. ............. 719/315
6,637,020 B1 * 10/2003 Hammond .................. 717/107
6,766,518 B1 * 7/2004 Bernstein et al. .......... 719/315
6,779,151 B2 * 8/2004 Cahill et al. ............... 715/503
6,976,262 B1 * 12/2005 Davis et al. ................ 719/328

FOREIGN PATENT DOCUMENTS

CA  2293114 A1  12/1999

* cited by examiner

*Primary Examiner*—William Thomson
*Assistant Examiner*—Andy Ho
(74) *Attorney, Agent, or Firm*—Fitzpatrick, Cella, Harper & Scinto

(57) ABSTRACT

A method (100) of connecting a first object to a second object is disclosed The first and second objects each comprise at least one associated interface defining a communication protocol for each of the objects. The method (100) examines the communications protocols associated with each of the interfaces of the first and second objects. The method (100) associates a first mapping pointing to the second object with the first object and associates a second mapping pointing to the first object with the second object, if the first and second objects use a compatible communications protocol and the interfaces associated with each of the first and second objects define different sides of the compatible communications protocol.

39 Claims, 37 Drawing Sheets

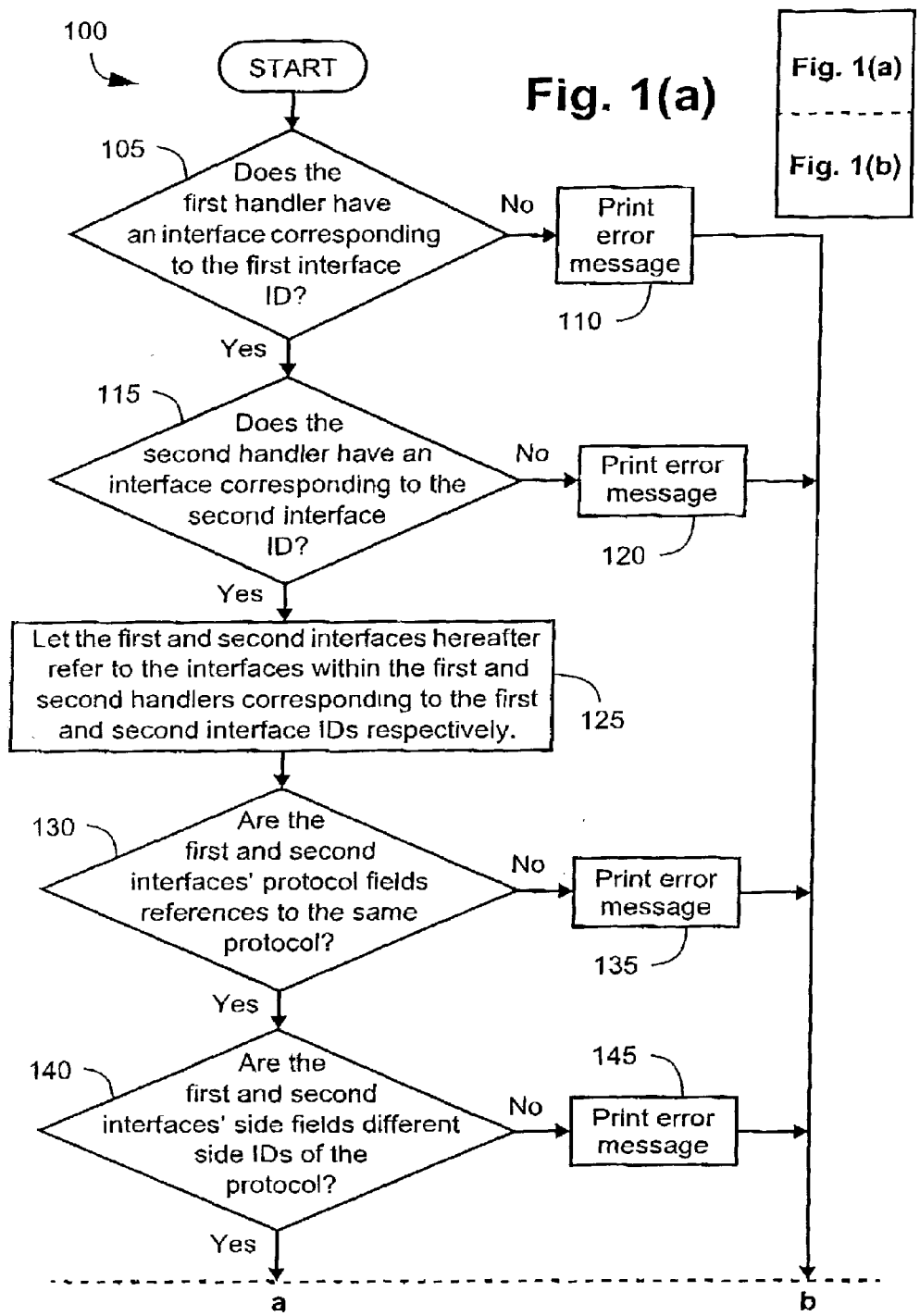

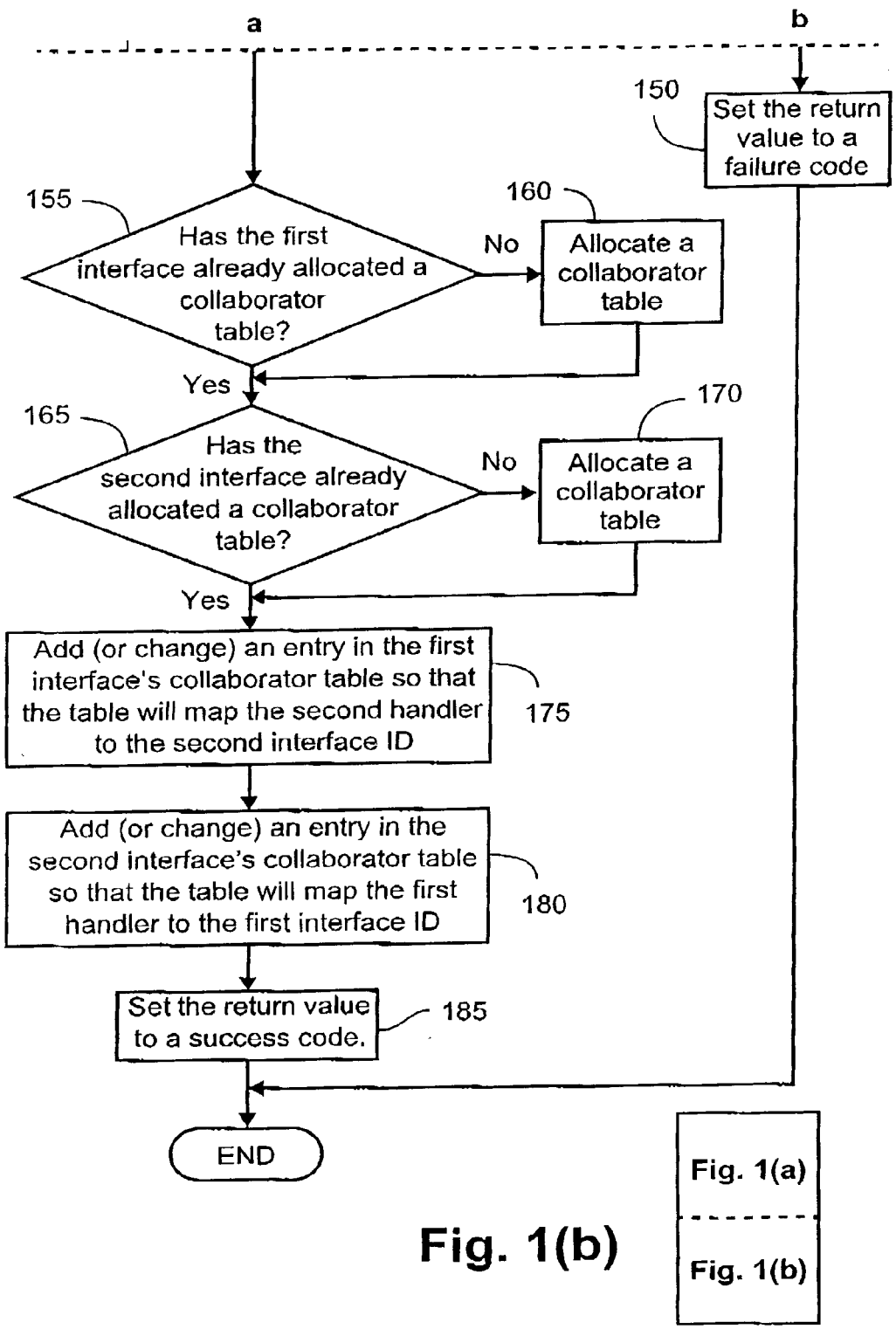

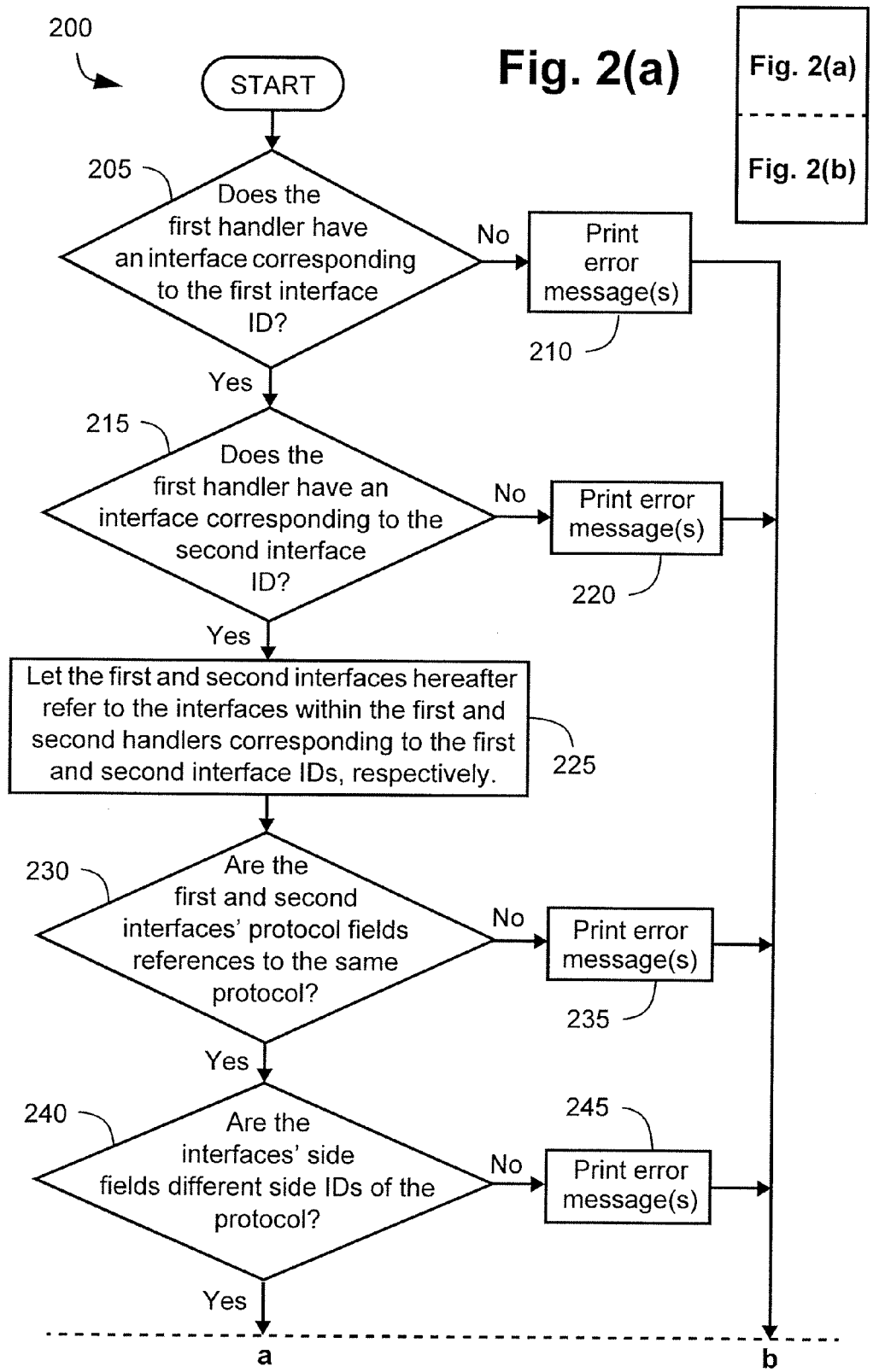

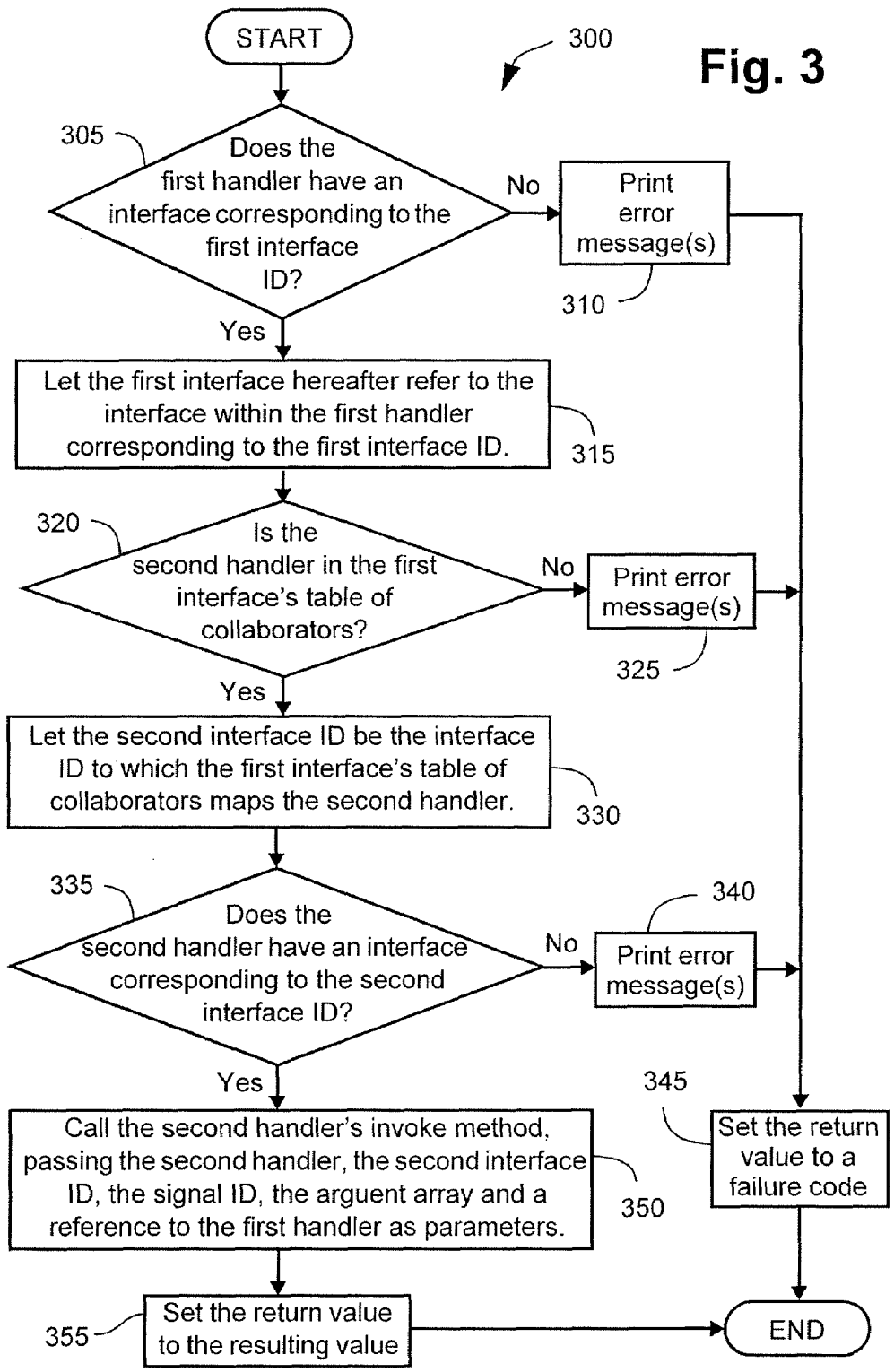

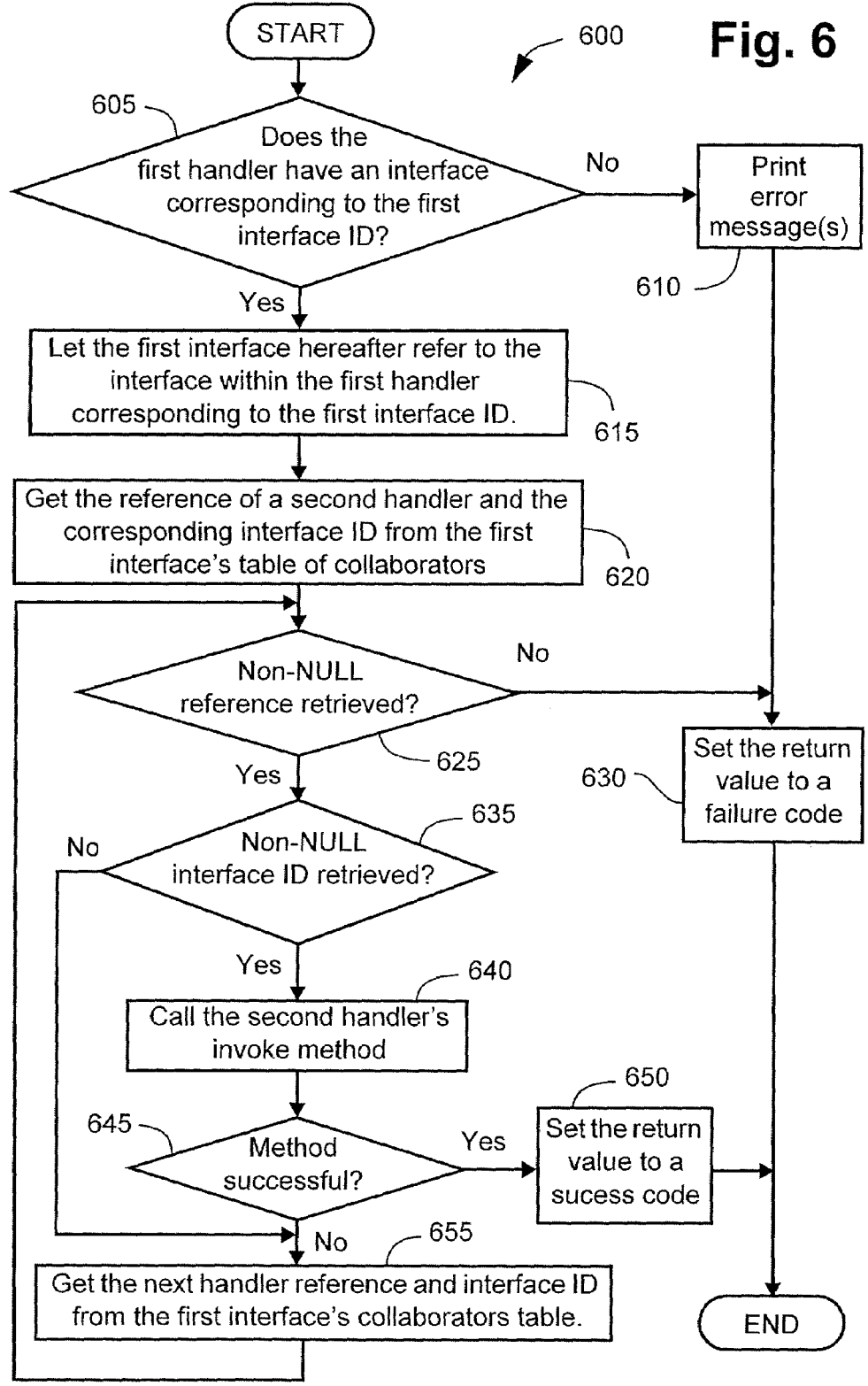

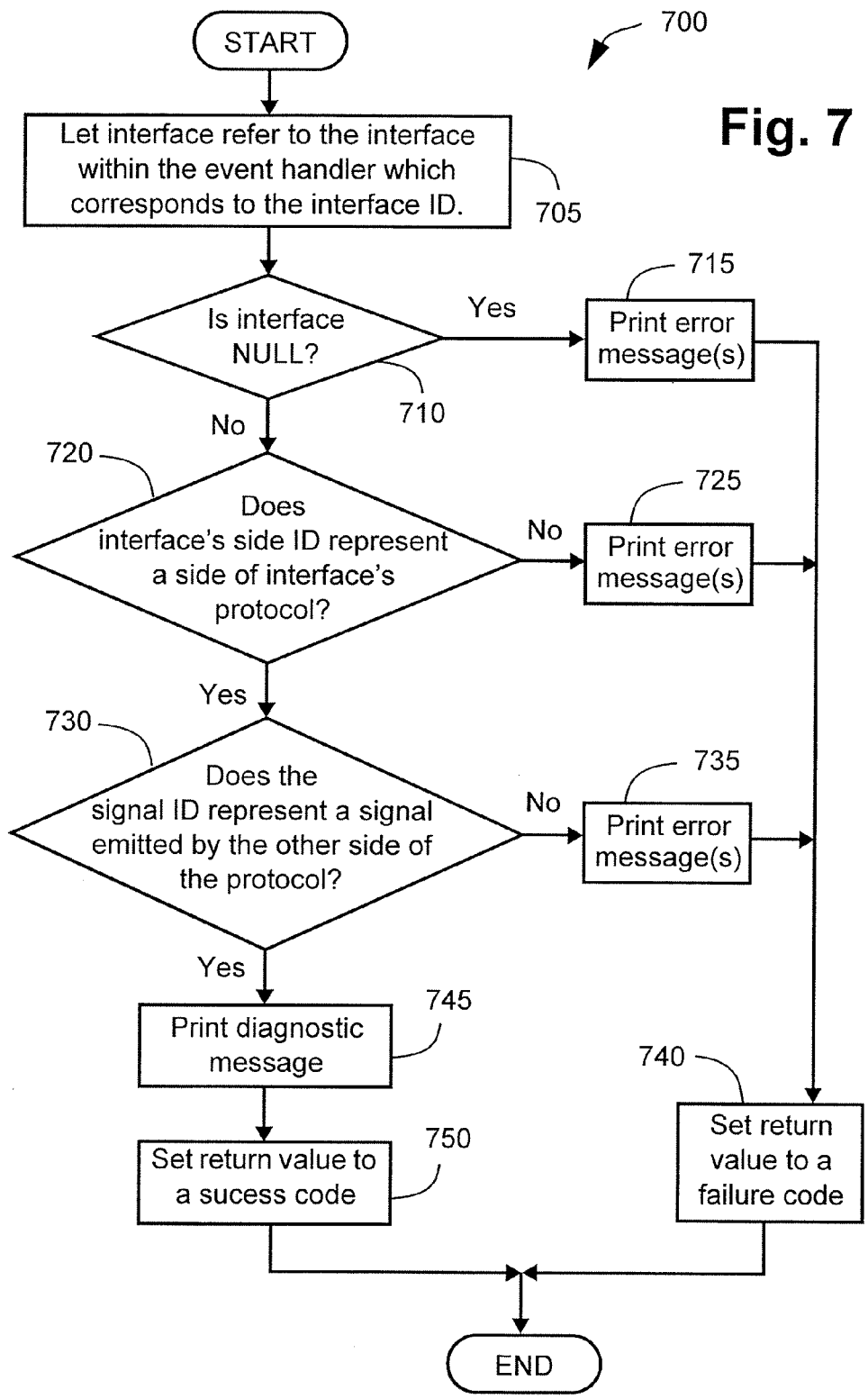

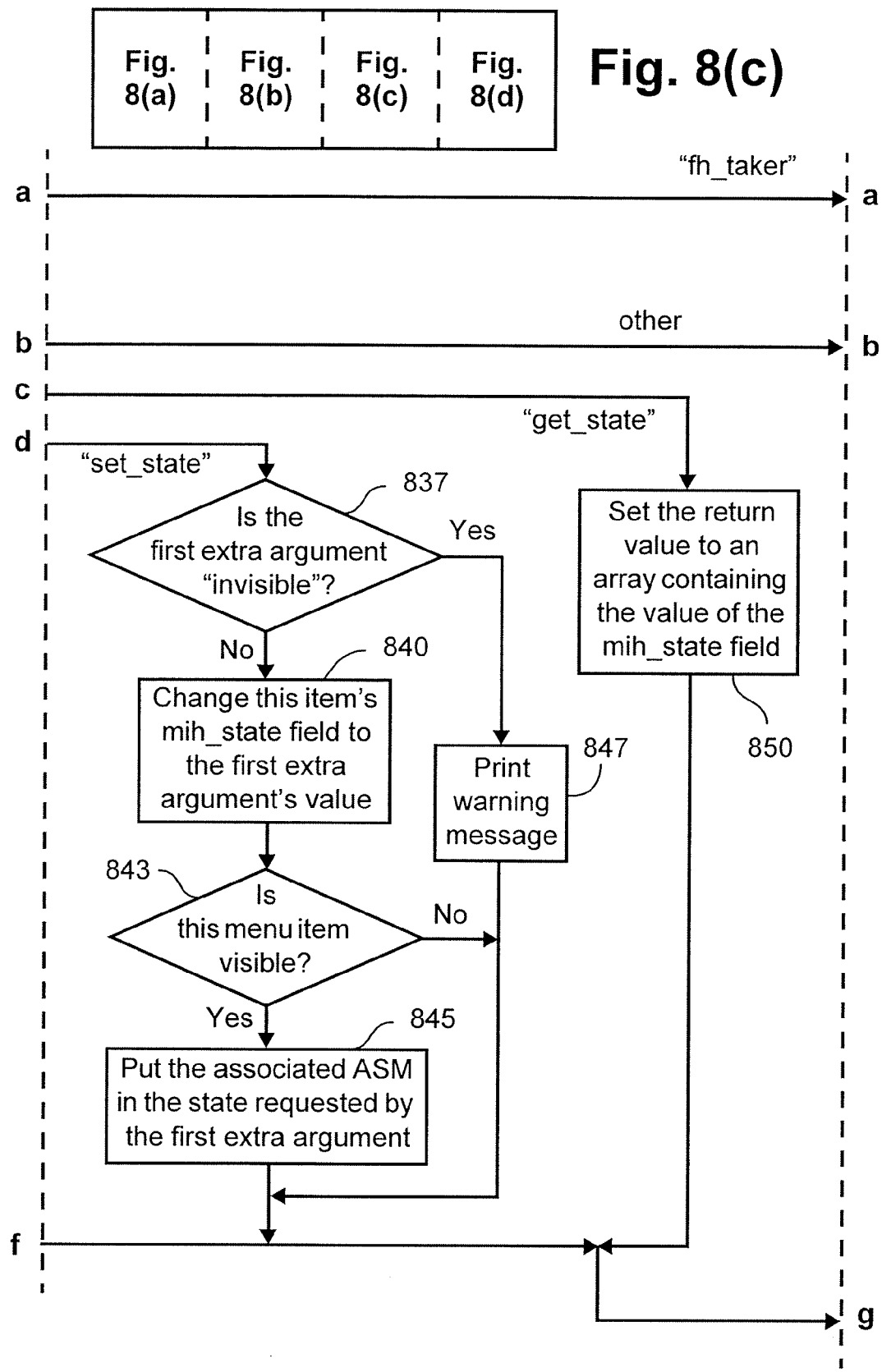

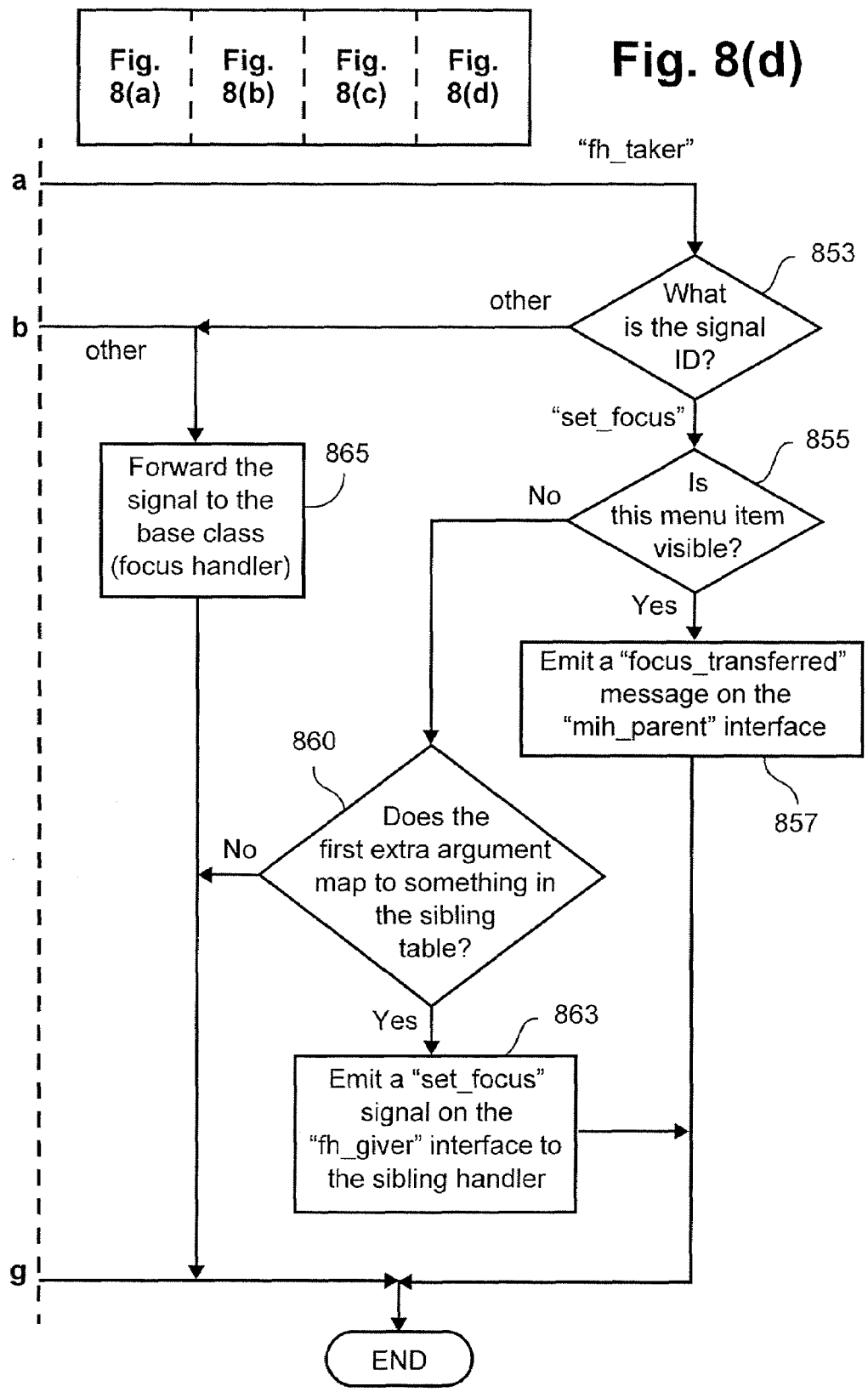

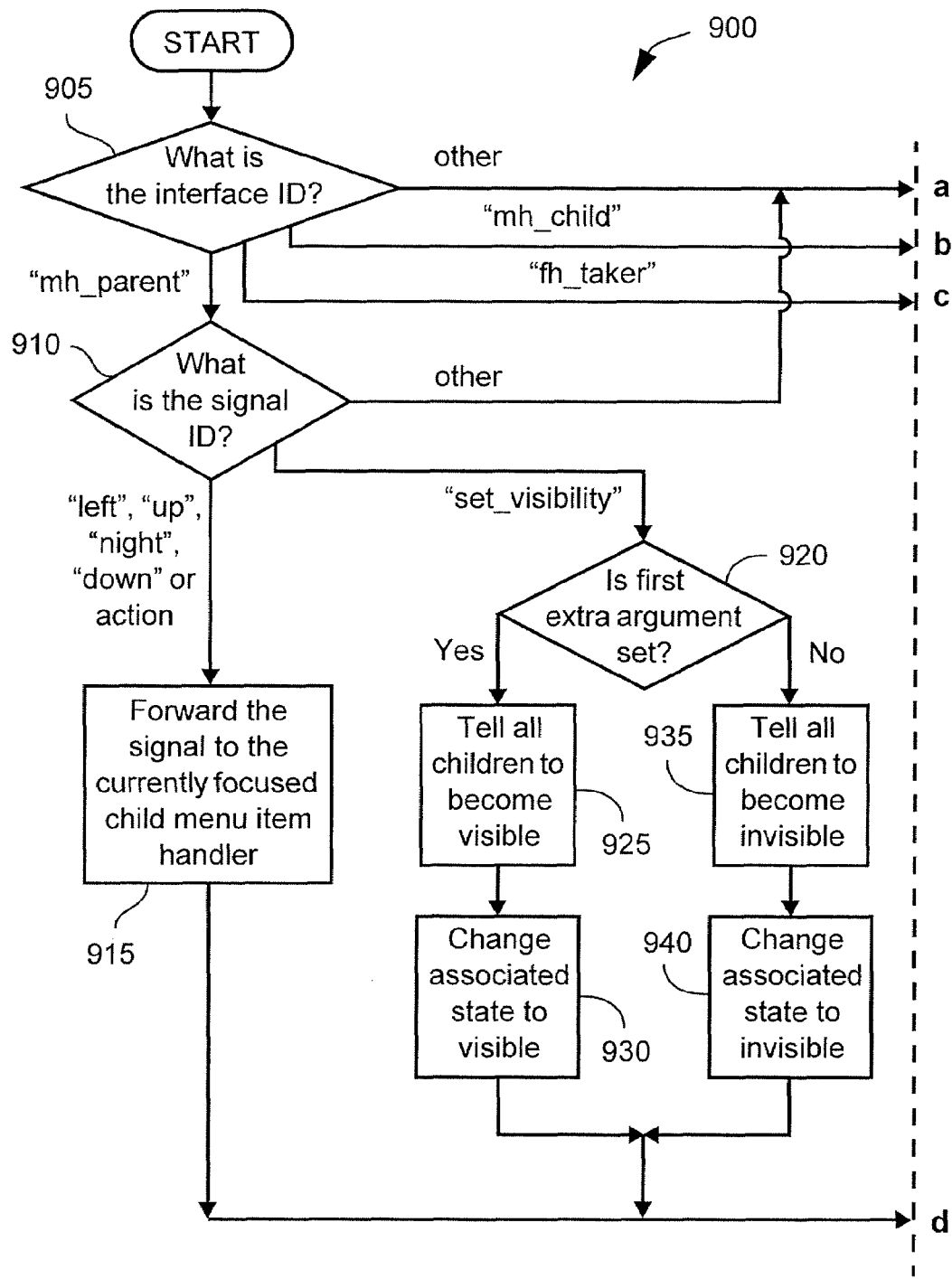
Fig. 9(a)
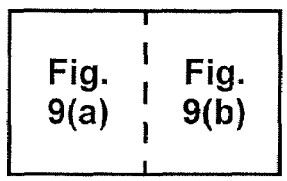

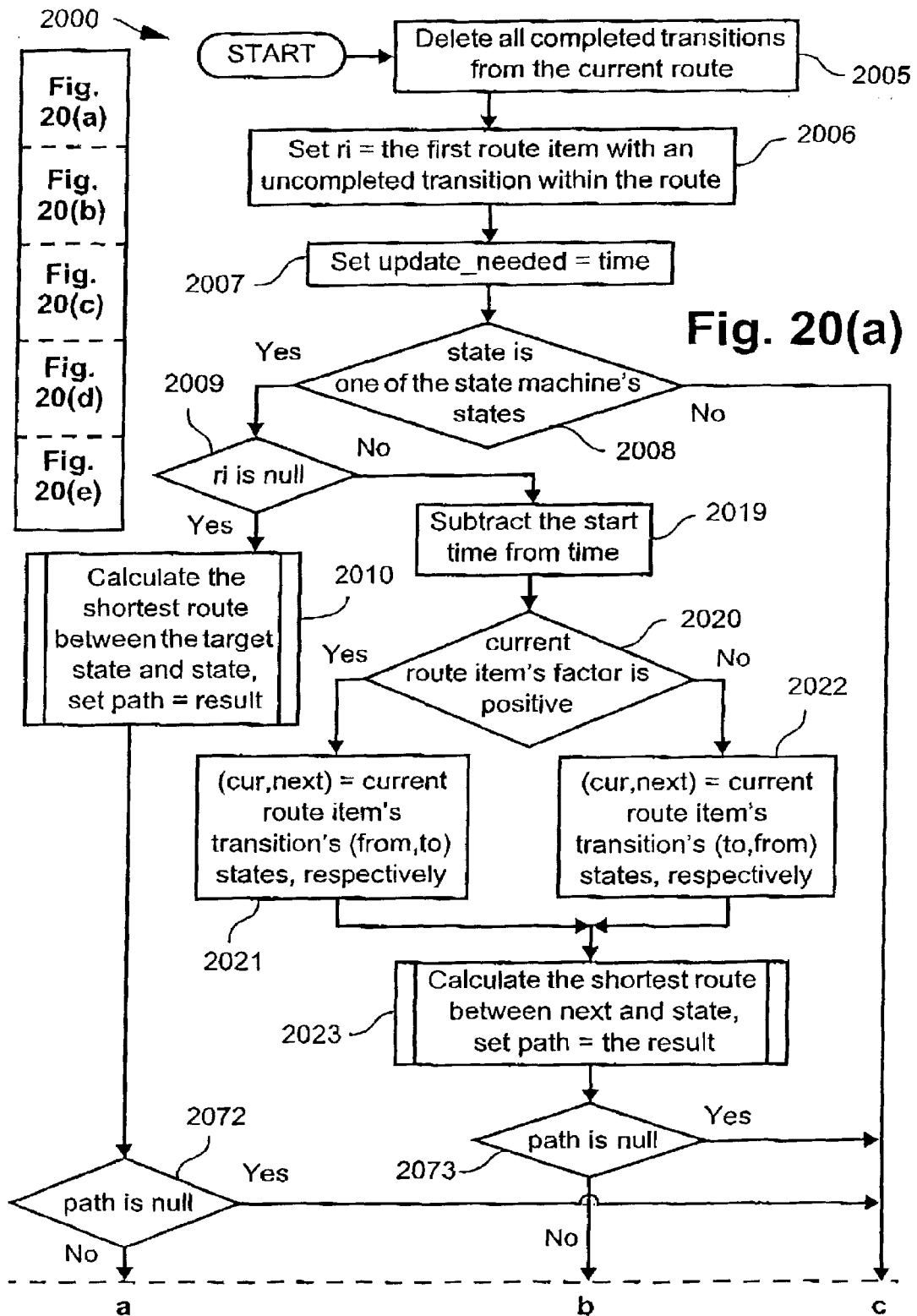

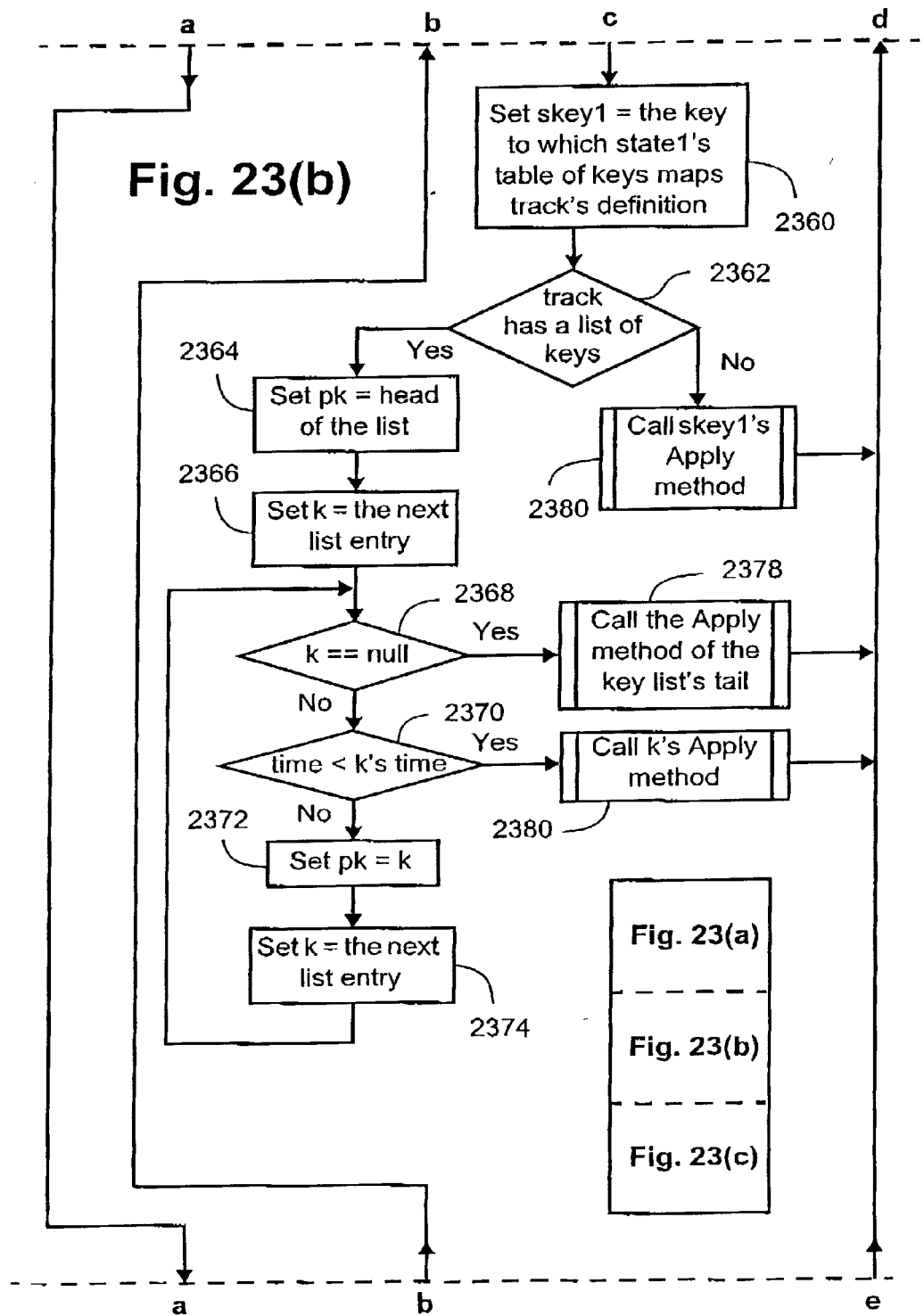

METHOD OF HANDLING ASYNCHRONOUS EVENTS

TECHNICAL FIELD OF THE INVENTION

The present invention relates generally to computer programming and, in particular, to the processing of asynchronous events by an application program. The present invention relates to a method and apparatus for connecting computing objects. The invention also relates to a computer program product including a computer readable medium having recorded thereon a computer program for connecting objects.

BACKGROUND ART

Before proceeding with a description of the background art, a brief review of terminology to be used throughout the following description is appropriate.

In an object oriented programming environment, such as Visual C++, the term "object" is used to refer to a computer software component comprising data structures, and procedures (often referred to as methods) for manipulating the data structures. Objects can communicate with one another by sending messages using some form of communications protocol. The procedures of a particular object can be activated by a message sent from another object, where the interior structure of each object is entirely hidden from any other object (a property referred to as encapsulation). Each object can have one or more associated interfaces which specify the communication between two objects. For example, each object can have its own private variables and if a procedure contained within a specific object does not refer to non-local variables then the interface of the object is defined by a parameter list contained within the object. Variables of an object store information but do not define how that information is processed.

Objects are derived from a template or type of object, and the collection of objects that are derived from a particular template are said to form a class. Each object in a class is referred to as an 'instance' of that class. A class definition defines the attributes (i.e. properties) of the objects within a particular class. Generally, the objects within a class are ordered in a hierarchical manner such that an object has a parent object (i.e. super-class) at the next higher level in the hierarchy and one or more child objects (i.e. sub-class) at the next lower level. An object is generally mapped to a parent object or a child object by means of a mapping table, often referred to as a sibling table, which is associated with the object.

As described above, each object can have various attributes associated with the object. Attributes can be local to that object, or can be inherited from the parent object. Inheritance is the term given to the manner in which characteristics of objects can be replicated and instantiated in other objects. Attributes of an object can also be inherited from a child object often without limit on the number of inheritances. The object from which all of the objects within the class are derived is referred to as the base class object.

Inheritance is both static by abstract data type and dynamic by instantiation and value. Inheritance rules define that which can be inherited and inheritance links define the parent and child of inheritance attributes.

Generally, an object has a permanent connection with a parent application program. However, some objects (e.g. embedded objects) have no permanent connection with a parent application. In this case, when the object is activated the parent application is generally launched. For example, a button object on a graphical user interface system, when activated, might cause a certain application program to execute in order to perform some function.

Many conventional computer graphical user interface systems, such as the Windows™ graphical user interface system, utilise objects to process asynchronous events such as a mouse click or a key-board press. These asynchronous events are most often generated by a peripheral device and as such, asynchronous events are generally referred to as external events. External events are generally processed by a graphical user interface system using one or more objects which are called by an application program. Some external events may require several different actions (e.g. activating a procedure, calculating a data value, determining the meaning of a key-board press, or the like) to be performed by an application program and as such, many application programs use a certain class of object called an event handler object to process external events. Each external event can be handled by a different event handler object which itself often generates internal events within an application program, and thus event handler objects are generally configured to communicate with one another. However, a certain type of external event (e.g. a mouse click) is generally handled by a certain instance of event handler object (e.g. a mouse event handler object).

Event handler objects communicate with one another by sending messages, as described above, using some form of communications protocol. It is advantageous if such a protocol is "flexible" in that compatibility between event handler objects is not restricted to objects of a certain class. Further, it is advantageous if the protocol is safe in that two or more event handler objects are able to communicate with each other.

Conventional communications protocols for facilitating communications between event handler objects have tended to be to restrictive in that compatibility between different event handler objects has been constrained to objects based upon their class. For example, one conventional graphical user interface system determines compatibility between event handler objects at the time that an application program is compiled by determining the class of each event handler object of the application program. This graphical user interface system requires that an object be a member of a predefined class and an object of one class cannot be connected to an object of a different class.

In addition, conventional protocols which have been pre-configured for flexibility have generally tended to be unsafe. For example, one known graphical user interface system allows objects of any class to be connected to each other. However, this operating system cannot guarantee that these connected objects will be compatible.

Finite state machines are commonly used to model graphical objects. Modelling graphical objects using finite state machines enables the separation of a graphical user interface associated with an object from the implementation of that object. Finite state machines provide a simple automation method where an input data string is read once from left to right looking at each symbol in turn. At any one time the finite state machine is in one of many internal states and the state changes after each symbol is read with the new state depending on the symbol just read and on the source state.

A finite state machine is determined by a state transition function $f$ as follows:

$$f: I \times Q \to Q$$

where I is the set of possible input symbols, Q is the set of states, and I×Q is the Cartesian product of I and Q. The function $f$ is generally represented either by a state transition table or by a state transition diagram.

Finite state machines can be used to model discrete controls which are commonly used on graphical user interfaces and which a user interacts with to drive a particular graphical user interface Interacting with a control often results in a change to the visual appearance of any graphical objects associated with the control. For example, a button represented on a graphical user interface using one or more graphical objects can be configured to glow when a mouse cursor moves over the button as well as to provide feedback when the button is selected by using a mouse in a conventional manner. More complicated controls such as list boxes can have a larger number of possible visual appearances.

Most conventional graphical user interface controls exhibit instantaneous changes to visual appearance. That is, as soon as a user interaction occurs (e.g. a mouse click), the control is immediately re-rendered to show a changed visual appearance. Unfortunately, the differences between the visual appearance before and after the user interaction is often significant. Thus, even when modelled using a finite state machine, the instantaneous change of visual appearance in a control often appears abrupt and unattractive.

SUMMARY OF THE INVENTION

It is an object of the present invention to substantially overcome, or at least ameliorate, one or more disadvantages of existing arrangements.

According to one aspect of the present invention there is provided a method of connecting a first object to a second object, said first and second objects each comprising at least one associated interface defining a communications protocol for each of said objects, said method comprising the steps of:

examining said communications protocols associated with each of the interfaces of said first and second objects; and associating a first mapping pointing to said second object with said first object and associating a second mapping pointing to said first object with said second object, if said first and second objects use a compatible communications protocol and said interfaces associated with each of said first and second objects define different sides of said compatible communications protocol.

According to another aspect of the present invention there is provided an apparatus for connecting a first object to a second object, said first and second objects each comprising at least one associated interface defining a communication protocol for each of said objects, said apparatus comprising:

examining means for examining said communications protocols associated with each of the interfaces of said first and second objects; and association means for associating a first mapping pointing to said second object with said first object and associating a second mapping pointing to said first object with said second object, if said first and second objects use a compatible communications protocol and said interfaces associated with each of said first and second objects define different sides of said compatible communications protocol.

According to still another aspect of the present invention there is provided an apparatus for connecting a first object to a second object, said first and second objects each comprising at least one associated interface defining a communication protocol for each of said objects, said apparatus comprising:

a memory for storing a program;

a processor for executing said program, said program comprising:

code for examining means for examining said communications protocols associated with each of the interfaces of said first and second objects; and code for association means for associating a first mapping pointing to said second object with said first object and associating a second mapping pointing to said first object with said second object, if said first and second objects use a compatible communications protocol and said interfaces associated with each of said first and second objects define different sides of said compatible communications protocol.

According to still another aspect of the present invention there is provided a computer program for connecting a first object to a second object, said first and second objects each comprising at least one associated interface defining a communication protocol for each of said objects, said program comprising:

code for examining said communications protocols associated with each of the interfaces of said first and second objects; and code for associating a first mapping pointing to said second object with said first object and associating a second mapping pointing to said first object with said second object, if said first and second objects use a compatible communications protocol and said interfaces associated with each of said first and second objects define different sides of said compatible communications protocol.

Other aspects of the invention are also disclosed.

BRIEF DESCRIPTION OF THE DRAWINGS

One or more arrangements of the present invention will now be described with reference to the drawings, in which:

FIG. 1, including FIGS. 1(a) and 1(b), is a flow diagram showing a method of connecting two event handler objects;

FIG. 2, including FIGS. 2(a) and 2(b), is a flow diagram showing a method of disconnecting two event handler objects;

FIG. 3 is a flow diagram showing a method of sending a message from a first event handler object to a single specified event handler object;

FIG. 6 is a schematic block diagram of a still further method of sending a message from a first event handler object to all event handler objects which are associated with an interface of the first event handler object;

FIG. 7 is a flow diagram showing a method of receiving a message from an associated event handler object;

FIG. 8, including FIGS. 8(a) through 8(d), is a flow diagram showing a further method of receiving a message from an associated event handler object;

DETAILED DESCRIPTION INCLUDING BEST MODE

Figure 2B:
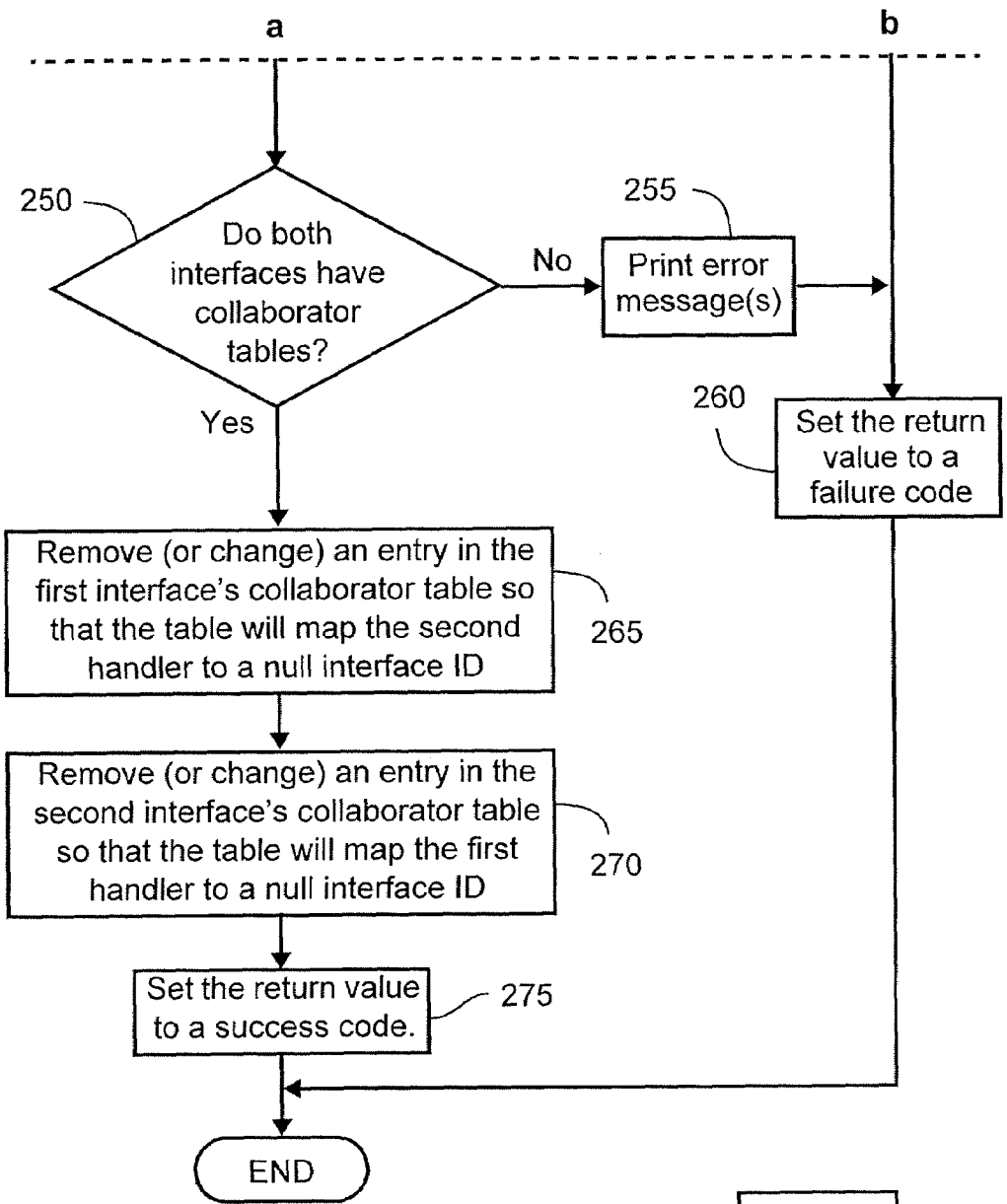

Where reference is made in any one or more of the accompanying drawings to steps and/or features, which have the same reference numerals, those steps and/or features have for the purposes of this description the same function(s) or operation(s), unless the contrary intention appears.

Some portions of the description which follows are explicitly or implicitly presented in terms of algorithms and symbolic representations of operations on data with a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

A method 100 of connecting two event handler objects (i.e. a first and second event handler object), is described below with reference to FIG. 1. Further, a method 200 of disconnecting two event handler objects (i.e a first and second event handler object), is described below with reference to FIG. 2. The methods 100 and 200 allow an event handler object to be dynamically connected and disconnected to an application program at the time at which the application program begins to execute (i.e. run time). The methods 100 and 200 also allow an existing event handler object to be replaced by a new event handler object, whether or not the objects are of the same class, provided that the new event handler object has interfaces which arc compatible with all protocols with which the existing event handler object is communicating.

The methods described hereinafter are preferably practiced using a general-purpose computer system 1100, such as that shown in FIG. 11 wherein the processes of the described methods may be implemented using software, such as an application program executing in conjunction with a host graphical user interface system within the computer system 1100. In particular, the steps of the methods described below with reference to FIGS. 1 to 10 and FIGS. 19 to 23 are effected by instructions in the software that are carried out by the computer. The instructions may be formed as one or more code modules, each for performing one or more particular tasks. The software may also be divided into two separate parts, in which a first part performs the methods described herein and a second part manages the host graphical user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for performing the methods described herein.

The computer system 1100 comprises a computer module 1101, input devices such as a keyboard 1102 and mouse 1103, output devices including a printer 1115 and a display device 1114. The display device 1114 can be used to display screens (i.e. one or more visible graphical object components or text) of the host graphical user interface. A Modulator-Demodulator (Modem) transceiver device 1116 is used by the computer module 1101 for communicating to and from a communications network 1120, for example connectable via a telephone line 1121 or other functional medium. The modem 1116 can be used to obtain access to the Internet, and other network systems, such as a Local Area Network (LAN) or a Wide Area Network (WAN).

The computer module 1101 typically includes at least one processor unit 1105, a memory unit 1106, for example formed from semiconductor random access memory (RAM) and read only memory (ROM), input/output (I/O) interfaces including a video interface 1107, and an I/O interface 1113 for the keyboard 1102 and mouse 1103 and optionally a joystick (not illustrated), and an interface 1108 for the modem 1116 A storage device 1109 is provided and typically includes a hard disk drive 1110 and a floppy disk drive 1111. A magnetic tape drive (not illustrated) may also be used. A CD-ROM drive 1112 is typically provided as a non-volatile source of data. The components 1105 to 1113 of the computer module 1101, typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations or alike computer systems evolved therefrom.

Typically, the application program is resident on the hard disk drive 1110, the software being read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still further, the software can also be loaded into the computer system 1100 from other computer readable media The term "computer readable medium" as used herein refers to any storage or transmission medium that participates in providing instructions and/or data to the computer system 1100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of transmission media include radio or infra-red transmission channels as well as a network connection to another computer or networked device, and the Internet or Intranets including email transmissions and information recorded on websites and the like.

The preferred host graphical user interface system for an application program implemented using the methods described hereinafter, is the Microsoft™ Windows graphical user interface system. However, it will be appreciated by a person skilled in the art that any suitable graphical user interface system can be used. An application program implemented using the processes of the methods described below with reference to FIGS. 1 to 10 and FIGS. 19 to 23, can be configured as a Microsoft™ Windows application program, or the like, including a main window forming the graphical user interface. When the application program receives input messages, for example, a message of the known types WM_KEYDOWN or WM_SYSKEYDOWN, the application program can be configured to call a function referred to as "key_down". In accordance with the methods described herein, the key_down function is configured to call an invoke procedure associated with a highest-level event handler object of a particular class to be described below, passing the character code corresponding to the depressed key. The invoke procedure is a procedure associated with a particular object and is configured to call another object when the particular object wishes to communicate with that other object. The invoke procedure of an object includes an array of argument values to be passed to the invoke procedure of another object, and an identifier representing the object whose class inherits the procedure. An event handler object of another class to be described below, can be configured to decide which event handler object the message should be forwarded to before being actioned.

An example application program of the type described above, executing in conjunction with a host graphical user interface system and which utilises the methods described below, will be described at the end of this document.

In accordance with the methods described below, each of the event handler objects can have one or more associated interface identifiers which identify the communications protocols used by an interface associated with the respective event handler object, and which also identify to which side of a protocol the particular object relates. For example, a certain event handler object may use the "sender" side of a particular protocol for an instance associated with the event handler object, and the same event handler object may be related to another event handler object which uses the "receiver" side of the same protocol. Further, each message also has an associated message identifier, which is used by an operating system upon which the host graphical user interface system is operating to recognise the message.

As will be explained in more detail in the following paragraphs, the methods described herein use tables referred to as collaborator tables to map an event handler object to an interface identifier Each interface identifier includes an associated collaborator table, which includes as entries one or more event handler objects associated with the particular interface.

The method 100 of FIG. 1 is preferably implemented using software resident on the hard disk drive 1110 of the computer system 1100, the software being read and controlled in its execution by the processor unit 1105. The method 100 has the following input parameters: a reference associated with the first event handler object (i.e. the emitting event handler object); an interface identifier identifying the interface of the first event handler object; a reference to the second event handler object (i.e. the receiving object); and an interface identifier identifying the interface of the second event handler object. The method 100 checks that the interface of the first event handler object and the interface of the second event handler object are defined and present in the corresponding first and second event handler objects. The method 100 also checks that both interfaces communicate by the same protocol and that both interfaces correspond to different sides of that protocol. The method 100 is configured to add an entry to a collaborator table associated with the interface of the first event handler object. The collaborator table is keyed by a reference associated with the second event handler object and stores the value of the interface identifier of the second event handler object. The method 100 is also configured to add an entry to the collaborator table of the interface associated with the second event handler object. The entry is the interface identifier of the first event handler object.

The method 100 begins at the step 105 where a test is performed to determine if the first event handler object has an associated interface identifier corresponding to a first predetermined interface identifier. If the first event handler object has an associated interface identifier corresponding to the first predetermined interface identifier, at step 105, then the method 100 proceeds to step 115. Otherwise, the method 100 proceeds to step 110, where an error message is generated. Following step 110, the method 100 proceeds to step 150 where a failure message is generated, the connection of the event handler objects is aborted and the method 100 concludes.

At step 115, if the second event handler object has an associated interface identifier corresponding to a second predetermined interface identifier then the method 100 proceeds to step 125. Otherwise, the method 100 proceeds to step 120, where an error message is generated. Following step 120, the method 100 proceeds to step 150 where a failure message is generated and the connection of the event handler objects is aborted.

At step 125, a first interface is set to be the interface within the first event handler object corresponding to the first interface identifier and a second interface is set to be the interface within the second event handler object corresponding to the second interface identifier.

At step 130, a test is performed to determine if the first and second interfaces use the same protocol. If the first and second interfaces do not use the same protocol, then the method 100 continues at step 135, where an error message is generated. Otherwise the method 100 continues at step 140. Following step 135, the method 100 proceeds to step 150 where a failure message is generated and the connection of the event handler objects is aborted.

At step 140, a test is performed to determine if the first and second interfaces use different sides of the same protocol. If the first and second interfaces do use different sides of the same protocol, then the method 100 continues at step 145, where an error message is generated. Otherwise the method 100 continues at decision block 155. Following step 155, the method 100 proceeds to step 150 where a failure message is generated and the connection of the event handler objects is aborted.

At step 155, a test is performed to determine if the first interface has an allocated collaborator table. If the first interface has an allocated collaborator table, then the method 100 proceeds to step 160, where the first interface is allocated a collaborator table. Otherwise, the method proceeds to step 165.

At step 165, a test is performed to determine if the second interface has an allocated collaborator table. If the second interface has an allocated collaborator table, then the method 100 proceeds to step 170, where the second interface is allocated a collaborator table. Otherwise, the method proceeds to step 175.

At step 175, an entry is added or changed in the collaborator table allocated to the first interface so that the collaborator table maps the second event handler object to the second interface identifier The entry is the value of the interface identifier of the second event handler object. At the next step 180, an entry is added or changed in the collaborator table allocated to the second interface so that the table maps the first event handler object to the first interface identifier. The entry is the interface identifier of the first event handler object. At the next step 185, a success message is generated and the method 100 concludes.

The first and second event handler objects connected in accordance with the method 100 can subsequently be disconnected in accordance with the method 200 of FIG. 2. The method 200 is preferably implemented using software resident on the hard disk drive 1110 of the computer system 1100, the software being read and controlled in its execution by the processor unit 1105. The method 200 has the following input parameters a reference associated with the first event handler object; an interface identifier identifying the interface of the first event handler object; a message identifier; and a reference associated with an argument list storing any arguments of the first event handler object, to be passed. The method 200 checks that the interface of the first event handler object and the interface of the second event handler object are defined and present in the corresponding first and second event handler objects. The method 200 is configured to check that interface of the first event handler object and the interface of the second event handler object communicate by the same protocol and that both interfaces correspond to different sides of that protocol. The method 200 is also configured to remove any entry from the collaborator table associated with the interface of the first event handler object. The method 200 is also configured to remove any entry from the collaborator table of the interface associated with the second event handler object.

The method 200 begins at step 205, where a test performed to determine if the first event handler object has an associated interface corresponding to a first predetermined interface identifier. If the first event handler object has an associated interface corresponding to the first predetermined interface identifier, then the method proceeds to step 215. Otherwise, the method 200 proceeds to step 210, where an error message is generated. Following step 210, the method 200 proceeds to step 260 where a failure message is generated, the disconnection of the event handler objects is aborted and the method 200 concludes.

At step 215, a test is performed to determine if the second event handler object has an associated interface corresponding to a second predetermined interface identifier. If the second event handler object has an associated interface corresponding to the second predetermined interface identifier, then the method proceeds to step 225. Otherwise, the method 200 proceeds to step 220, where an error message is generated. Following step 220, the method 200 proceeds to step 260 where a failure message is generated, the disconnection of the event handler objects is aborted and the method 200 concludes.

At step 225, a first interface is set to be the interface within the first event handler object corresponding to the first interface identifier and a second interface is set to be the interface within the second event handler object corresponding to the second interface identifier.

At step 230, a test is performed to determine if the first and second interfaces use the same protocol. If the first and second interfaces do not use the same protocol, then the method 200 continues at step 235, where an error message is generated. Otherwise the method 200 continues at step 240. Following step 235, the method 200 proceeds to step 260 where a failure message is generated and the disconnection of the event handler objects is aborted.

At step 240, a test is performed to determine if the first and second interfaces use different sides of the same protocol. If the first and second interfaces do use different sides of the same protocol, then the method 200 continues at step 245, where an error message is generated. Otherwise the method 200 continues at step 250. Following step 245, the method 200 proceeds to step 260 where a failure message is generated and the disconnection of the event handler objects is aborted.

At step 250, a test is performed to determine if both, the first and second interfaces have allocated collaborator tables.

If both the first and second interfaces have allocated collaborator tables then the method 200 continues at step 265. Otherwise the method 200 continues at step 255, where an error message is generated. Following step 255, the method 200 proceeds to step 250 where a failure message is generated and the disconnection of the event handler objects is aborted.

At step 265, an entry is removed or changed in the collaborator table allocated to the fist interface so that the table maps the second event handler object to a null interface identifier. At the next step 270, an entry is removed or changed in the collaborator table allocated to the second interface so that the table maps the first event handler object to a null interface identifier. At the next step 275, a success message is generated and the method 200 concludes.

As described above, objects communicate with one another by sending messages in accordance with a predetermined communications protocol. As will be described in further detail later in this document, the protocols used by different event handler objects to communicate with each other differ depending on the class of event handler objects involved. Further, the procedures of a particular object can be activated by a message sent from another object. In accordance with the methods described herein, the manner in which a message is sent from a first event handler object is dependent upon whether the message is being sent to a single specified event handler object which is associated with an interface of the first event handler object, or whether the message is being sent to all event handler objects which are associated with an interface of the first event handler object.

FIG. 3 is a flow diagram showing a method 300 of sending a message from a first event handler object, which may or may not be the same as the first event handler object described above, to a single specified event handler object which is associated with an interface of the first event handler object. The method 300 is preferably implemented using software resident on the hard disk drive 1110 of the computer system 1100, the software being read and controlled in its execution by the processor unit 1105. The method 300 has the following input parameters: a reference associated with a first event handler object; an interface identifier identifying the interface of the first event handler object; a message identifier; and a reference associated with an argument list storing any arguments of the first event handler object to be passed. The method 300 is configured to check that the interface of the first event handler object has an entry keyed by a reference associated with a second event handler object. The method 300 procedure is also configured to call the invoke procedure of the second event handler object and pass a reference associated with the second event handler object, a message identifier, an argument list storing any arguments of the first event handler object, and a reference associated with the first event handler object, to the second event handler object.

The method 300 begins at step 305, where a test is performed to determine if the first event handler object has an interface corresponding to a first predetermined interface identifier. If the first event handler object has an interface corresponding to the first predetermined interface identifier, then the method 300 continues to the next step 315. Otherwise, the method 300 proceeds to step 310, where an error message is generated. Following step 310, the method 300 proceeds to step 345 where a failure message is generated and the method 300 concludes.

At step 315, a first interface is set to be the interface within the first event handler object corresponding to the first interface identifier. At the next step 320, a test is performed to determine if the second event handler object has an interface corresponding to a second predetermined interface identifier. If the second event handler object has an interface corresponding to the second predetermined interface identifier, then the method 300 continues to the next step 330. Otherwise, the method 300 proceeds to step 325, where an error message is generated. Following step 325, the method 300 proceeds to step 345 where a failure message is generated and the method 300 concludes.

At step 330, a second interface identifier is set to be the interface identifier to which the collaborator table associated with the first event handler object, maps the second event handler object. At the next step 335, a test is performed to determine if the interfaces associated with the second event handler object use the same protocol as the first event handler object. If the interfaces associated with the second event handler object do use the same protocol as the first event handler object, then the method 300 proceeds to step 350. Otherwise, the method 300 proceeds to step 340, where an error message is generated. Following step 340, the method 300 proceeds to step 345 where a failure message is generated and the method 300 concludes.

At step 350, the first event handler object calls an invoke procedure contained in the second event handler object and sends at least four parameters to the second event handler object. The four parameters include a message identifier, the second interface identifier, an argument list storing any arguments of the first handler object to be passed, and a reference to the first event handler object. At the next step 355, a success message is generated and the method 300 concludes.

Figure 4:
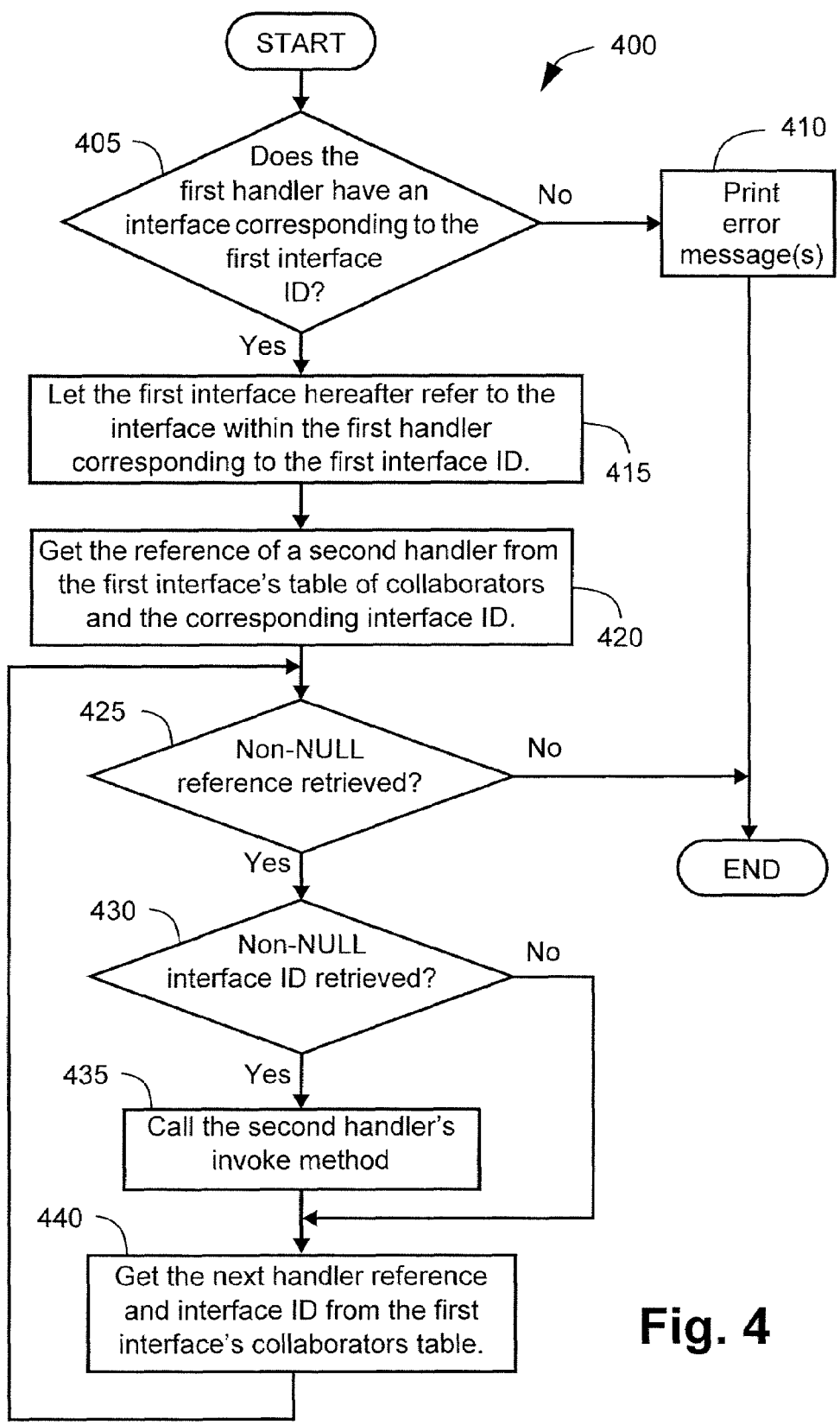
FIG. 4 is a flow diagram showing a method of sending a message from a first event handler object to all event handler objects which are associated with an interface of the first event handler object.

FIG. 4 is a flow diagram showing a method 400 of sending a message from a first event handler object, which may or may not be the same as the first event handler object described above, to all event handler objects which are associated with an interface of the first event handler object. The method 400 is preferably implemented using software resident on the hard disk drive 1110 of the computer system 1100, the software being read and controlled in its execution by the processor unit 1105. The method 400 has the following input parameters: a reference associated with a first event handler object; an interface identifier identifying the interface of the first event handler object; a message identifier and a reference associated with an argument list storing any arguments of the first event handler object, to be passed. The method 400 is configured to check that the interface of the first event handler object has an entry keyed by a reference associated with a second event handler object. The method 400 is also configured to examine the collaborator table of the interface of the first event handler object and to call the invoke procedure of each event handler object included in the collaborator table. The method 400 passes a reference associated with each of the event handler objects, a message identifier, an argument list storing any arguments of the first event handler objects to be passed and a reference associated with the associated object, to each of the event handler objects.

The method 400 begins at step 405, where a test is performed to determine if the first event handler object has an interface corresponding to a first predetermined interface identifier. If the first event handler object has an interface corresponding to the first predetermined interface identifier then the method 400 continues to the next step 415. Otherwise, the method 400 proceeds to step 410, where an error message is generated. Following step 410, the method 400 concludes.

At step 415, a first interface is set to be the interface within the first event handler object corresponding to the first interface identifier. At the next step 420, a second interface identifier is set to be the interface identifier to which the collaborator table associated with the first event handler object, maps the second event handler object. At the next step 425, if there are no more event handler objects with entries in the collaborator table associated with the first event handler object, then the method 400 concludes. Otherwise, the method 400 proceeds to step 430 where a test is performed to determine if the first interface associated with the interface identifier retrieved from the collaborator table associated with the first event handler object, is non-null. If the result of step 430 is true then the method 400 proceeds to the next step 435. Otherwise, the method 400 proceeds to step 440. At step 435, the invoke procedure associated with the second event handler object is called and a message identifier and second interface identifier is sent to the second event handler object. At step 440, the next event handler object reference and interface identifier is retrieved and the method 400 returns to step 425.

Figure 5:
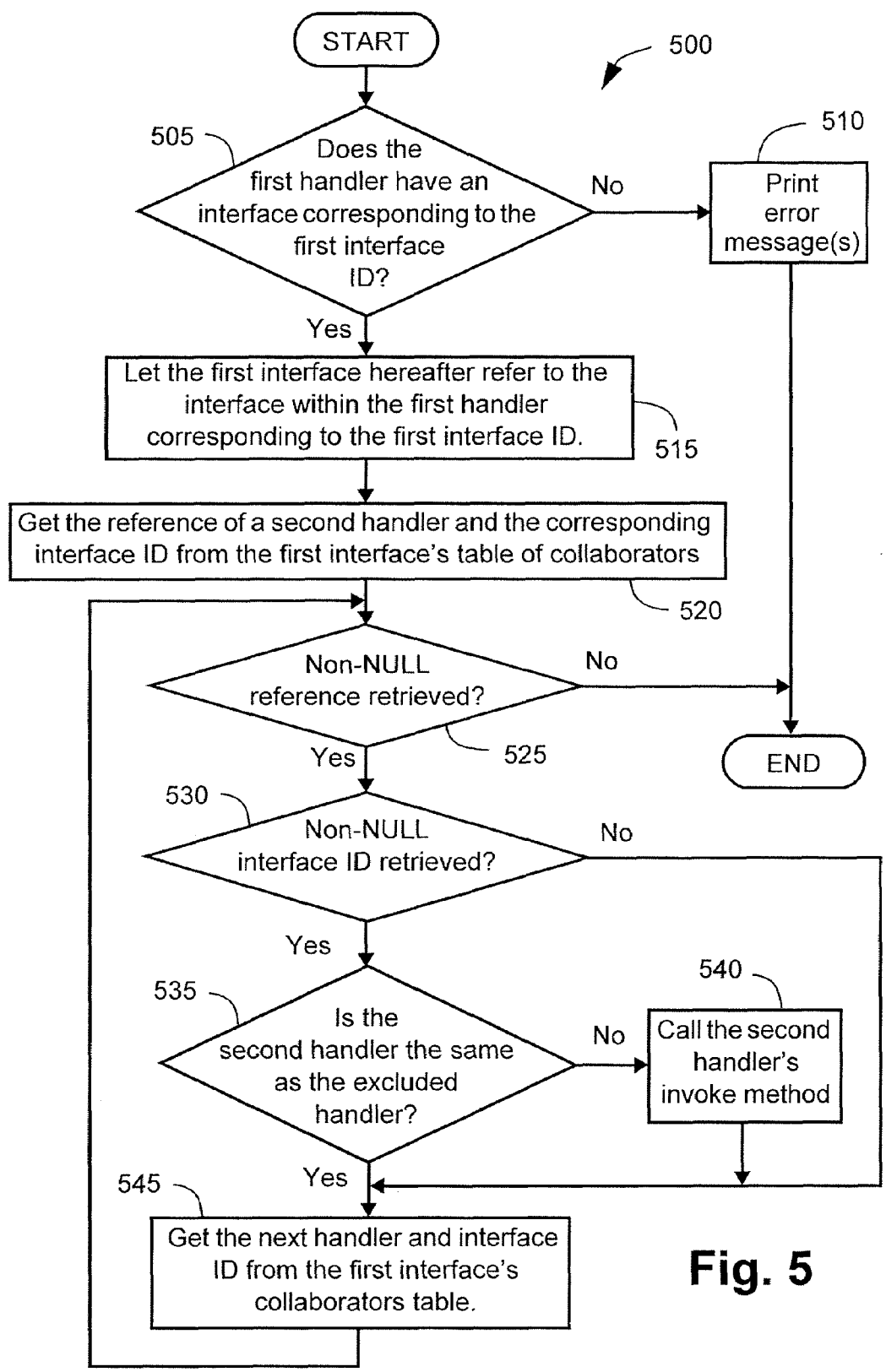
FIG. 5 is a flow diagram showing a further method of sending a message from a first event handler object to all event handler objects which are associated with an interface of the first event handler object.

FIG. 5 is a flow diagram showing a method 500 of sending a message from a first event handler object to all event handler objects which are associated with an interface of a first event handler object, except an event handler object which has been specifically excluded. The method 500 is preferably implemented using software resident on the hard disk drive 1110 of the computer system 1100, the software being read and controlled in its execution by the processor unit 1105.

The method 500 has the following input parameters: a reference associated with the first event handler object; an interface identifier identifying the interface of the first event handler object; a reference associated with a second event handler object; a message identifier and a reference associated with an argument list storing any arguments of the first event handler object to be passed. The method 500 is configured to check that the interface of the first event handler object has an entry keyed by a reference associated with the second event handler object. The method 500 is also configured to examine the collaborator table of the interface of the first event handler object and to call the invoke procedure of each event handler object included in the collaborator table except for an event handler object identified by a parameter passed to the first event handler object. The method 500 passes a reference associated with each of the event handler objects, a message identifier, an argument list and a reference associated with the first event handler object, to each of the event handler objects.

The method 500 begins at step 505, where a test is performed to determine if the first event handler object has an interface corresponding to a first predetermined interface identifier. If the first event handler object has an interface corresponding to the first predetermined interface identifier then the method 500 continues to the next step 515. Otherwise, the method 500 proceeds to step 510, where an error message is generated. Following step 510, the method 500 concludes.

At step 515, a first interface is set to be the interface within the first event handler object corresponding to the first interface identifier. At the next step 520, a second interface identifier is set to be the interface identifier to which the collaborator table associated with the first event handler object, maps the second event handler object. At the next step 525, if there are no more event handler objects with entries in the collaborator table associated with the first event handler object, then the method 500 concludes. Otherwise, the method 500 proceeds to step 530 where a test is performed to determine if the first interface associated with the interface identifier retrieved from the collaborator table associated with the first event handler object, is non-null. If the result of step 530 is true then the method 500 proceeds to the next step 535. Otherwise, the method 500 proceeds to step 545. At step 535, a test is performed to determine if the second event handler object is the excluded event handler object. If the second event handler object is the excluded event handler object then the method 500 proceeds to step 545. Otherwise, the method 500 proceeds to step 540, where the invoke procedure associated with the second event handler object is called and a message identifier and second interface identifier is sent to the second event handler object. At step 545, the next event handler object entry and interface identifier are retrieved from the collaborator table associated with the first event handler object and the method 500 returns to step 525.

FIG. 6 is a flow diagram showing a method of sending a message from a first event handler object to all event handler objects which are associated with an interface of the first event handler object, until one of these event handler objects indicates successful completion. The method 600 is preferably implemented using software resident on the hard disk drive 1110 of the computer system 1100, the software being read and controlled in its execution by the processor unit 1105. The method 600 has the following input parameters: a reference associated with the first event handler object; an interface identifier identifying the interface of the first event handler object; a message identifier and a reference associated with an argument list to be passed. The method 600 is configured to check that the interface of the first event handler object has an entry keyed by a reference associated with a second event handler object. The method 600 is also configured to examine the collaborator table of the interface of the first event handler object and to call the invoke procedure of each event handler object included in the collaborator table. The method 600 passes a reference associated with the other event handler object, a message identifier, an argument list and a reference associated with the first event handler object, to each of the event handler objects until one of the event handler objects receives a success code.

The method 600 examines the table of collaborators for the interface to identify all event handler objects which are associated with the interface and calls each of the invoke procedures associated with these event handler objects, until one of these event handler objects indicates successful completion. The method 600 begins at step 605, where a test is performed to determine if has the first event handler object has an interface corresponding to a first predetermined interface identifier. If the first event handler object has an interface corresponding to the first predetermined interface identifier then the method 600 continues to the next step 615. Otherwise, the method 600 proceeds to step 610, where an error message is generated. Following step 610, the method 600 proceeds to step 630 where a failure message is generated and the method 600 concludes.

At step 615, a first interface is set to be the interface within the first event handler object corresponding to the first interface identifier. At the next step 620, a second interface identifier is set to be the interface identifier to which the collaborator table associated with the first event handler object, maps the second event handler object. At the next step 625, if there are no more event handler objects with entries in the collaborator table associated with the first event handler object, then the method 600 proceeds to step 630 where a failure message is generated and the method 600 concludes. Otherwise, the method 600 proceeds to step 635 where a test is performed to determine if the first interface associated with the interface identifier retrieved from the collaborator table associated with the first event handler object, is non-null. If the result of step 635 is true then the method 600 proceeds to the next step 640. Otherwise, the method 600 proceeds to step 655. At step 640, the invoke procedure associated with the second event handler object is called and a message identifier and second interface identifier is sent to the second event handler object. At the next step 645, if the call at step 640 is successful then the method 600 proceeds to step 650 where a success message is generated and the method 600 concludes. Otherwise, the method 600 proceeds to step 655 where the next event handler object reference and interface identifier are retrieved from the collaborator table associated with the first event handler object and the method 600 returns to step 625.

FIG. 7 is a flow diagram showing a method 700 of receiving a message from an associated event handler object (i.e. a sending event handler object). As described above, the message includes a message identifier. The method 700 is preferably implemented using software resident on the hard disk drive 1110 of the computer system 1100, the software being read and controlled in its execution by the processor unit 1105. The method 700 is used by the base event handler object class (i.e. the object class from which all of the event handler objects within the class are derived). The method 700 begins at step 705, where a first predetermined interface is set to be the interface within the first event handler object (i.e. the receiving event handler object) corresponding to the first interface identifier. At the next step 710, a test is performed to determine if the first interface is null. If the first interface is not null, then the method 700 proceeds to step 720. Otherwise, the method 700 proceeds to step 715, where an error message is generated. Following step 715, the method 700 proceeds to step 740 where a failure message is generated and the method 700 concludes.

At step 720, a test is performed to determine if the side of the protocol represented by the first interface identifier is valid. In this instance, the side of the protocol is considered to be valid if the side is identified as a 'receive' side of the protocol. If the first interface is not identified with a valid side of the protocol, then the method 700 proceeds to step 730. Otherwise, the method 700 proceeds to step 725, where an error message is generated. Following step 725, the method 700 proceeds to step 740 where a failure message is generated and the method 700 concludes.

At step 730, a test is performed to determine if the side of the protocol represented by the message identifier is valid. In this instance, the side of the protocol identified by the message identifier is considered to be valid if the side is identified as a 'sender' side of the protocol. If the message identifier does not identify a valid side of the protocol, then the method 700 proceeds to step 740. Otherwise, the method 700 proceeds to step 735, where an error message is generated. Following step 735, the method 700 proceeds to step 740 where a failure message is generated and the method 700 concludes.

At the next step 745, a diagnostic message is generated. The diagnostic message indicates that the side of the message protocol represented by the message identifier is valid. The diagnostic message can also record the values of the receiving and sending event handler objects at the time that the message was received. At the next step 750, a success message is generated and the method 700 concludes.

In graphical user interface systems, it is common for there to be one or more graphical objects which are capable of accepting keyboard events active at any one time. Most graphical user interface systems use a concept referred to as "keyboard focus". In accordance with the keyboard focus concept, at all times there is one graphical object component of the graphical user interface system that is receiving all input keyboard events. Objects that deal with keyboard focus are generally referred to as focus event handler objects and belong to the focus event handler object class which provides an abstract base class for functionality that is common to all focus event handler objects within the focus event handler object class. One such characteristic is that almost all focus event handler objects transfer focus between sibling focus event handler objects, via a focus transferral protocol. The focus transferral protocol is used for transferring the focus between different objects. The focus transferral protocol is used to support a hierarchical keyboard focus model, whereby an object can have the focus only if the parent object of the object also has the focus. The focus transferral protocol has two sides as follows:

sender: The sender side of the protocol includes the message set_focus to indicate that the emitting object is giving focus to the receiving object; and receiver: The receiver side of the protocol does not include any messages.

The focus event handler object class inherits all of the functionality of the event handler object class.

The interfaces of the focus event handler object class, in accordance with the methods described herein, are as follows:

"fh_giver": This represents one side (i.e. the sender side) of the focus transferral protocol that is used; and "fh_taker": This represents one side transferral (i.e. the receiver side) of the focus protocol that is used.

The invoke procedure of the focus event handler objects is configured to call the invoke procedure of the base event handler object class, passing on any arguments associated with the focus event handler object. The focus event handler object class is preferably not directly instantiated.

Drop down menus, which are well known in the art, are generally associated with a graphical user interface and can respond to keyboard events. Such menus generally have an active (i.e. focused) component and several inactive components. Therefore, in accordance with the methods described herein, a menu item event handler object class and a menu screen event handler object class can be used to represent individual screens of a graphical user interface system comprising one or more graphical object components, and a containing screen which indicates the screen that is currently visible. In accordance with the methods described herein, a menu item control protocol object can be used for communication between event handler objects for different menu item event handler objects with a higher-level event handler object controlling a screen.

The menu item control protocol has two sides as follows:

sender: The sender side of the protocol includes the messages left, up, right, down, action, and set_visibility to indicate what state a particular menu item should be in at a particular time; and receiver: The receiver side of the protocol includes the messages focus_transferred and pressed to indicate to a parent menu item that a menu item has received focus from a sibling menu item.

In accordance with the methods described herein, a menu screen control protocol object can be used for communication between event handler objects for different menu screens with a higher-level event handler object coordinating different screens. The menu screen control protocol has two sides as follows:

sender: The sender side of the protocol includes the messages left, up, right, down, action, and set_visibility to indicate what state a particular menu item on a particular menu screen should be in at a particular time; and receiver: The receiver side of the protocol includes the message focus_transferred to indicate to a parent menu item that a menu item has received focus from a sibling menu item.

The menu item event handler object class and the menu screen event handler object class both inherit all of the functionality of the focus event handler object class The menu item event handler object class and the menu screen event handler object class include an interface referred to as "mih_parent", which complies with the menu item control ("receiver") protocol. The menu item event handler object class and the menu screen event handler object class also have extra data fields over the event handler object class. The extra data fields are as follows:

mih_siblings: This represents a table that can be included within event handler objects to represent event handler objects that can be given the focus; and mih_ns: This represents a namespace which can be included within event handler objects. A menu item event handler object can change the state of this namespace.

The menu item event handler object class and the menu screen event handler object class include a procedure referred to as connect_sibling. The connect_sibling procedure identifies two menu item event handler objects (i.e. a first and second focus event handler object) for use in the focus transfer and the associated side identifiers identifying the desired focus transfer protocol between the two menu item event handler objects. The first and second focus event handler objects communicate according to the focus transfer protocol. If the side identifier specifying the position of the second focus event handler object relative to the first focus event handler object is non-NULL, then the sibling table (i.e. mih_siblings) of the first focus event handler object is changed so that the side identifier associated with the first focus event handler object maps to the second focus event handler object. In this manner, the interface "fh_giver" for the first focus event handler object is connected to the interface "fh_taker" for the second focus event handler object. In a similar manner, if the side identifier specifying the position of the first focus event handler object relative to the second focus event handler object is non-NULL, then the sibling table (i.e. mih_siblings) of the second focus event handler object is changed so that the side identifier associated with the second focus event handler object maps to the first focus event handler object. In this manner, the interface "fh_giver" for the second focus event handler object is connected to the interface "fh_taker" for the first focus event handler object. The invoke procedure corresponding to each of the first and second focus event handler objects checks the interface identifier for each signal received by the respective event handler object, to determine that the interface identifiers are "mih_parent" or "fh_taker".

Figure 8A:
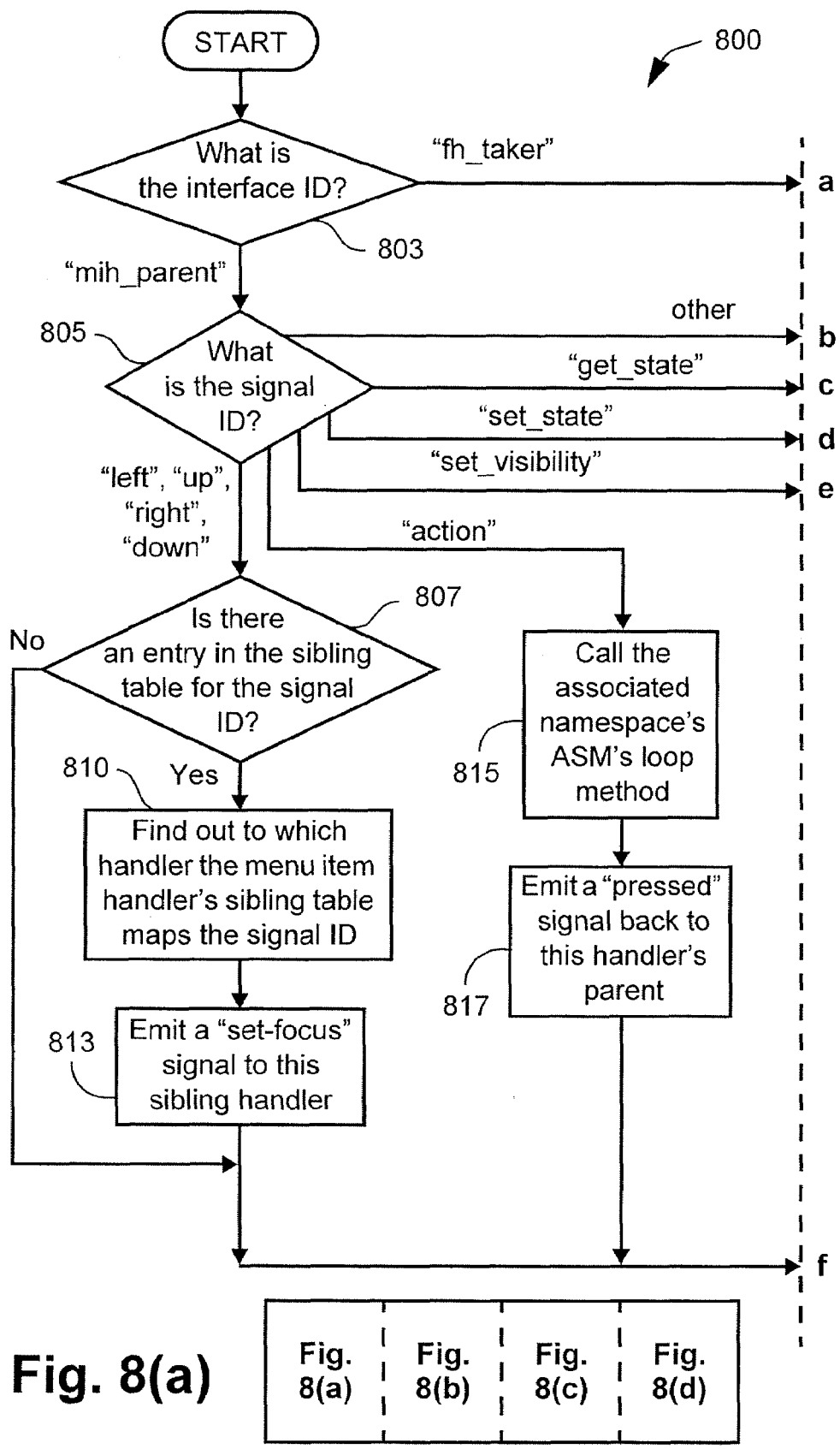
Figure 8B:
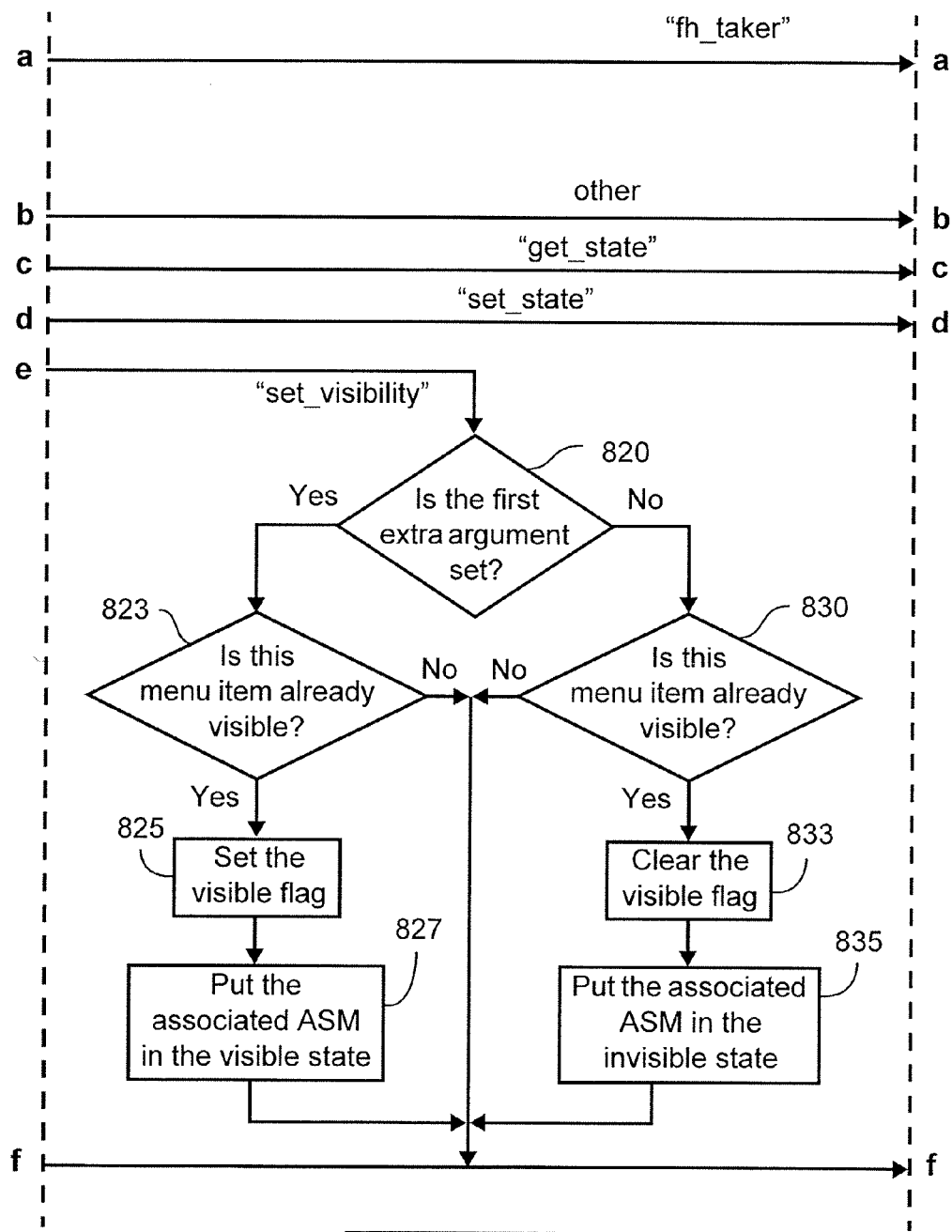

FIG. 8 is a flow diagram showing a method 800 of receiving a message from an associated menu item event handler object (i.e. an sending object). The message includes a message identifier and an interface identifier. The method 800 is used by both the menu item event handler object class and the menu screen event handler object class. The method 800 begins at the first step 803, where the interface identifier associated with the message, sent to a menu item event handler object, is examined by the receiving menu item event handler object. If the interface identifier is "mih_parent", indicating that the menu item_control ("receiver") protocol is being used by the sending menu item event handler object, then the method 800 proceeds to step 805. Otherwise, the method 800 proceeds to step 853.

At step 805, the method 800 continues depending on one of nine alternatives for the message identifier.

If the message identifier is one of "left", "up", "right", or "down", then the method 800 continues at the next step 807.

If the message identifier is "action", at step 807, then the method 800 continues at the step 815.

If the message identifier is "set_visibility"; at step 807, then the method 800 continues at the step 820

If the message identifier is "set_state", at step 807, then the method 800 continues at the step 837.

If the message identifier is "get_state", at step 807, then the method 800 continues at the step 850.

Otherwise, the method 800 proceeds to step 865.

At step 807, if there is an entry in the sibling table of the receiving menu item event handler object, for the message identifier (ie. "left", "up", "right", or "down"), then the method 800 proceeds to step 810. Otherwise, the method 800 concludes At step 810, the sibling table is examined in order to determine to which associated menu item event handler object the signal identifier has been mapped. At the next step 813, a "set_focus" message is transmitted by the receiving menu item event handler object to a sibling menu item event handler object of the receiving menu item event handler object and the method 800 concludes.

At step 815, loop procedures are called, by the receiving menu item event handler object, for any graphical objects associated with the menu item event handler object. At the next step 817, a "pressed" signal is transmitted from the receiving menu item event handler object to a parent menu item event handler object, and the method 800 concludes At step 820, a first extra argument passed from the invoke procedure of the sending menu item event handler object is read as a boolean flag to determine if the flag is set. If the flag is set then the method 800 proceeds to step 823. Otherwise, the method 800 proceeds to step 830. At step 823, if the visible flag of the receiving menu item event handler object is set, then the method 800 concludes. The visible flag indicates that any graphical objects associated with the receiving menu item event handler object is visible on the display screen of the host graphical user interface. Otherwise, the method 800 proceeds to step 825, where the visible flag of the receiving menu item event handler object is set. At the next step 827, the graphics associated with the receiving menu item event handler object are made visible on the screen of the host graphical user interface and the method 800 concludes.

At step 830, if the visible flag of the receiving menu item event handler object is clear then the method 800 concludes. Otherwise, the method 800 proceeds to step 833, where the visible flag of the receiving menu item event handler object is cleared. At the next step 835, the graphics associated with the receiving menu item event handler object are made visible on the screen of the host graphical user interface and the method 800 concludes.

At step 837, the first extra argument passed by the invoke procedure of the sending menu item event handler object is read to determine if the first extra argument is invisible. If the result of step 837 is true then the method 800 proceeds to step 847 where a print message is generated and the process concludes. Otherwise, the method 800 proceeds to step 840 where the "mih_State" field of the receiving menu item event handler object is changed to the value of the first extra argument. At the next step 843, if the graphic objects associated with the receiving menu item event handler object are visible then the method 800 proceeds to step 845. Otherwise, the method 800 concludes. At step 845, the graphic objects associated with the receiving menu item event handler object are set to the state requested by the first extra argument.

At step 850, a value set to the resultant of an array containing the value of "mih_State" field is returned to the sending menu item event handler object.

At step 853, if the message identifier is "set_focus", then the method 800 proceeds to step 855. Otherwise, the method 800 proceeds to step 865. At step 855, if the graphic objects associated with the receiving menu item event handler object are visible then the method 800 proceeds to step 857. Otherwise, the method 800 proceeds to step 860. At step 857, a "focus_transferred" message is generated by the menu item event handler object utilising the "mih_parent" interface and the method 800 concludes.

At step 860, if the sibling table of the receiving menu item event handler object maps the first extra argument to another event handler object then the method 800 proceeds to step 863. Otherwise, the method 800 concludes. At step 863, a "set_focus" message is generated by the receiving menu item event handler object using the "fh_giver" interface, and the set_focus message is sent to the event handler object of the sibling. Following step 863, the method 800 concludes.

At step 865, the invoke procedure of the focus event handler object is called by the invoke procedure of a base event handler object and the method 800 concludes.

A graphical user interface for an application program is often composed of several different screens which can be which can be displayed at any one time on a display device such as the display device 1114. Each of the screens can have a set of related graphical object components such that a currently visible screen has an active (i.e. focused) component. Therefore, in accordance with the methods described herein, a menu screen event handler object class is used to represent the containing screen.

The menu screen event handler object class inherits all of the functionality of the focus event handler object class described above. Menu screen event handler objects of the menu screen event handler object class can communicate with menu item event handler objects according to the menu screen control protocol.

The menu screen event handler object class includes the following interfaces:
- "mh_parent": This represents the receiver side of the menu control ("receiver") protocol; and
- "mh_child": This represents the sender side of the menu item control ("sender") protocol.

The menu screen event handler object class comprises extra data fields over the focus event handler object class described above, as follows;
- mh_siblings: This represents a table which is included within a menu screen event handler object listing all event handler objects that can be given the focus; and
- mh_ns : This represents a namespace which can be included within menu screen event handler objects. A menu screen event handler object can change the state of this namespace; and
- mh_focused: This field records which child menu item event handler objects should be given keyboard events.

The menu screen event handler object class is configured with an extra procedure referred to as connect_sibling. The connect_sibling procedure is configured to change the entries in the sibling table of a first menu screen event handler object so that the sibling table maps the first menu screen event handler object to a second menu screen event handler object.

The invoke procedure of the first menu screen event handler object examines the each received message and if the message identifier is one of "mh_parent", "fh_taker", or "mh_child", then the connect_sibling procedure is activated.

Figure 9B:
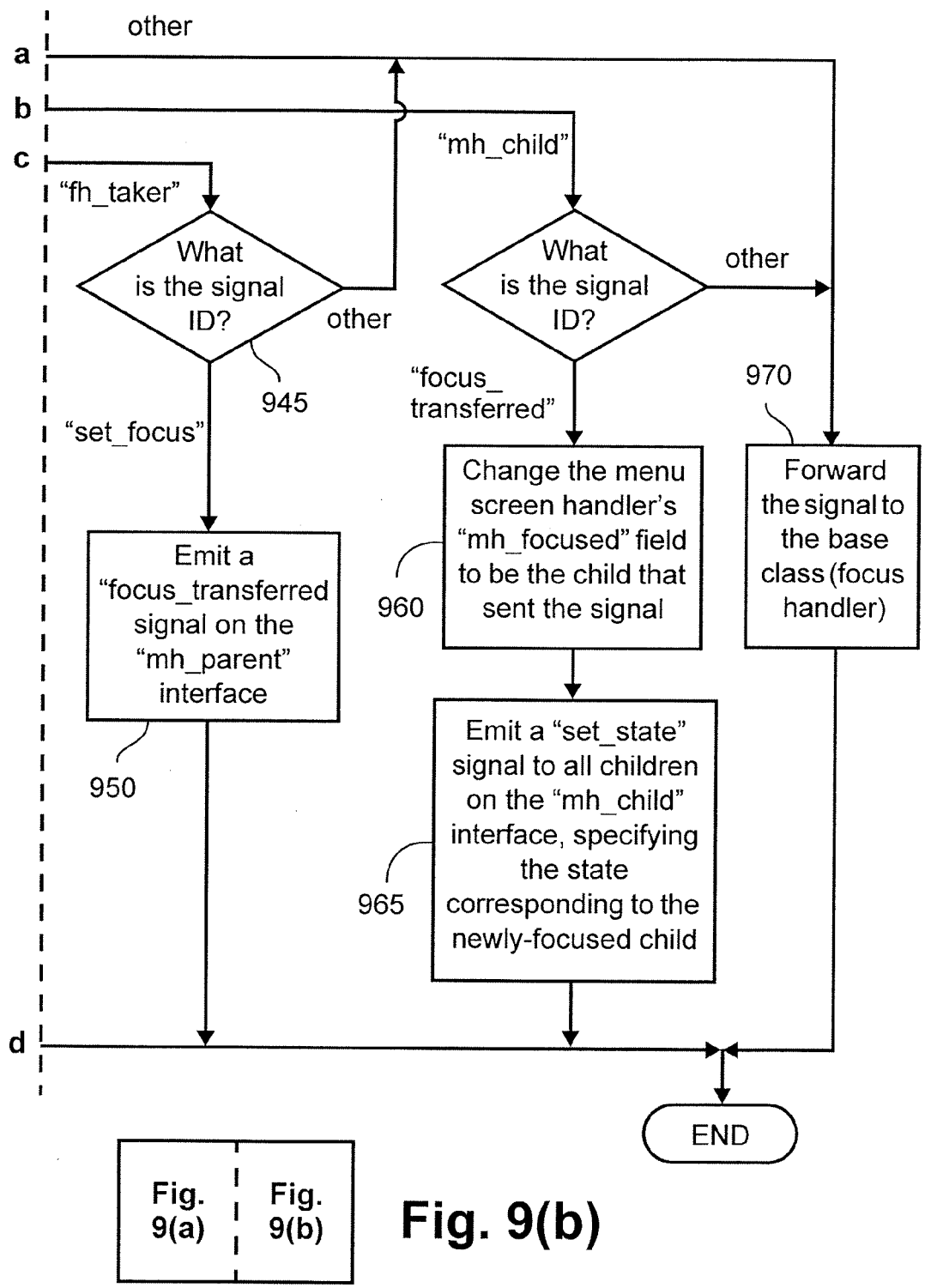
FIG. 9, including FIGS. 9(*a*) and 9(*b*), is a flow diagram showing a still further method of receiving a message from an associated event handler object.

FIG. 9 is a flow diagram showing a method 900 of receiving a message from an associated menu screen event handler object (i.e. a sending object). As described above, the message includes a message identifier and an interface identifier. The method 900 is used by the menu screen event handler object class. The method 900 begins at the first step 905, where the interface identifier, associated with the message sent to a menu screen event handler object, is examined by the receiving menu screen event handler object. If the interface identifier is "mh_parent", indicating that the menu screen ("receiver") protocol is being used by the sending menu screen event handler object, then the method 900 proceeds to step 910.

At step 910, the method 900 continues depending on one of six alternatives for the message identifier.

If the message identifier is one of "left", "up", "right", or "down", then the method 900 continues at the next step 915.

If the message identifier is "set_visibility", at step 910, then the method 900 continues at the step 920.

Otherwise, the method 900 proceeds to step 970.

At step 915, the message is retransmitted by the receiving menu screen event handler object to the child menu item event handler object that currently has focus.

At step 920, a first extra argument passed from the invoke procedure of the sending menu screen event handler object is read as a flag to determine if the flag is set. If the flag is set then the method 900 proceeds to step 925. Otherwise, the method 900 proceeds to step 935. At step 925, the receiving menu screen event handler object transmits a "set_visibility" message to all child menu item event handler objects, passing a set argument to each of the child menu item event handler objects. At the next step 930, all graphical objects associated with each of the child menu item event handler objects become visible on the host graphical user interface.

At step 935, the receiving menu screen event handler object transmits a "set_visibility" message to all child menu item event handler objects, passing a cleared argument to each of the child menu item event handler objects. At the next step 940, all graphical objects associated with each of the child menu item event handler objects become invisible on the host graphical user interface.

At step 970, the invoke procedure of the focus event handler object is called by the invoke procedure of a base event handler object and the method 900 concludes.

At step 905, if the interface identifier is "fh_taker", indicating that the focus transferral ("receiver") protocol is being used by the sending menu screen event handler object, then the method 900 proceeds to step 945. At step 945, if the message identifier is "set_focus" then the method 900 proceeds to step 950. Otherwise, the method 900 proceeds to step 970 as discussed above. At step 950, a "focus_transferred" message is generated by the sending menu screen event handler object utilising the "mh_parent" interface and the method 900 concludes.

At step 905, if the interface identifier is "mh_child", indicating that the menu item control ("sender") protocol is being used by the sending menu screen event handler object, then the method 900 proceeds to step 955. At step 955, if the message identifier is "focus_transferred" then the method 900 proceeds to step 960. Otherwise, the method 900 proceeds to step 970 as discussed above. At step 960, a the "mh_focused" field of the menu screen event handler object is changed to reference the child menu item event handler object that was responsible for the signal. At the next step 965, the receiving menu screen event handler object transmits a "set_state" message to all child menu screen event handler objects using the "mh_child" interface to specify the state corresponding to the currently focused child menu screen event handler object that has keyboard focus. After step 965, the method 900 concludes.

A further event handler object class utilised in accordance with the methods described herein is referred to as the menu switch handler object class. The menu switch handler object class inherits all of the functionality of the event handler object class. A menu switch handler object adjudicates switching between menu screen handler objects which distribute events to subordinate menu items. The menu switch handler object class can communicate with the menu screen event handler object class using the menu screen control protocol.

The interfaces of the menu switch handler object class are as follows:

mh_raw_input: This represents a message which complies with tile receiver side of the key board raw ("receiver") protocol; and mh_child: This represents a message which complies with the sender side of the menu control ("sender") protocol.

The menu switch event handler object class includes a field, "msh_focused", which contains a reference to the menu item event handler object that currently has the focus (ie. the object that is sent keyboard events by the menu switch handler). A menu switch handler object and a corresponding interface identifier are connected to the "msh_child" interface by the menu control protocol. The invoke procedure of a menu switch handler object examines the interface identifier for each message received.

Figure 10:
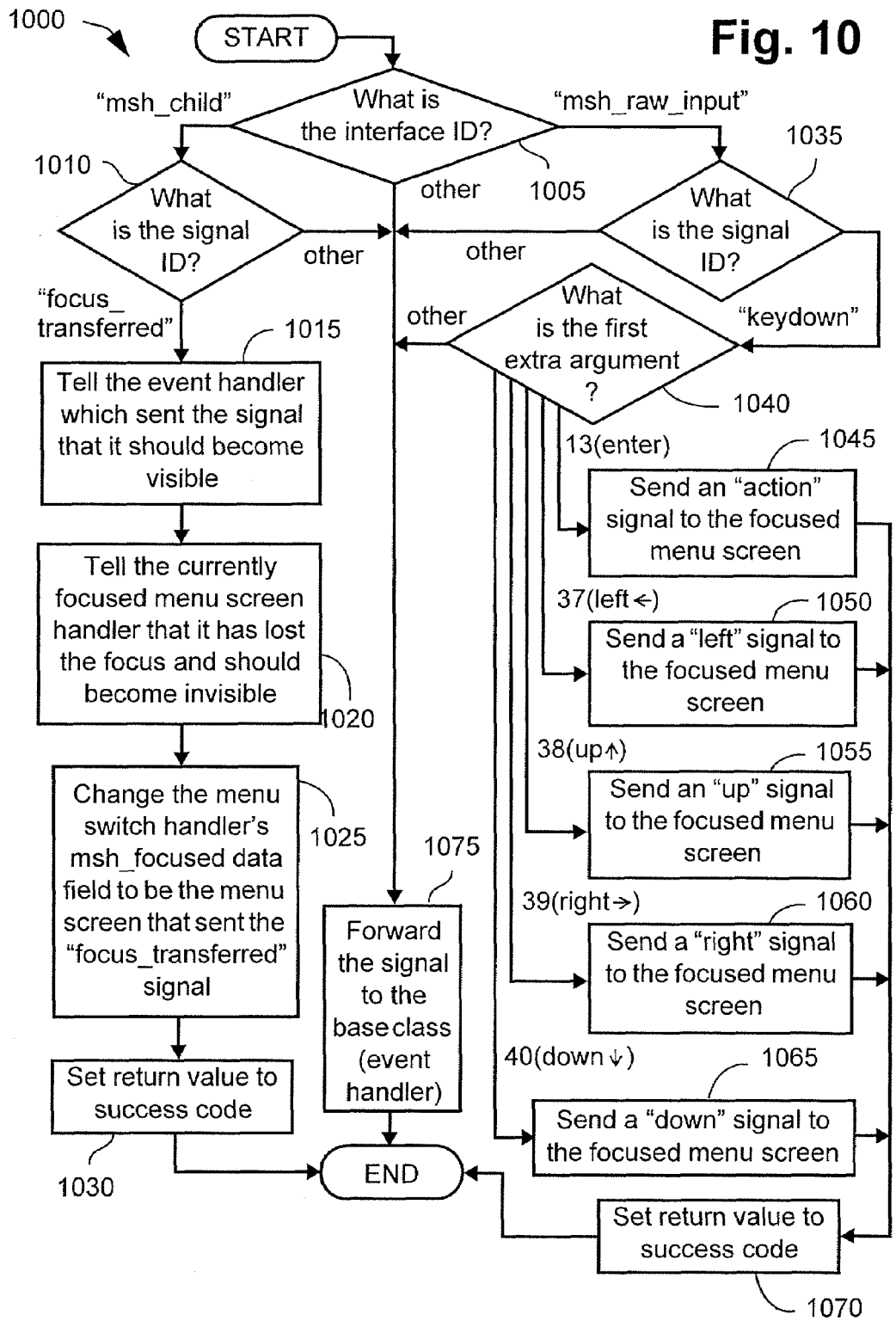
FIG. 10 is a flow diagram showing a still further method of receiving a message from an associated event handler object.
Figure 11:
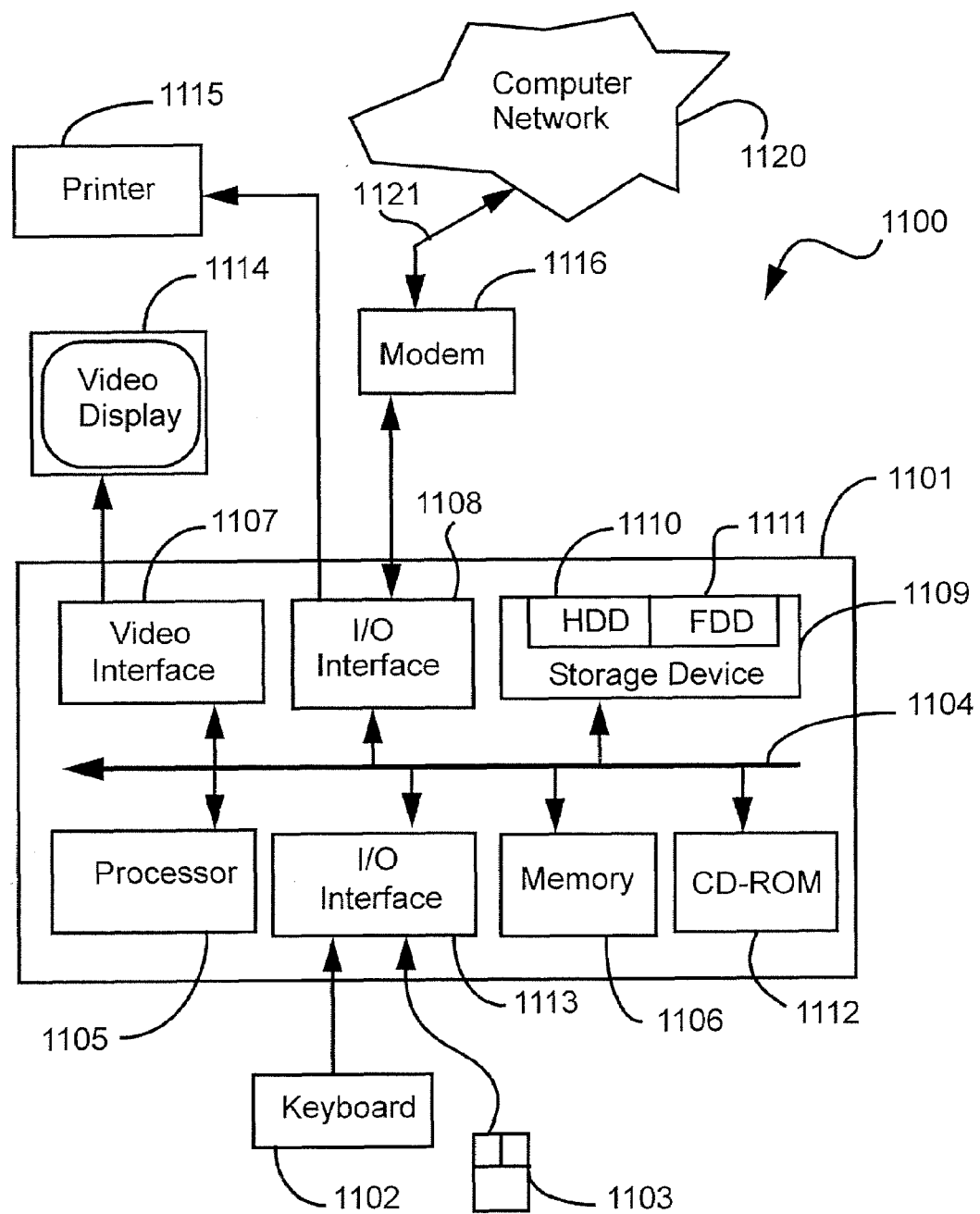
FIG. 11 is a schematic block diagram of a general purpose computer upon which arrangements described herein can be practiced.

FIG. 10 is a flow diagram showing a method 1000 of receiving a message from an associated menu switch event handler object (i.e. a sending object). As described above, the message includes a message identifier and an interface identifier. The method 1000 is used by the menu switch event handler object class. The method 1000 begins at the first step 1005, where the interface identifier associated with the message, sent to a menu switch event handler object, is examined by the menu switch event handler object. If the interface identifier is "mh_child", indicating that the menu item control protocol is being used by the sending menu switch event handler object, then the method 1000 proceeds to step 1010. At step 1010, if the message identifier is "focus_transferred" then the method 1000 proceeds to step 1015. At step 1015, the receiving menu switch event handler object transmits a "set_visibility" message to the associated menu switch event handler object which sent the message, passing a set argument to the menu switch event handler object. At the next step 1020, the receiving menu switch event handler object transmits a "set_visibility" message to the menu switch event handler object that currently has keyboard focus, passing a cleared argument to the menu switch event handler object. The cleared argument indicates that the menu switch event handler object having focus has lost the focus and is to become invisible. At the next step 1025, the "mh_focused" field of the menu switch event handler object is changed to reference the menu screen event handler object that was responsible for sending the message. At the next step 1030, a success code is generated and the method 1000 concludes.

At step 1075, the invoke procedure of the event handler object is called by the invoke procedure of a base event handler object and the message is forwarded to the base event handler object. After step 1075, the method 1000 concludes.

If the interface identifier is "msh_raw_input", at step 1005, indicating that the keyboard raw ("receiver") protocol is being used by the sending menu switch event handler object, then the method 1000 proceeds to step 1035. At step 1035, if the message identifier is "keydown", indicating that a key has been pressed, then the method 1000 proceeds to step 1040. Otherwise, the method 1000 proceeds to step 1075 as described above.

At step 1040, the method 1000 continues depending on one of at least six alternatives for the first extra argument of the message.

If the first extra argument sent with the message is not one of "13" or "37–40", at step 1040, then the method 1000 proceeds to step 1075 as described above.

If the first extra argument represents the enter key (i.e. generally "13") pressed on the keyboard 1102 of the computer system 1100, for example, at step 1040, then the method 1000 proceeds to step 1045, where an "action" message is sent to the menu screen having focus. The action message results in a change in the menu screen, for example, a graphical object may change from visible to invisible or vice versa, or a currently visible screen may become invisible as another screen becomes visible. At the next step 1070, a success message is generated and the process concludes.

If the first extra argument represents the left arrow key (i.e. generally 37) on the keyboard 1102 of the computer system 1100, for example, at step 1040, then the method 1000 proceeds to step 1050, where a "left" message is sent to the menu screen having focus. The left message results in the menu screen event handler object associated with the currently visible menu screen, passing the message down to a currently focused menu item event handler object. At the next step 1070, a success message is generated and the process concludes.

If the first extra argument represents the up arrow key (i.e. generally 38) on the keyboard 1102 of the computer system 1100, at step 1040, then the method 1000 proceeds to step 1055, where an "up" message is sent to the menu screen having focus. The up message results in the menu screen event handler object associated with the currently visible menu screen, passing the message down to a currently focused menu item event handler object. At the next step 1070 a success message is generated and the process concludes.

If the first extra argument represents the right arrow key (i.e. generally 39) on the keyboard 1102 of the computer system 1100, at step 1040, then the method 1000 proceeds to step 1060, where a "right" message is sent to the menu screen having focus. The right message results in the menu screen event handler object associated with the currently visible menu screen, passing the message down to a currently focused menu item event handler object. At the next step 1070 a success message is generated and the process concludes.

If the first extra argument represents the down arrow key (i.e. generally 40) on the keyboard 1102 of the computer system, at step 1040, then the method 1000 proceeds to step 1065, where a "down" message is sent to the menu screen having focus. At the next step 1070 a success message is generated and the process concludes.

In accordance with the methods described herein, a protocol referred to as 'Keyboardraw' can be used to transmit raw input from the keyboard 1102, for example, in the form of untranslated character codes to event handler objects. The Keyboardraw protocol has two sides as follows:
  sender: The sender side of the protocol includes the messages key_down and key_up to indicate that a key on the keyboard (e.g. 1102) has been pressed; and
  receiver: The receiver side of the protocol includes the message set_capture to indicate that the code associated with a pressed key has been read and translated.

Figure 24:
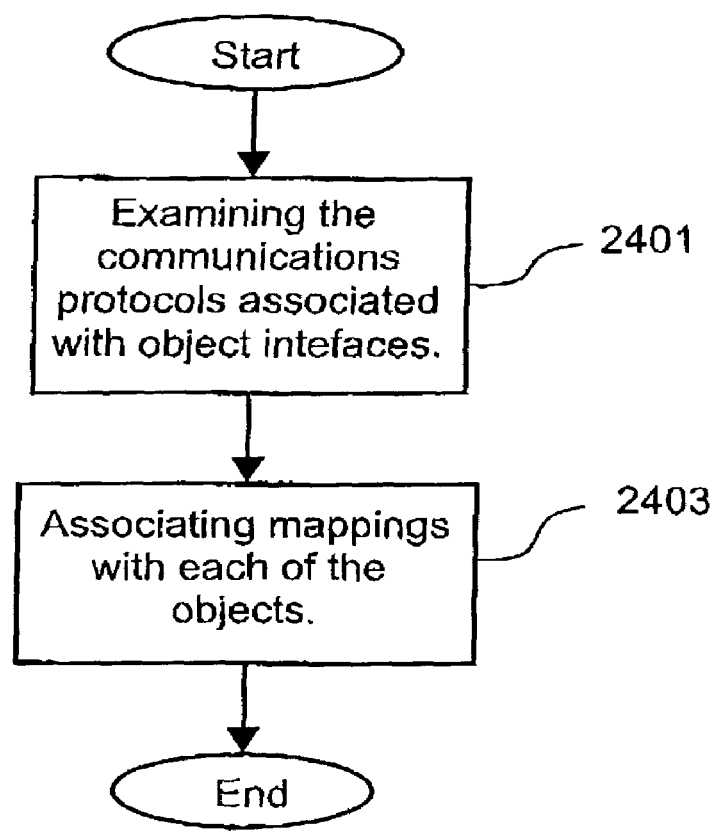
FIG. 24 is a flow diagram showing a method of connecting a first object to a second object.

FIG. 24 is a flow diagram showing a method 2400 of connecting a first object to a second object, in accordance with the methods described herein, where the first and second objects are generally event handler objects. The method 2400 is preferably implemented using software resident on the hard disk drive 1110 of the computer system 1100, the software being read and controlled in its execution by the processor unit 1105. The first and second objects each comprise at least one associated interface defining a communication protocol for each of the objects. The method begins at step 2401, where the communications protocols associated with each of the interfaces of the first and second objects are examined. At the next step 2403, a first mapping pointing to the second object is associated with the first object and a second mapping pointing to the first object is associated with the second object, if the first and second objects use a compatible communications protocol and the interfaces associated with each of the first and second objects define different sides of the compatible communications protocol. The manner in which the communications protocols are examined in step 2401, and the manner in which the first and second mappings are associated in step 2403, is explained above particularly with reference to FIG. 1.

A control formed by one or more graphical objects on a graphical user interface, can often be represented by a number of discrete states. For example, the appearance of a push button can be represented by "up", "rollover" and "down" states. Further, more complicated controls such as menus and list boxes can be represented by combining together a number of simpler controls. As described above, a finite state machine can be in any one of many internal states at any one time and a state can change after each symbol of an input data string is read with the new state depending on the symbol just read and on the source state.

In contrast, the methods described herein can be implemented as part of an "Animated State Machine". An animated state machine comprises a collection of object classes which together implement the animated state machine. These object classes comprise a collection of state objects, each of which corresponds to the visual appearance of a control. The state objects belong to a state object class and each state object has an associated mapping table used to map a particular state object to any associated object references, attribute identifiers and values. An animated state machine and state objects each have a number of associated procedures which will be described in detail below.

The animated state machine described herein also comprises a transition class which includes transition objects representing paths between different states within the animated state machine. Transition objects are used to determine the visual appearance of a graphical object corresponding to an animated state machine whenever the graphical object is "between states". In particular, a transition object specifies the appearance of a graphical object at every point in time during a change between two states. Transition objects have a number of associated procedures, which will be described in more detail below.

Each transition object comprises a set of track objects belonging to a track object class. Track objects represent a facet (i.e. part) of the transition of a graphical object between different states. A track object describes the values given to certain attributes of graphical objects. The values of the attributes are specified at corresponding times during a transition and generally all change in the same fashion, either smoothly or sharply. The track object class is an abstract class, instances of which contain lists of objects referred to as key objects representing track object change times. Track objects include a number of procedures, which will be described in detail below.

Keys objects belong to a key object class and as described above, key objects represent track object change times. Key objects represent change times using the time at which a change occurs along the total duration of a state transition. Key objects also include an associated track definition object containing relevant pairs of graphical object identifiers and associated graphical object attribute values. Key objects also include a number of procedures, which will be described in detail below.

Track definition objects belong to a track definition object class and as described above contain relevant pairs of graphical object identifiers and associated graphical object attribute values representing part of a state transition. Track definition objects also include a number of procedures, which will be described in detail below.

The transition between two states (e.g. states A and B) of an animated state machine is represented by a transition object as described above. The transition object comprises the data defining the visual appearance of the animation and thus represents an animation of the visual appearance of the control at state A to the visual appearance of the control at state B.

In accordance with the methods described herein, when an animated state machine is formed by a designer, one of the states of the animated state machine is defined to be the initial state. The visual appearance of a control is set to be the appearance defined at the initial state which becomes the source state. When a user interacts with the control, there is generally a change in the visual appearance of the control with the new visual appearance being represented by one of the states of the animated state machine. Therefore, the control is configured to request the state change from the source state to a desired destination state.

The animated state machine described herein utilises a shortest-path algorithm to determine an ordered collection of transition objects representing the change in the visual appearance of a control from the source state (i.e. source state) to the desired destination state. This ordered collection of transition objects is referred to hereinafter as the "current route" of the animated state machine and represents the shortest route (i.e. least number of state transitions) between a source state and a destination state. The shortest route is utilised while the animated state machine is animating in order to allow the animated state machine to determine one or more graphical objects, or parts thereof, that need to be rendered for a current frame. As transitions are completed, the completed transitions are removed from the current route of the animated state machine. When the current route is empty, the animated state machine is deemed to have arrived at the desired destination state, which becomes the source state.

The state that the animated state machine is in at a particular point in time will effect the manner in which any user events generated at that time are processed by the animated state machine. For any given user event the animated state machine is treated as if the animated state machine were in whatever state lies at the end of the current route. If a user attempts to interact with a control whilst the animated state machine of the control is currently in the process of animating a route, then the current route for the animated state machine is modified to change the destination state of the animated state machine in order to reflect the new desired destination state. This change in the destination state can involve some or all of the existing current route being destroyed.

In accordance with the methods described herein, the combination of graphical objects forming a screen of a graphical user interface, is represented by an expression tree, as known in the art. The internal nodes of the expression tree define compositing operators, and leaf nodes of the expression tree define graphical primitives such as text, paths, images and plane fills. Nodes within the expression tree contain attributes which effect the visual appearance of the graphical objects forming the screen, Some examples of attributes are compositing operators, colour, opacity and stroke width. Any change to the visual appearance of a control can be implemented by one or more changes to the attributes associated with one or more nodes of an expression tree representing the screen of the graphical user interface which includes the control. These attribute changes can be encoded within the animation data stored within a transition object. The period of time taken to animate between any two states associated with a particular control is defined by a transition duration.

A transition object can also comprise a number of associated track objects, as described above, where each track object describes the values of one or more attributes of an expression tree representing the screen of the graphical user interface which includes the control. The attributes which a particular track object is capable of modifying are defined by the track definition object, as described above, associated with the track object. A track definition object contains an array of object-attribute pairs where many track objects can reference the same track definition object.

The animated state machine described herein exploits the fact that the visual appearance of an interface control can be completely defined by the value of the attributes of the expression tree representing the screen of the graphical user interface which includes the control. In addition, for any given control, generally some subset of the possible object attributes are never modified. Therefore, the values of the attributes which are modified at a particular time can be stored in order to define the visual appearance of the control. The animated state machine described herein, stores attributes associated with objects that will be modified during the course of state machine animations using the track definition objects of the track definition class (i.e. ASM_TrackDef class). Each track definition object of the track definition class contains an array of object attribute pairs which define the attributes to be modified. All of the attributes listed within a single track definition object must be of the same type (i.e. compositing operators, colour, opacity, stroke width or child nodes etc). However, a single track definition object can contain a number of related attributes which can be modified together. For example, the colour and alpha channel of a path node can be contained within a single track definition object.

A particular track definition object does not actually store any data values for the attributes specified by that track definition object. In accordance with the animated state machine described herein, attribute data is stored within object classes derived from an animated state machine key object (i.e. ASM_Key) base class. Further, at least two object classes can be derived from the animated state machine key object base class. Firstly, an animated state machine key object double (i.e. ASM_KeyDbl) class can be derived to store floating point data. Secondly, an animated state machine key object discrete (i.e. ASM_KeyDiscrete) class can be derived to store arbitrary data, for example, integers and graphical objects (i.e. GOBJ_Objects). Each key object references a track definition object which defines which attributes the data corresponds to, obviating the need for the key object to store the object-attribute pairs itself.

In accordance with the methods described herein, whenever an action is executed that requires a change in state for a particular control (e.g. one or more graphical objects representing a button on the screen of a graphical user interface), a current route is calculated through the animated state machines representing the control. This current route comprises a list of one or more states that must be traversed to reach a destination state.

Figure 19A:
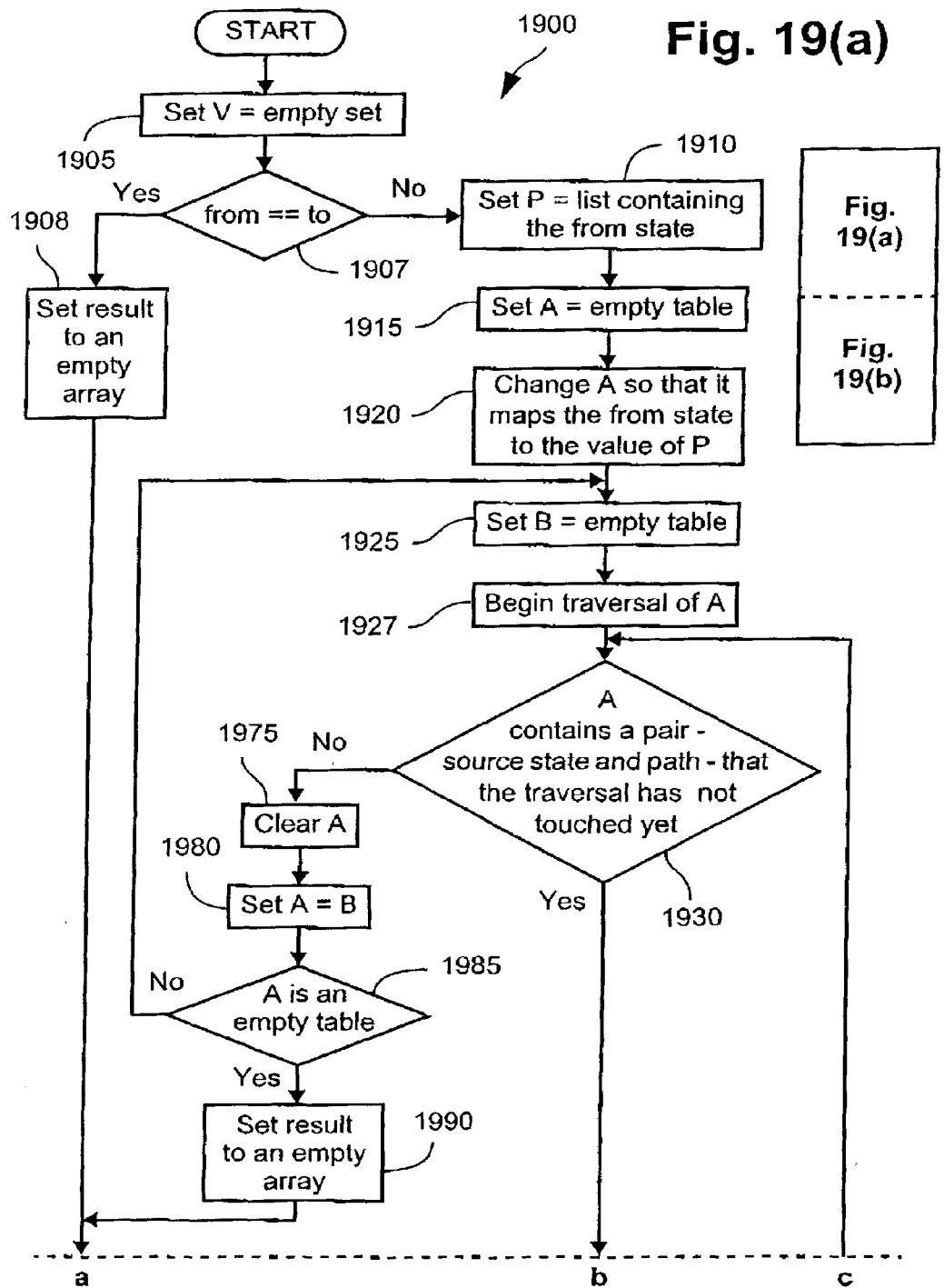
FIG. 19, including FIGS. 19(*a*) and 19(*b*), is a flow chart showing a method of determining a current route between a source state and a destination state for a particular control of a graphical user interface.
Figure 19B:
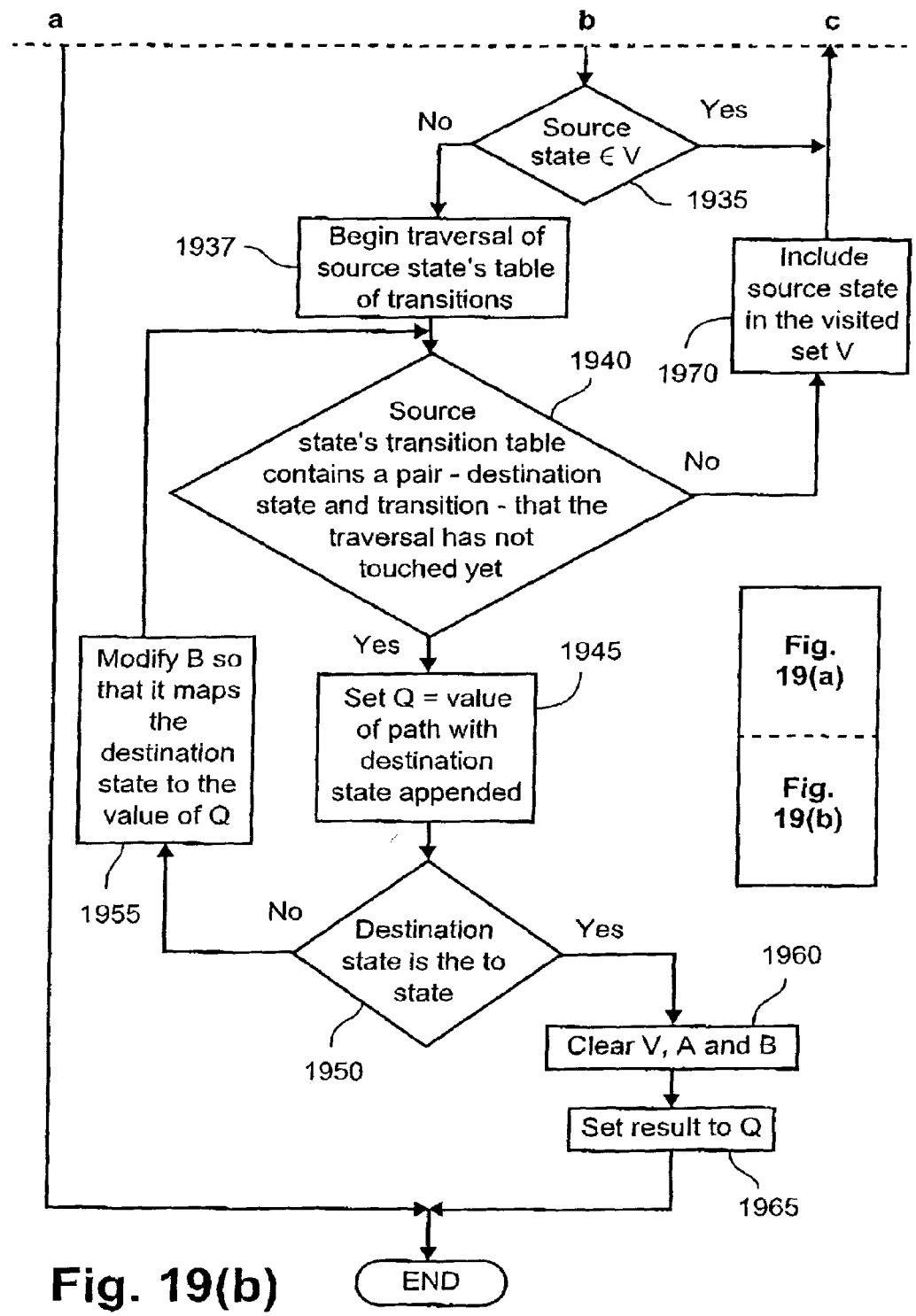
Figure 20B:
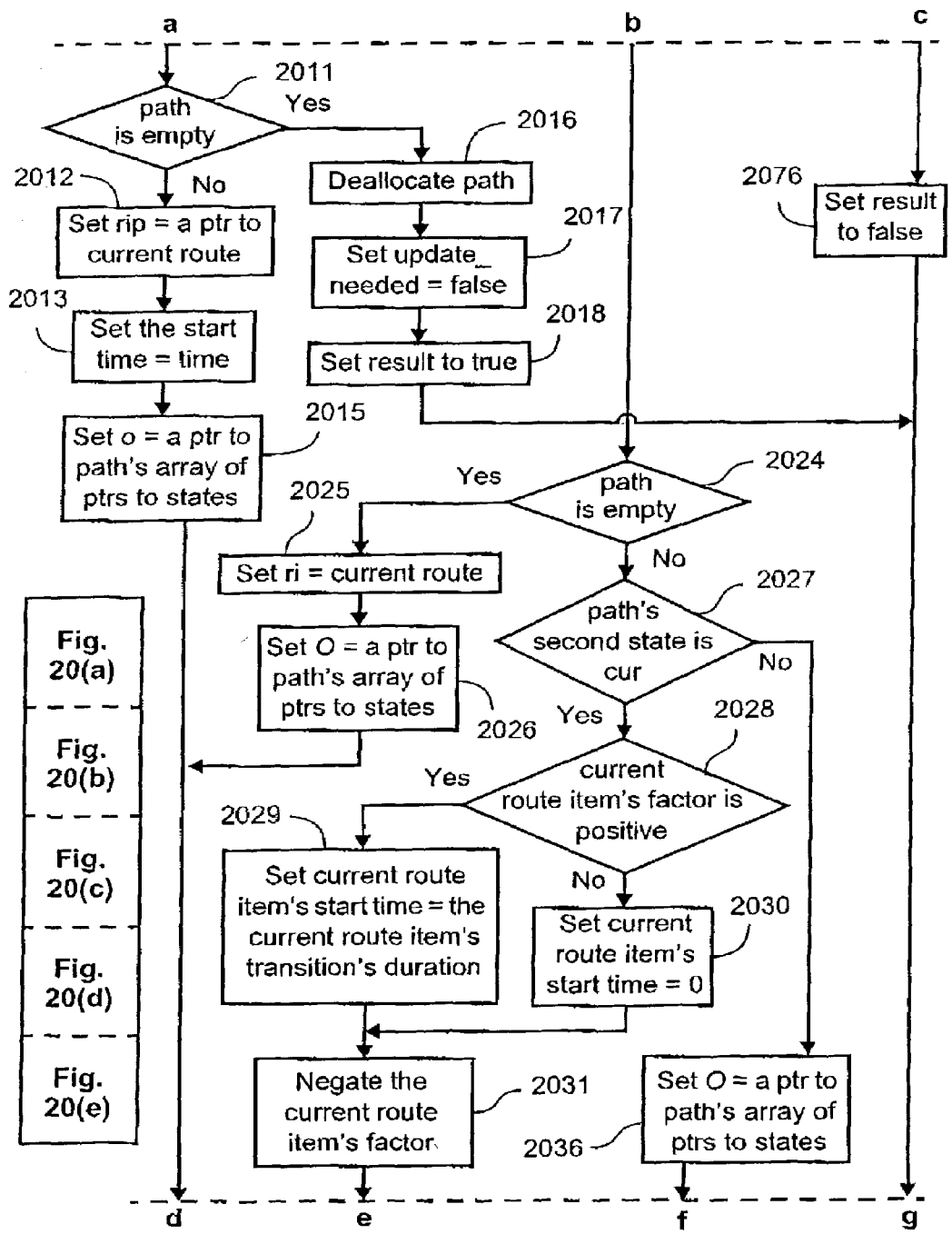
FIG. 20, including FIGS. 20(*a*) through 20(*e*), is a flow chart showing a method of determining a new destination state for an animated state machine associated with a control of a graphical user interface.
Figure 20C:
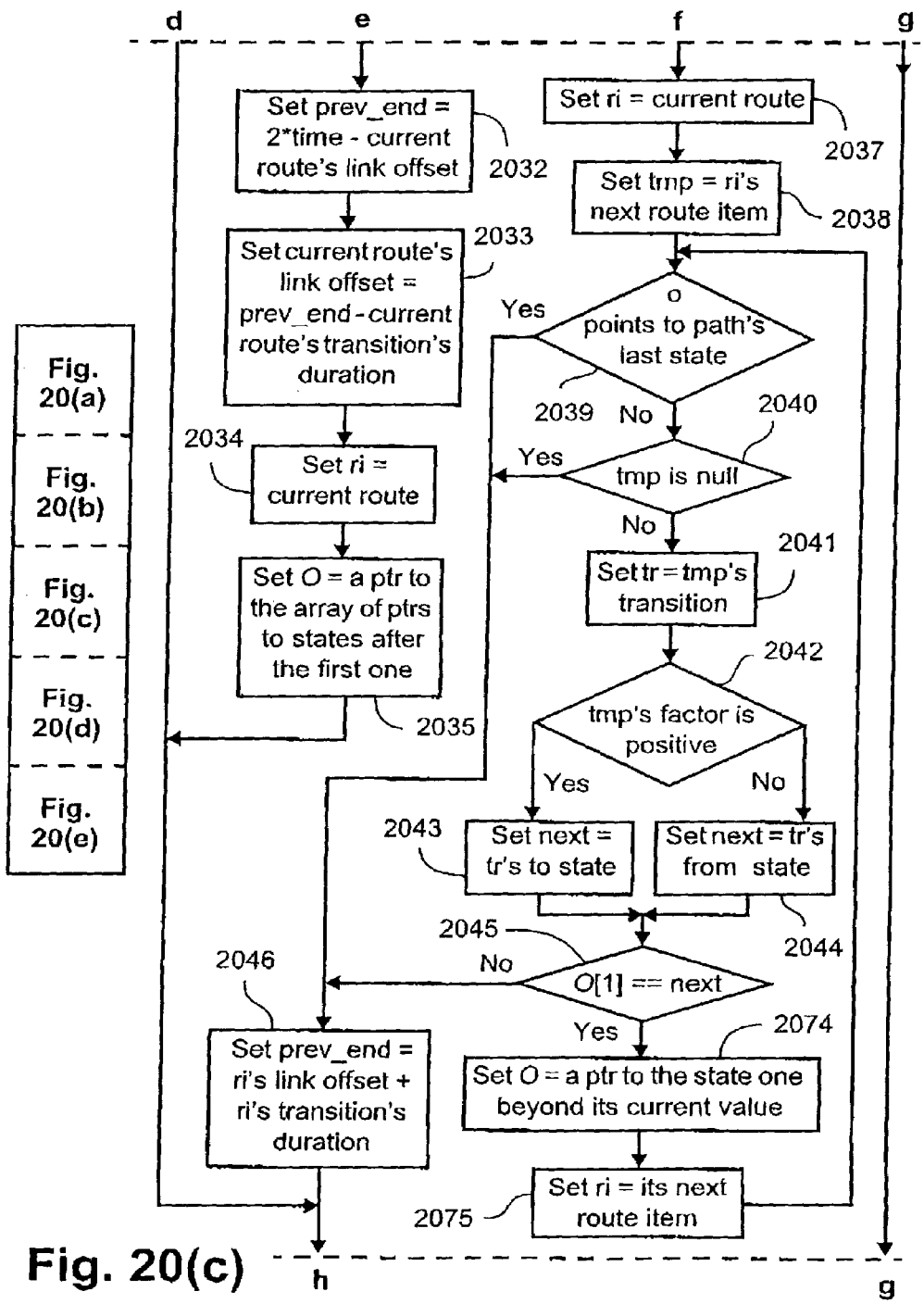
Figure 20D:
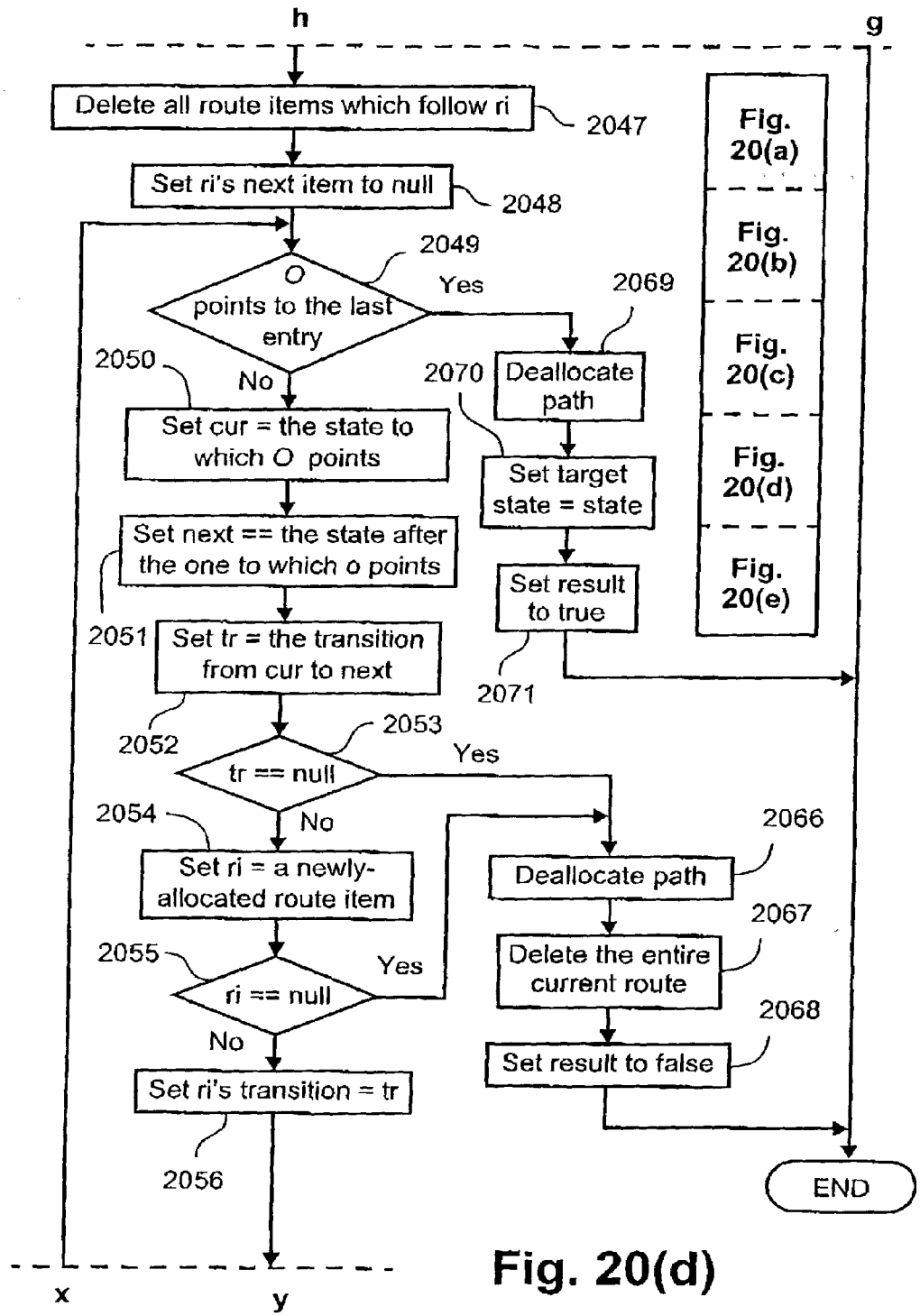
Figure 20E:
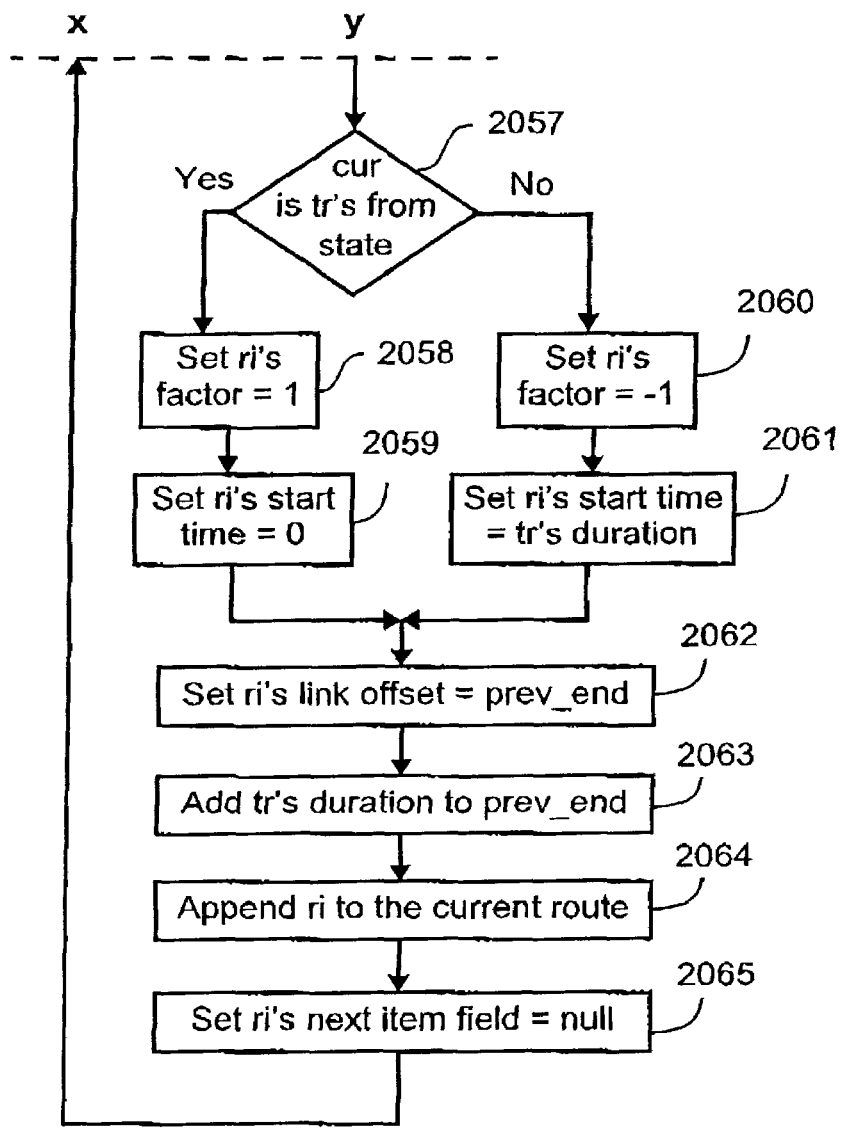

FIG. 19 is a flow chart showing a method 1900 of determining a current route (i.e. least number of state transitions) between a source state and a destination state for a particular control. The method 1900 is preferably implemented using software resident on the hard disk drive 1110 of the computer system 1100, the software being read and controlled in its execution by the processor unit 1105. The method 1900 begins at step 1905, where a set represented by the argument V is initialised as an empty set. Elements representing visited transitions of the animated state machine associated with the control are added to the set V to indicate that a transition has been visited during a traversal (i.e. at step 1937 below) of a table of transitions associated with the source state. At the next step 1907, the source state and the destination state are compared to determine if the respective states are the same. If the source state and the destination state are not the same at step 1907, then method 1900 continues to the next step 1910. Otherwise, the method 1900 proceeds to step 1908 where the result of the comparison is set to be an empty array and the method 1900 concludes.

At step 1910, an argument P is set to be a list containing the source state. At the next step 1915, an argument A is set to be an empty table. At the next step 1920, the table represented by the argument A is modified so that the table maps the source state to the destination state. At the next step 1925, an argument B is set to an empty table. At the next step 1927, the table represented by A is traversed. At the next step 1930, if the table A contains any mappings (i.e. source state to destination state) that were not traversed at step 1927 then the method 1900 proceeds to step 1935. Otherwise the method 1900 proceeds to step 1975, where the table represented by A is cleared. At the next step 1980, the table represented by A is set to the value of B. At the next step 1985, if the table represented by A is not empty then the method 1900 returns to step 1925. Otherwise, the method 1900 proceeds to step 1990 where the current route is set to an empty array.

At step 1935, if the source state is an element of the visited set V then the method 1900 returns to step 1930. Otherwise, the method 1900 proceeds to step 1937, where a table of transitions associated with the source state is traversed. At the next step 1940, if the transition table associated with the source state contains any mappings (i.e source state to destination state) that have not been traversed at step 1937, then the method 1900 proceeds to step 1945. Otherwise, the method 1900 proceeds to step 1970, where an extra element representing the source state is added to the visited set V, and the process returns to step 1930.

At step 1945, the argument Q is set to the value of a path with the destination state appended. At the next step 1950, if a destination state contained in the transition table is not equal to the destination state of the control then the method 1900 proceeds to step 1955. At step 1955, the table represented by the argument B is modified so as to map S the destination state to the value of the argument Q. If the destination state is equal to the destination state, at step 1950, then the method 1900 proceeds to step 1960 where V, A and B are cleared. At the next step 1965, the current route is set to the value of Q.

FIG. 20 is a flow chart showing a method 2000 of determining a new destination state for an animated state machine associated with a control of a graphical user interface. The method 2000 is preferably implemented using software resident on the hard disk drive 1110 of the computer system 1100, the software being read and controlled in its execution by the processor unit 1105. The method 2000 a result flag (i.e. true) indicating whether the new destination state has been successfully determined and a result flag (i.e. false) indicating whether an error occurred. The method 2000 begins at the first step 2005, where all completed transitions are deleted from the current route. At the next step 2006, a pointer $r_i$ is set to point to a first transition object with an uncompleted transition within the current route. At the next step 2007, a flag represented by the label update_needed is set equal to true. At the next step 2008, if the destination state is one the states of the animated state machine then the method 2000 proceeds to step 2009. Otherwise, the method 2000 proceeds to step 2076 where a result argument is set to false indicating that a new destination state for the animated state machine is not able to be determined and the method 2000 concludes.

At step 2009, if $r_i$ is null then the method 2000 proceeds to step 2010 where the current route for a source state and the destination state, is calculated in accordance with the method 100, and the calculated route is assigned the label path. Otherwise the method 2060 proceeds to step 2019. At the next step 2072, if the calculated route represented by path is null, then the method 2000 proceeds to step 2076. Otherwise the method 2000 proceeds to step 2011 where if path is empty then the method 2000 proceeds to step 2016 where path is deallocated (i.e. deleted) and the memory associated with the label path is freed for later use. Otherwise the method 2000 proceeds to step 2012. At the next step 2017, the update_needed flag is set to false. At the next step 2018, the result flag is set to true and the method 2000 concludes.

At step 2012, a pointer rip is set to the current route. At the next step 2014, a label start_time is set equal to the present time. At the next step 2015, a pointer represented by the label O is set to point to an array of pointers to states and the method 2000 continues at the next step 2047.

At step 2019, a start time allocated to the first transition object is subtracted from the current time. At the next step 2020 if the first transition object associated with the current route is positive then the method 2000 proceeds to step 2021, where the labels 'cur' and 'next' are set to be a source and destination state for the current route, respectively. Otherwise, the method 2000 proceeds to step 2022, where the cur and next are set to be a destination state and source state for the current route, respectively. At the next step 2023, the current route for the state represented by next, and the destination state, is calculated in accordance with the method 100, and the calculated route is assigned the label path.

At the next step 2073, if the calculated route represented by path is null, then the method 2000 proceeds to step 2076 Otherwise the method 2000 proceeds to step 2024 where if path is empty then the method 2000 proceeds to step 2025 where the pointer $r_i$ is set to point to the current route. Otherwise, the method 2000 proceeds to step 2027. At the next step 2026, a pointer represented by the label O is set to point to an array of pointers to states and the method 2000 continues at the next step 2047.

At step 2027, if the second state of the route represented by path is equal to the path represented by the label cur then the method 2000 proceeds to step 2028. Otherwise the method 2000 proceeds to step 2036. At step 2028, if a transition associated with the current route is positive then the method 2000 proceeds to step 2029, where the start time of the current route is set to the transition duration of the current route. Otherwise, the method 2000 proceeds to step 2030, where the start time of the current route is set to zero. At the next step 2031, a factor associated with the current route is negated (i.e. set equal to the negative of itself and multiplied by −1). At the next step 2032, an argument represented by the label prev_end_time is calculated as follows for the current route:

prev_end_time=(2*time−the link offset)

where the link offset represents the time at which a current transition will begin to execute, relative to the start of execution of the current route. At the next step 2033, a new value for the link offset of the current route is calculated as follows:

link offset=(prev_end_time−the transition duration of the current route).

At the next step 2034, the pointer $r_i$ is set to point to the current route. At the next step 2035, a pointer represented by the label O is set to point to an array of pointers to states after the first state.

If the second state of the route represented by path is not equal to the path represented by the label cur, at step 2027, then the method 2000 proceeds to step 2036. At step 2036, the pointer represented by the label O is set to point to an array of pointers to states. At the next step 2037, the pointer $r_i$ is set to point to the current route. At the next step 2038, a pointer tmp is set point to the next transition object of $r_i$. At the next step 2039, if the pointer O points to the last state of path, then the method 2000 proceeds to step 2046. At step 2046, an argument prev_end representing the end time for the first transition object is calculated as follows:

prev_end=the link offset of $r_i$+the transition duration of $r_i$.

If the pointer O does not point to the last state of path, at step 2039, then the method 2000 proceeds to step 2040. At step 2040, if the pointer 'tmp' is null, then the method 2000 proceeds to step 2046. Otherwise, the method 2000 proceeds to step 2041 where the argument $t_r$ is set equal to the transition of the route represented by Imp. At the next step 2042, if a factor associated with tmp is positive then the method 2000 proceeds to step 2043, where next is set equal to the destination state of imp. Otherwise, the method 2000 proceeds to step 2044, where next is set equal to the source state of tmp.

At the next step 2045, if the state that is one beyond the state pointed to be O (i.e. O(1)), is the same as the state pointed to by next, then the method 2000 proceeds to step 2074. Otherwise, the method 2000 proceeds to step 2046. At step 2074, the pointer O is incremented so as to point to the next state in path. At the next step 2075, $r_i$ is set equal to the next transition object and the method 2000 returns to step 2039.

At step 2047, all transition objects which follow $r_i$, are deleted. At the next step 2048, the next transition object of $r_i$ is set equal to null. At the next step 2049, if the pointer 0 points to the last entry in the array, where the last entry represents the last state of the current route, then the method 2000 proceeds to step 2069. Otherwise, the method proceeds to step 2050. At step 2069, path is de-allocated. At the next step 2070, the destination state of the state machine is set equal to that represented by state. At the next step 2071, the result flag is set to true in the method 2000 concludes.

At step 2050, cur is set to the state in the path to which O is currently pointing. At the next step 2051, next is set to the state in path beyond the one to which O is pointing. At the next step 2052, $t_r$ is set to the state transition from cur to next. If $t_r$ is null at the next step 2053, then the method 2000 proceeds to step 2066. Otherwise, the method 2000 proceeds to step 2054 where $r_i$ is set equal to a newly allocated transition object. If $r_i$ is null at the next set 2055 then the method 2000 proceeds to step 2066. Otherwise the method 2000 proceeds to step 2056 where the transition of the route pointed to by $r_i$ is set equal to $t_r$. At the next step 2056, if cur is equal to the source state represented by the argument tr then the method 2000 proceeds to step 2058. Otherwise, the method 2000 proceeds step 2060. At step 2058, the factor associated with $r_i$ is set equal to 1. At the next step 2059, the start time of $r_i$ is set equal to zero.

At step 2060, the factor associated with $r_i$ is set equal to −1. At the next step 2061, the start time of $r_i$ is set equal to the transition represented by $t_r$. At the next set 2062, the link offset of $r_i$ is set equal to prev_end. At the next step 2063, the transition represented by tr is set equal to prev_end. At the next step 2064, the current transition object represented by $r_i$ is appended to the current route. At the next step 2065, a transition object field associated with $r_i$ is set equal to null.

At step 2066, the path is de-allocated. At the next step 2067, all of the transition objects of the current route are deleted. At the next step 2068, the result flag is set to false and the method 2000 concludes.

Figure 21:
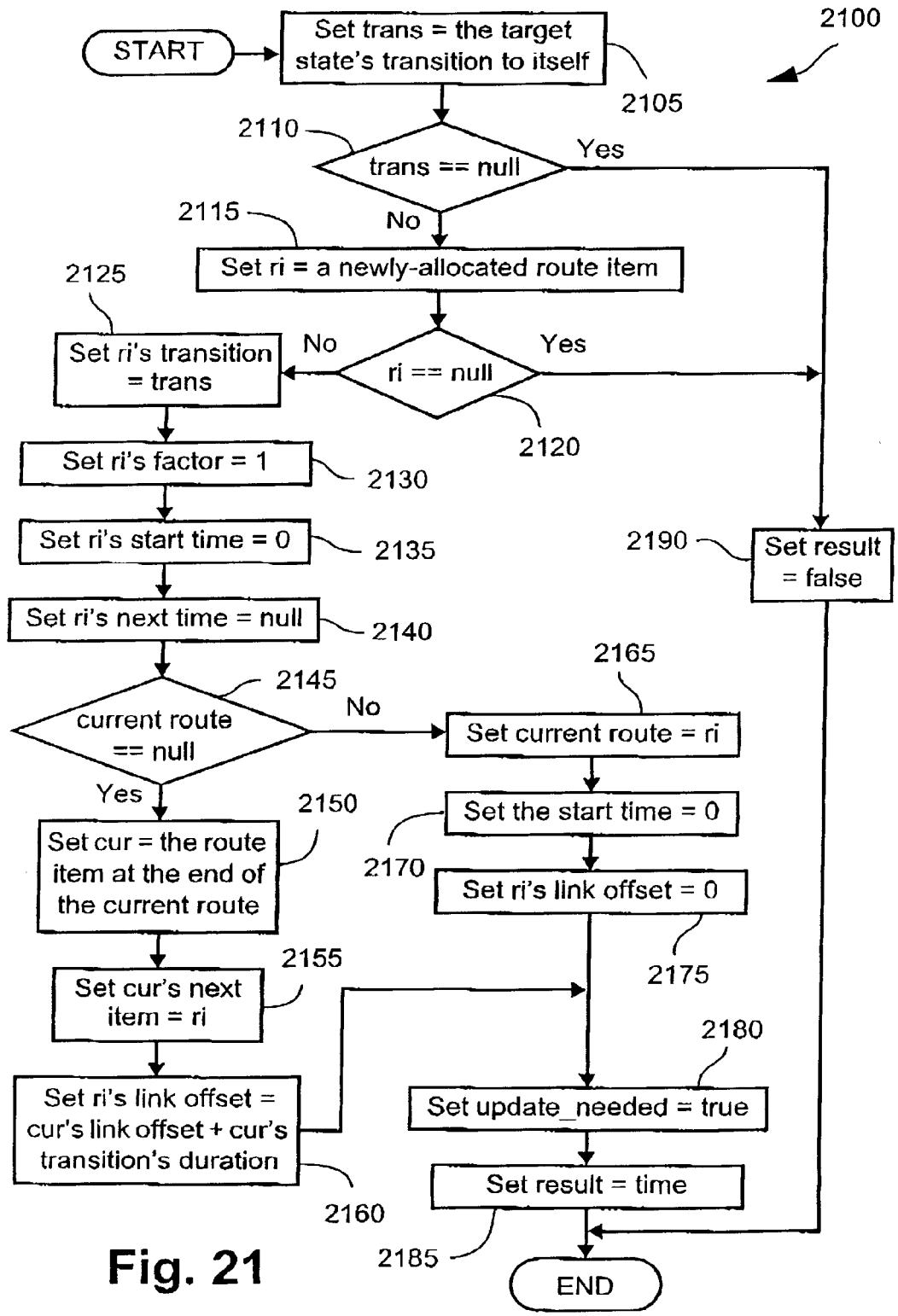
FIG. 21 is a flow chart showing a further method of adding a new transition object to the end of a currently animating route of an animated state machine.

It is sometimes occurs that the state transition of a graphical object begins and ends at the same state but varies the appearance of the graphical object in between. Such a transition will be hereinafter referred to as a loop. FIG. 21 is a flow chart showing a method 2100 of adding a new transition object to the end of the current route of an animated state machine. The method 2100 is preferably implemented using software resident on the hard disk drive 1110 of the computer system 1100, the software being read and controlled in its execution by the processor unit 1105.

The method 2100 returns a result flag (i.e. true) indicating whether the new transition object has been successfully determined and a result flag (i.e. false) indicating whether an error occurred. The method 2100 begins at step 2105, where an argument represented by the label trans is set to a transition associated with the current destination state of the animated state machine. At the next step 2110, if trans is null, then the method 2100 proceeds to step 2190 where a result argument is set to false and the method 2100 concludes. Otherwise, the method 2100 proceeds to step 2115, where $r_i$, representing the next transition object with an uncompleted transition within the current route, is set to a newly allocated transition object (i.e. memory is allocated for the new transition object). At the next step 2120, if $r_i$ is null, then the method 2100 proceeds to step 2190. Otherwise, the method 2100 proceeds to step 2125, where the transition of the transition object represented by $r_i$ is set to the transition represented by the label trans. At the next step 2130, the factor associated with $r_i$ is set equal to 1. At the next step 2135, the start time of the transition object represented by $r_i$ is set to 0. At the next step 2140, the next transition object associated with $r_i$ is set to null.

At the next step 2145, if the current route is not null, then the method 2100 proceeds to step 2150, where cur is set to the transition object at the end of the current route. Otherwise, the method 2100 proceeds to step 2165. At the next step 2155, the next item field of cur is set to the transition object represented by $r_i$. At the next step 2160, the link offset associated with the transition object represented by $r_i$ is set equal to the sum of the link offset associated with the transition object associated with cur and the transition duration of the transition object associated with cur.

At step 2165, the current route of the state machine is set to $r_i$. At the next step 2170, the start time of the state machine is set to 0. At the next step 2175, the link offset associated with $r_i$ is set to zero.

At the next step 2180, the update needed flag is set to true. At the next step 2185, the result flag is set to true and the method 2100 concludes.

Figure 22:
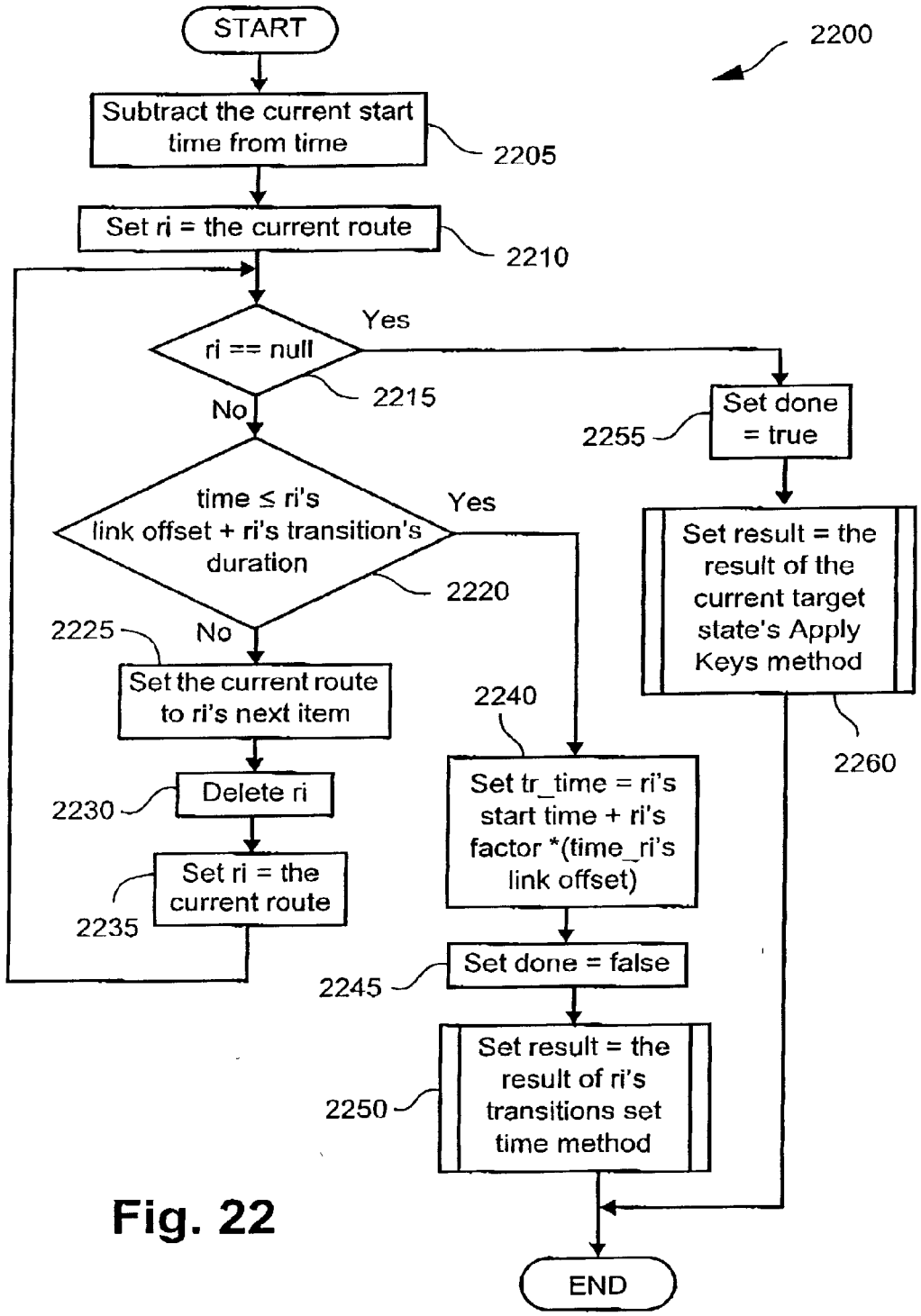
FIG. 22 is a flow chart showing a method of updating the appearance of any graphical objects associated with the animated stated machine of FIGS. 19 to 21.

During or after the transition of an animated state machine, it is necessary to update the appearance of any graphical object associated with the animated state machine. FIG. 22 shows a flow chart showing a method 2200 of updating the appearance of any graphical objects associated with the animated state machine of FIGS. 19 to 21. The method 2200 is preferably implemented using software resident on the hard disk drive 1110 of the computer system 1100, the software being read and controlled in its execution by the processor unit 1105. The method 2200 requires a state machine and a time measured according to a clock of the system 1100, and returns a done flag indicating whether the current route of the state machine has finished the current animation, and a result flag (i.e. false) indicating whether an error occurred. The method 2200 begins at step 2205, where the start time allocated to the state machine during the methods 1900, 2000 and 2100, is subtracted from the current time. At the next step 2210, the argument $r_i$ is set to the current route. At the next step 2215, if $r_i$ is null, then the method 2200 proceeds to step 2255, where a done flag is set to true. Otherwise the method 2200 proceeds to step 2220. At the next step 2260, the result flag is set to the result of calling the 'ApplyKeys' procedure for the source state of the state machine. The ApplyKeys procedure accepts a reference associated with self and examines a table of key objects associated with the transition object representing the source state. The ApplyKeys procedure retrieves the key object references, attribute identifiers and associated attribute values, and then sets attribute values associated with each key object according to the source state.

At step 2220, if time is less than or equal to the sum of the link offset for the current route and the transition duration of the current route, then the method 2200 proceeds to step 2225. Otherwise, the method 2200 proceeds to step 2240, where the argument tr_time, representing a "pseudo-time" that can be used to calculate the appearance of a graphical object, is set equal to:

$$\text{tr\_time}=r_i(\text{start time})+r_i(\text{factor})\times(\text{time}-r_i(\text{link offset})).$$

At the next step 2245 the done flag is set to false. At the next step 2250, the result flag is set to the result of calling the method 500 (See FIG. 5) for the transition of the current route of the source state for the state machine and the method 2200 concludes. As will be described below, the method 500 traverses the track objects of a transition object and selects an unused track object. The unused track object is then used to update any graphical objects associated with the transition object.

At step 2225, the current route is set to the next item of $r_i$. At the next step 2230, $r_i$ is deleted. At the next step 2235, $r_i$ is set equal to the current route and the method 2200 returns to step 2215.

Figure 23A:
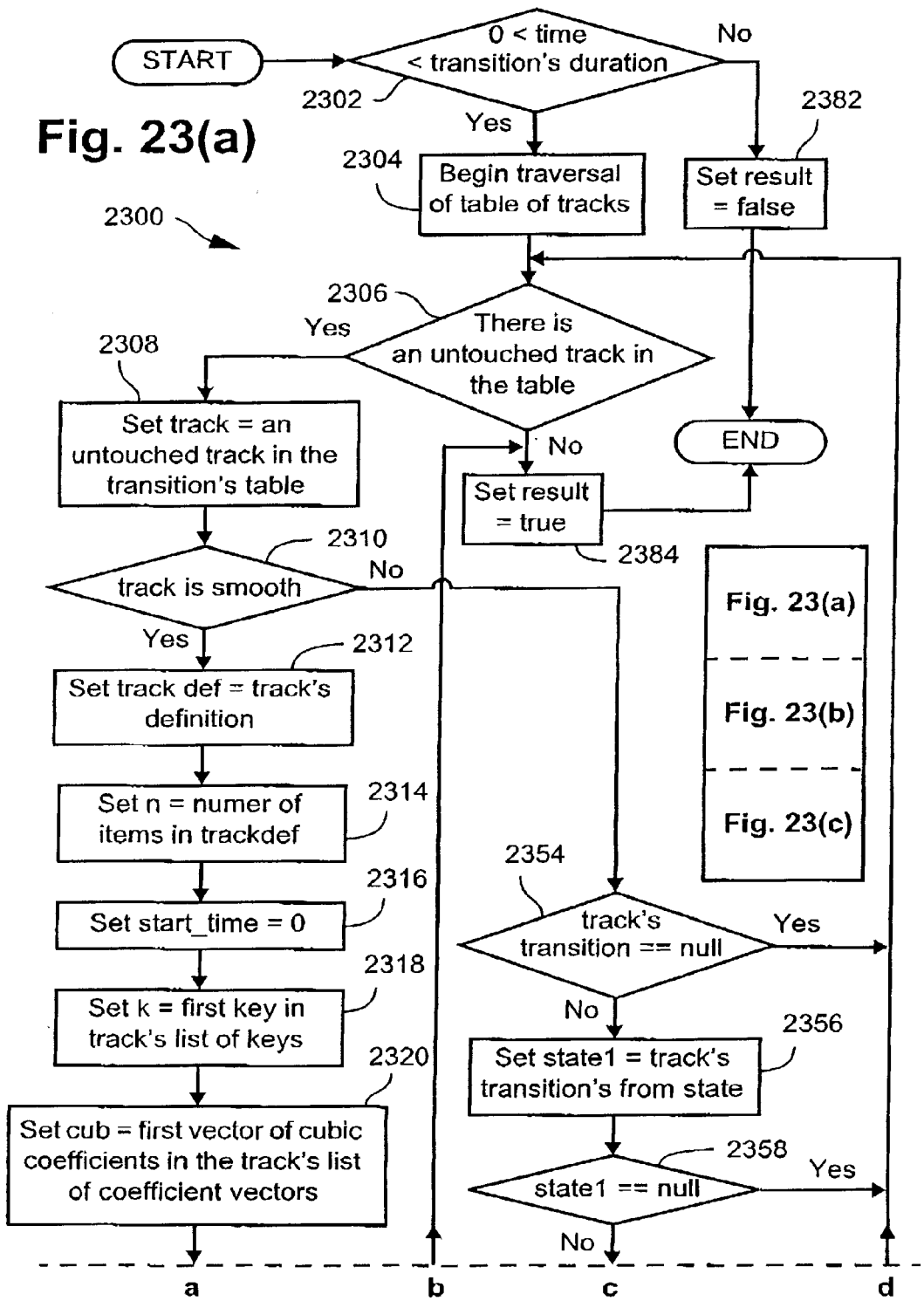
FIG. 23, including FIGS. 23(*a*) through 23(*c*), is a flow diagram showing a method of updating the state of a graphical object during a transition.
Figure 23C:
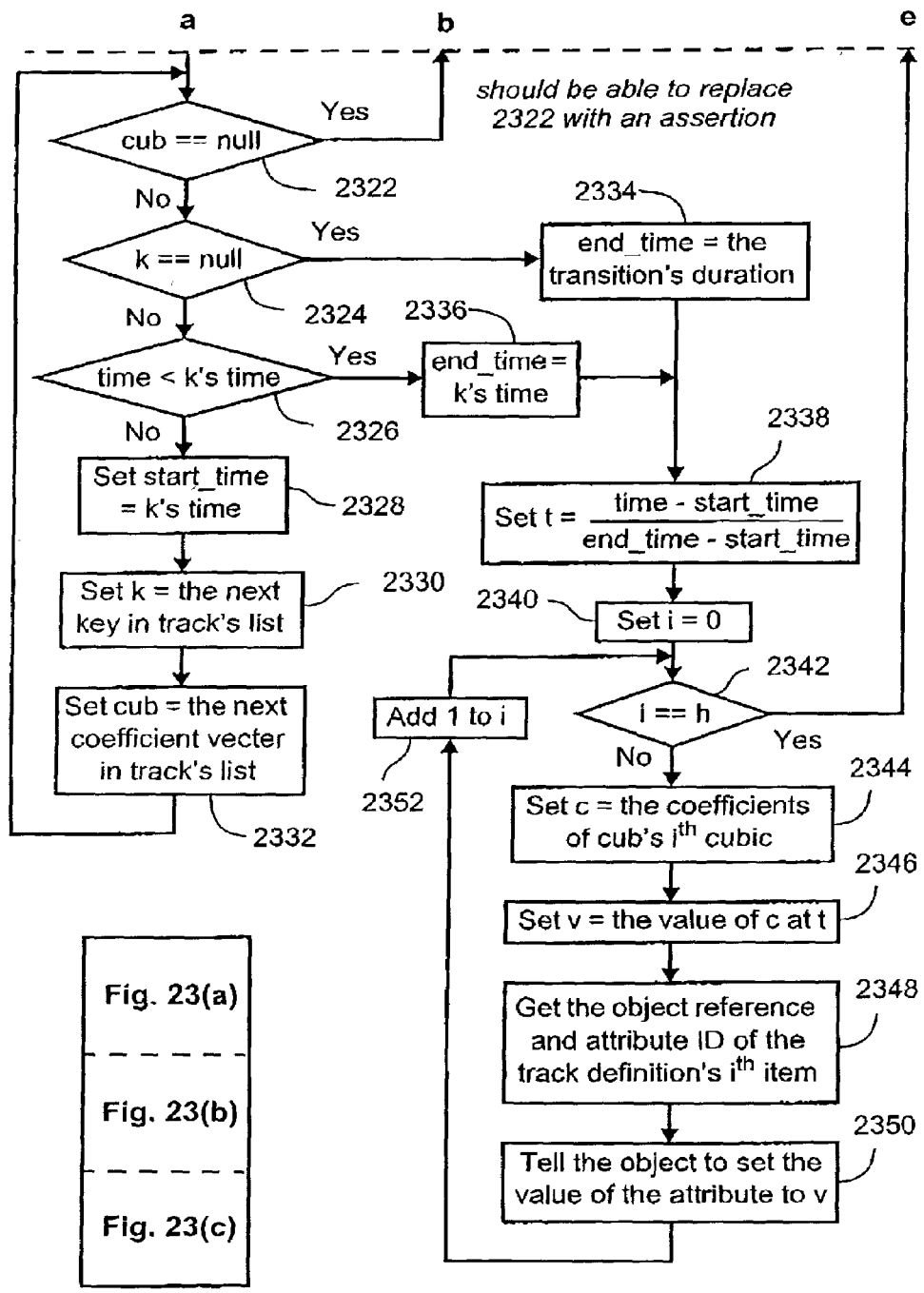

FIG. 23 is a flow chart showing the method 2300 of updating the state of a graphical object during a particular transition. The method 2300 is preferably implemented using software resident on the hard disk drive 1110 of the computer system 1100, the software being read and controlled in its execution by the processor unit 1105. The method 2300 returns a result flag indicating whether any graphical objects were updated (i.e. true), or whether an error occurred (i.e. false). The method 2300 begins at step 2302, where if time is greater than or equal to zero or less than or equal to the duration of the transition, then the method 2300 proceeds to step 2304. Otherwise, the method 2300 proceeds to step 2382, where the result flag is set to false and the method 2300 concludes.

At step 2304, the track objects associated with the transition are examined by traversing a table of track objects associated with the transition. At the next step 2306 if there are no unused track objects associated with the transition then the method 2300 proceeds to step 2384 where the result flag is set to true and the method 2300 concludes. Otherwise, the method 2300 proceeds to step 2308 where an argument track is set to a first unused track object in the track table associated with the transition. At the next step 2310 if the first unused track object represents a discrete track then the method 2300 proceeds to step 2354. Otherwise, if the unused track object represents a smooth track then the method 2300 proceeds to step 2312. At step 2312, an argument trackdef is set to the track definition of the selected track object. At the next step 2314, the argument n is set to the number of transition objects represented by the trackdef. At the next step 2316, the argument start_time representing the start time of selected unused track object is set to zero. At the next step 23 18, the argument k is set to the first key object in a list of key objects associated with the selected unused truck object. At the next step 2320, the argument cub is set equal to the first vector of cubic coefficients in a list of coefficient vectors associated with the selected unused track object. At the next step 2322, if cub is null, then the method 2300 proceeds to step 2384. Otherwise, the method 2300 proceeds to step 2324, where if k is null then the method 2300 proceeds to step 2334. If k is not null at step 2324, then the method 2300 proceeds to step 2326, where if time is less than the time represented by a time field associated with k then the method 2300 proceeds to step 2336. Otherwise, the method 2300 proceeds to step 2328, where start_time is set to the time represented by the field associated with k. At the next step 2330, k is set to the next key in the list of key objects associated with the selected unused track. At the next step 2332, cub is set to the next coefficient vector in the list of coefficient vectors associated with the selected unused track object.

At step 2334, the argument end_time representing the finish time of the selected unused track object is set to the duration of the transition and the method 2300 proceeds to step 2338.

At step 2336, the argument end_time representing the finish time of the selected unused track object is set to the time represented by the time field associated with k and the method 2300 proceeds to step 2338.

At step 2338, an argument t representing a normalised time (i.e. between 0 and 1) suitable for linear and cubic (Bezier) spline interpolation, is calculated as follows:

$$t = (time - start\_time)/end\_time - start\_time.$$

At the next step 2340, a counter i is set to 0. At the next step 2342, if i is equal to n then the method 2300 returns to step 2306. Otherwise, at the next step 2344, an argument c is set to the coefficients of the ith cubic of cub. At the next step 2346, an argument v is set to the value of c at t (i.e. $v = c0 + t \times (c1 + t \times (c2 + t \times c3))$). At the next step 2348, the object reference and attribute identifier associated with the ith track object of the track definition are examined. At the next step 2350, the value of the identified attribute associated with the referenced track object is set to v and the method 2300 proceeds to step 2352. At step 2352, the counter i is incremented by 1 and the method 2300 returns to step 2342.

As described above, at step 2310, if the first unused track object represents a discrete track then the method 2300 proceeds to step 2354. At step 2354, if the transition of the unused track object is null then the method 2300 returns to step 2306. Otherwise, the method 2300 proceeds to step 2356, where an argument state1 is set to the source state of the transition object associated with the unused track object. If state1 is null then the method 2300 returns to step 2306. Otherwise the method 2300 proceeds to step 2360. At step 2360, an argument skey1 is set equal to the key object which the table of key objects associated with state1 maps the track definition. At the next step 2362, if the unused track object has a list of key objects then the method 2300 proceeds to step 2364, where a pointer pk is set to point to the head of the list. Otherwise, if the unused track object does not have a list of key objects at step 2360 then the method 2300 proceeds to step 2380, where an Apply Method associated with the key object represented by skey1 is called and the method 2300 returns to step 2306. As described above, a key object maps object attribute pairs to associated graphical object attribute values. The Apply Method examines the object-attribute pairs stored in the key object represented by skey1 and sets the object attribute pairs to the corresponding graphical object attribute values. At the next step 2366, the argument k is set to the next key object in the list of key objects. At the next step 2368, if k is null then the method 2300 proceeds to step 2378 where the Apply Method of the last key object in the list in called and the method 2300 returns to step 2306. Otherwise, if k is not null then the method 2300 proceeds to step 2370. At step 2370, if time is less than or equal to the time represented by the time field associated with k the Apply Method associated with k is called and the method 2300 returns to step 2306. Otherwise, the method 2300 proceeds to step 2372, where the pointer pk is set to point to k representing current item in the list of key objects. At the next step 2374, k is set to the next entry in the list of key objects associated with the current unused track objects and the method 2300 returns to step 2368.

The aforementioned preferred methods comprise a particular control flow. There are many other variants of the preferred methods which use different control flows without departing the spirit or scope of the invention. Furthermore one or more of the steps of the preferred methods may be performed in parallel rather sequential.

As described above, the methods described with reference to FIGS. 1 to 11 and FIGS. 19 to 23, and using the event handler object classes described above, can be implemented as part of an application program executing in conjunction with a host graphical user interface system. An example of such an application program will now be described with reference to FIGS. 12 to 18. The example application program is configured as a digital image editing and pro-duction application program. The preferred host graphical user interface, for such an application program, is the Microsoft™ Windows graphical user interface where the main window of the graphical user interface is a Microsoft™ Windows application program. The example application program is preferably implemented using software resident on the hard disk drive 1110 of the computer system 1100, the software being read and controlled in its execution by the processor unit 1105. When the application program receives an input message, the application program is configured to call the key_down function. Subsequently, the key_down function calls the invoke procedure of the highest-level menu switch event handler object, passing the character code corresponding to the depressed key. The menu switch event handler object decides to which menu screen event handler object the message should be forwarded. The menu screen event handler object distinguishes between requests for the keyboard focus to be changed and requests for action to which the menu item event handler object with the focus should respond.

The example application program includes a number of different screens 1200, 1300, 1400, 1500, 1600, 1700 and 1800, as will be described below with reference to FIGS. 12 to 18. These screens can be displayed on the display device 1114 of the computer system 1100. In accordance with the methods described herein, each of the screens 1200, 1300, 1400, 1500, 1600, 1700 and 1800, has an associated screen event handler object and each of the screen event handler objects is an instance of a class derived from a base menu screen event handler object.

Figure 12:
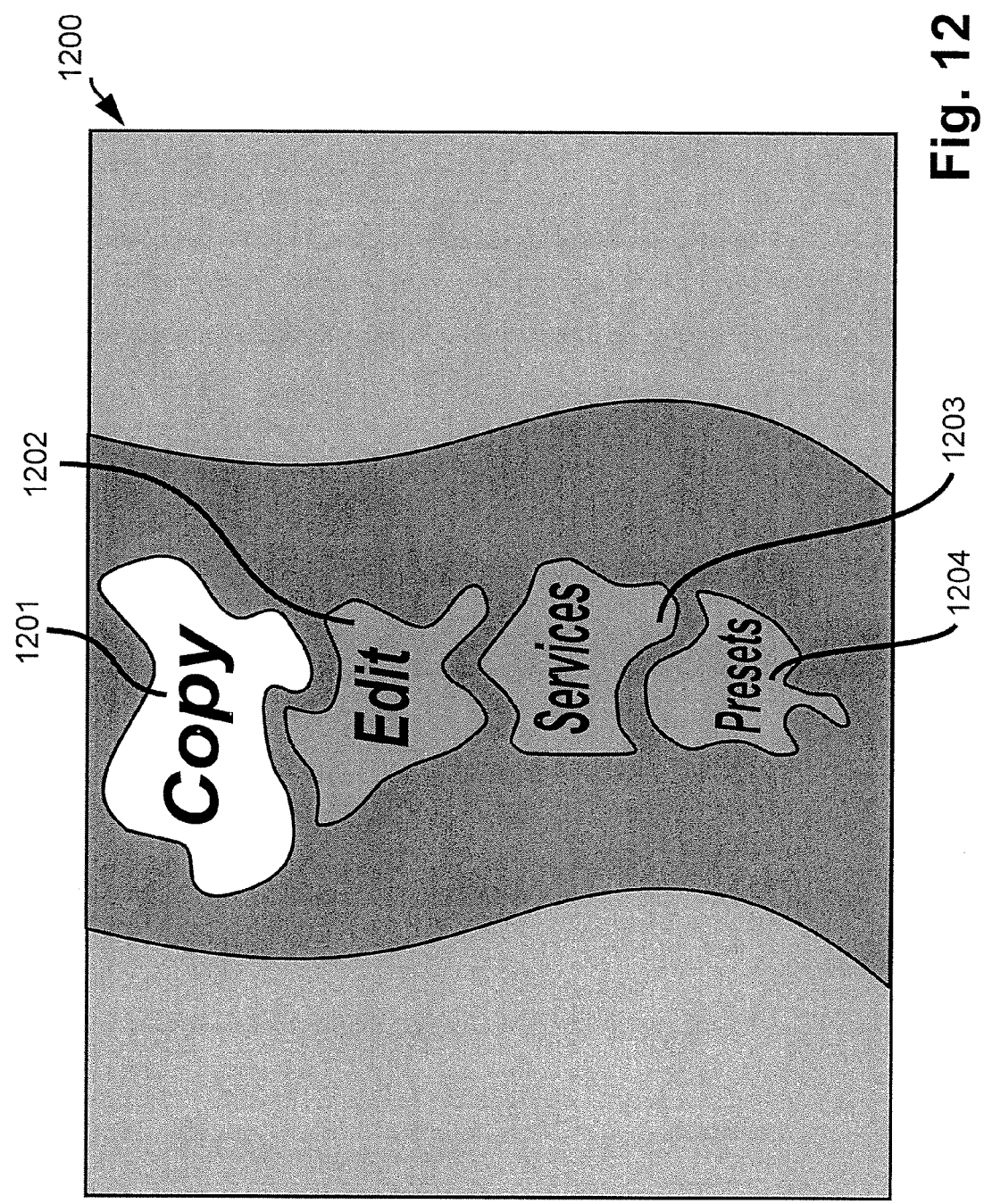
FIG. 12 shows a screen with four menu items, configured in accordance with an application program implemented using the methods of FIGS. 1 to 10 and FIGS. 19 to 23.

FIG. 12 shows a menu screen 1200 with four menu items 1201, 1202, 1203 and 1204, where each of the four items 1201 to 1204 is rendered on the display 1114 using a number of graphical object components in a conventional manner. As will be explained below, each of the four items 1201 to 1204, has an associated screen 1200, 1400, 1500 and 1600 shown in FIGS. 12, 14, 15 and 16, respectively, when the respective item is active (ie. the graphical object components associated with the item are visible and the item has the focus). Further, each of these menu items 1201 to 1204 responds to an action request by changing which menu screen has the focus.

Figure 13:
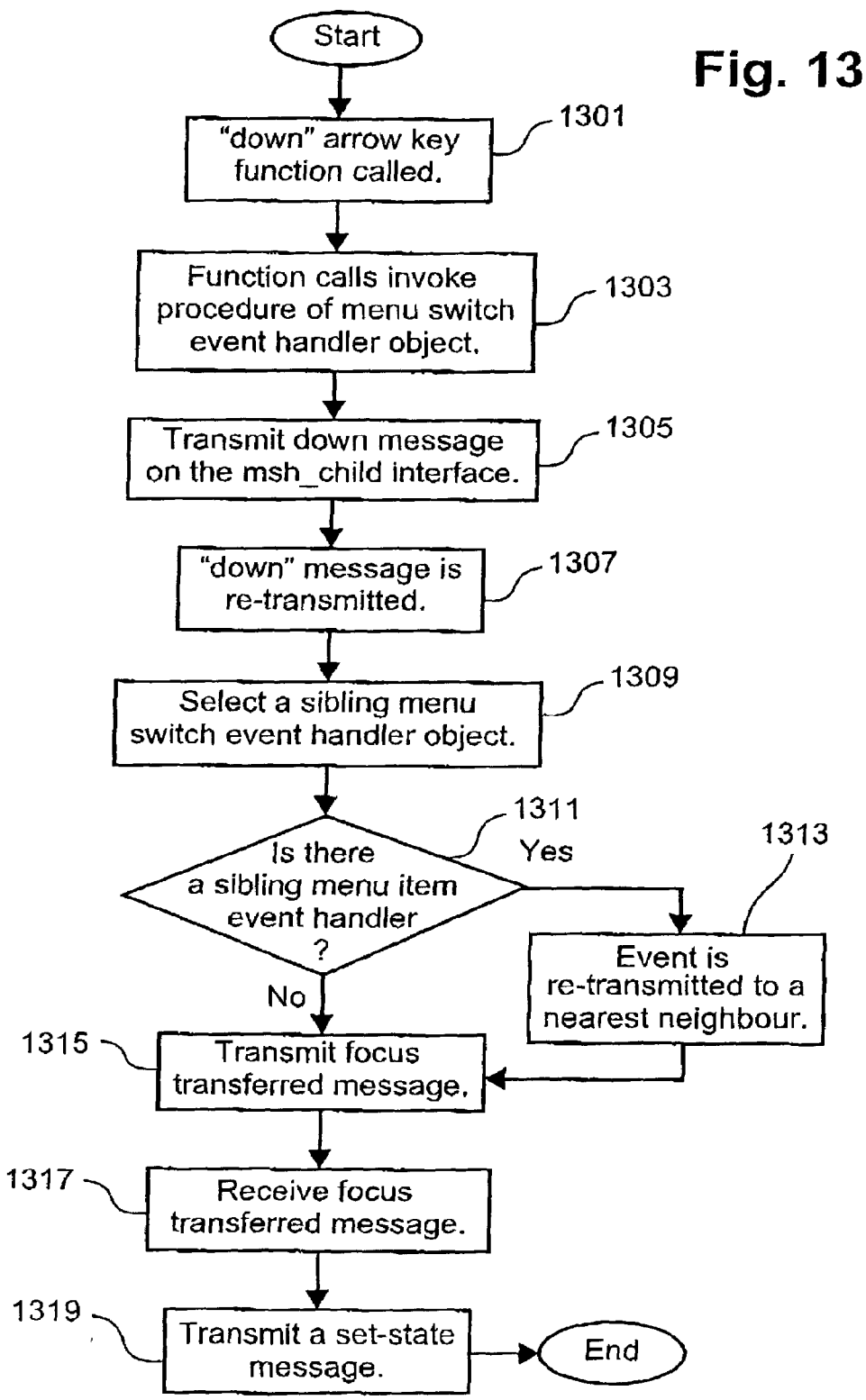
FIG. 13 is a flow chart showing a process performed when a user presses the down arrow key on the keyboard of FIG. 11, if the screen of FIG. 12 is being displayed.

The screen 1200 shows the item 1201 as active. Each of the items 1201 to 1204 can be selected by a user utilising a mouse 1103 or a keyboard 1102 press in a conventional manner. The menu items 1201 to 1204 are configured as a "copy" button, an "edit" button, a "services" button and a "presets" button, respectively. In accordance with the example application program, the items 1201 to 1204 are configured to transfer focus to their nearest neighbour in a specified direction upon a focus request For example, FIG. 13 is a flow chart showing the process 1300 performed when the user presses the down arrow key on the keyboard 1102, if the screen 1200 is being displayed. The process 1300 begins at step 1301, where the user presses the down arrow key on the keyboard 1102, and the host graphical user interface passes a message to the application program, which calls a function provided for the purpose of interpreting arguments resulting from keyboard presses. At the next step 1303, the function calls the "invoke" procedure of the top-level menu switch event handler object, passing the interface identifier "msh_raw_input", the signal identifier "key_down", and information which identifies the pressed key. At step 1305, the data field identifying the menu screen event handler associated with the item 1201 which currently has the focus is examined and a "down" message is trans-mitted on the "msh_child" interface to the menu screen event handler object which has the focus.

At the next step 1307, the menu screen event handler object associated with the item 1201 receives the message on the "mh_parent" interface associated with the menu screen event handler object. The invoke procedure of the menu screen event handler object associated with the item 1201 selects the menu item event handler object that cur-rently has the focus and re-transmits the "down" message to the selected menu item event handler object on the "mh_child" interface. At the next step 1309, the selected menu item event handler object receives the message on the "mih_parent" interface associated with the selected menu item event handler object (i.e. associated with the item 1201) and the "invoke" procedure of the selected menu item event handler object selects a sibling menu item event handler object that is recorded as the focus recipient in the "down" direction from the menu item event handler object associ-ated with the item 1201. At the next step 1311, if there is a sibling menu item event handler object, then the process 1300 proceeds to step 1313. At step 1313, the menu item event handler object associated with the item 1201, emits a "set_focus" message to the sibling menu item event handler object on the "fh_giver" interface. The sibling menu item event handler object receives the signal on the "fh_taker" interface associated with the sibling menu item event han-dler object, and the "invoke" procedure of the menu item event handler object associated with the item 1201, re-transmits the event to a nearest neighbour in the direction specified by the argument resulting from the keyboard press (i.e. down in this example), and the process 1300 continues at step 1315

Figure 14:
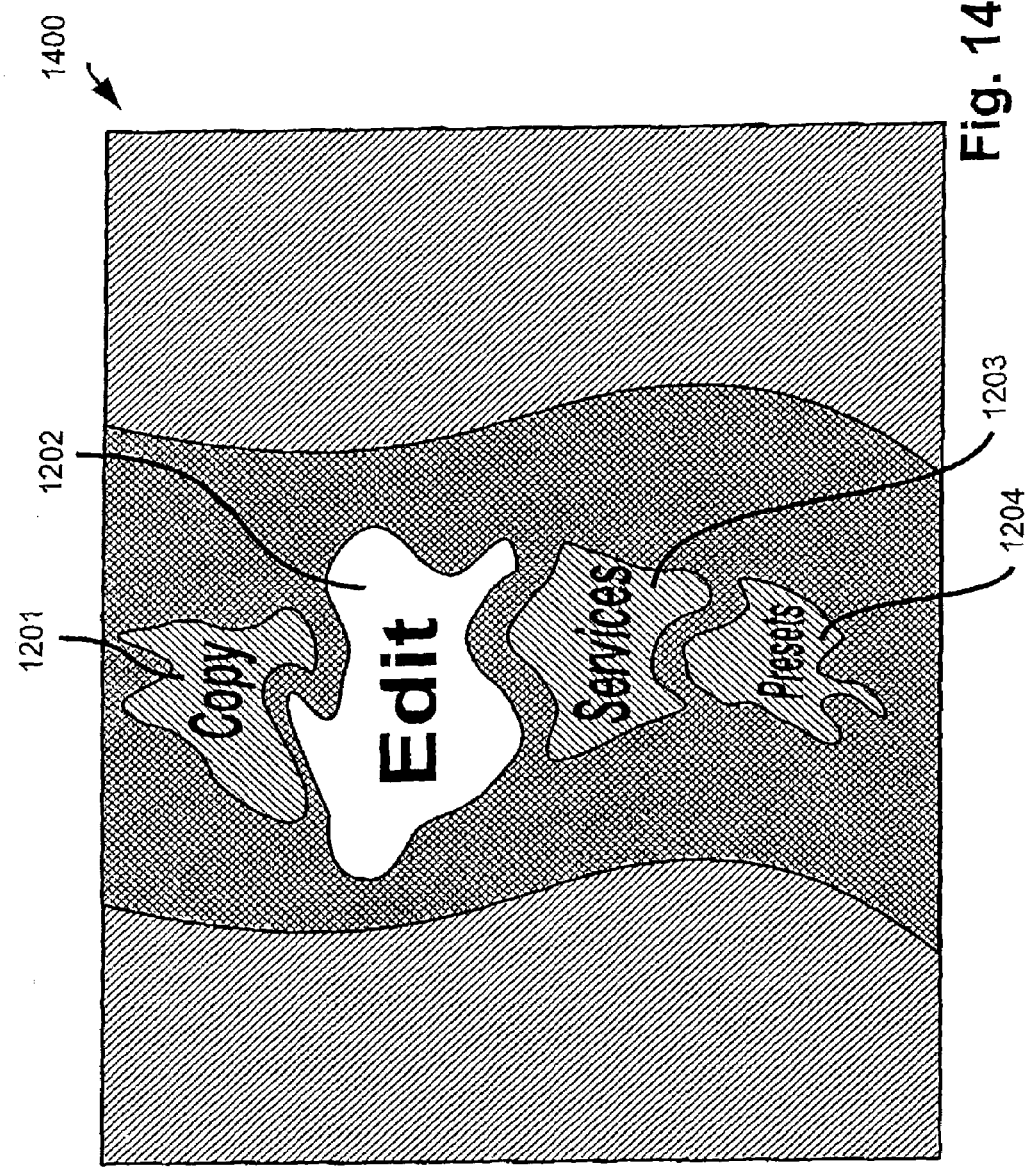
FIG. 14 shows another screen with four menu items, configured in accordance with the application program of FIG. 12.
Figure 15:
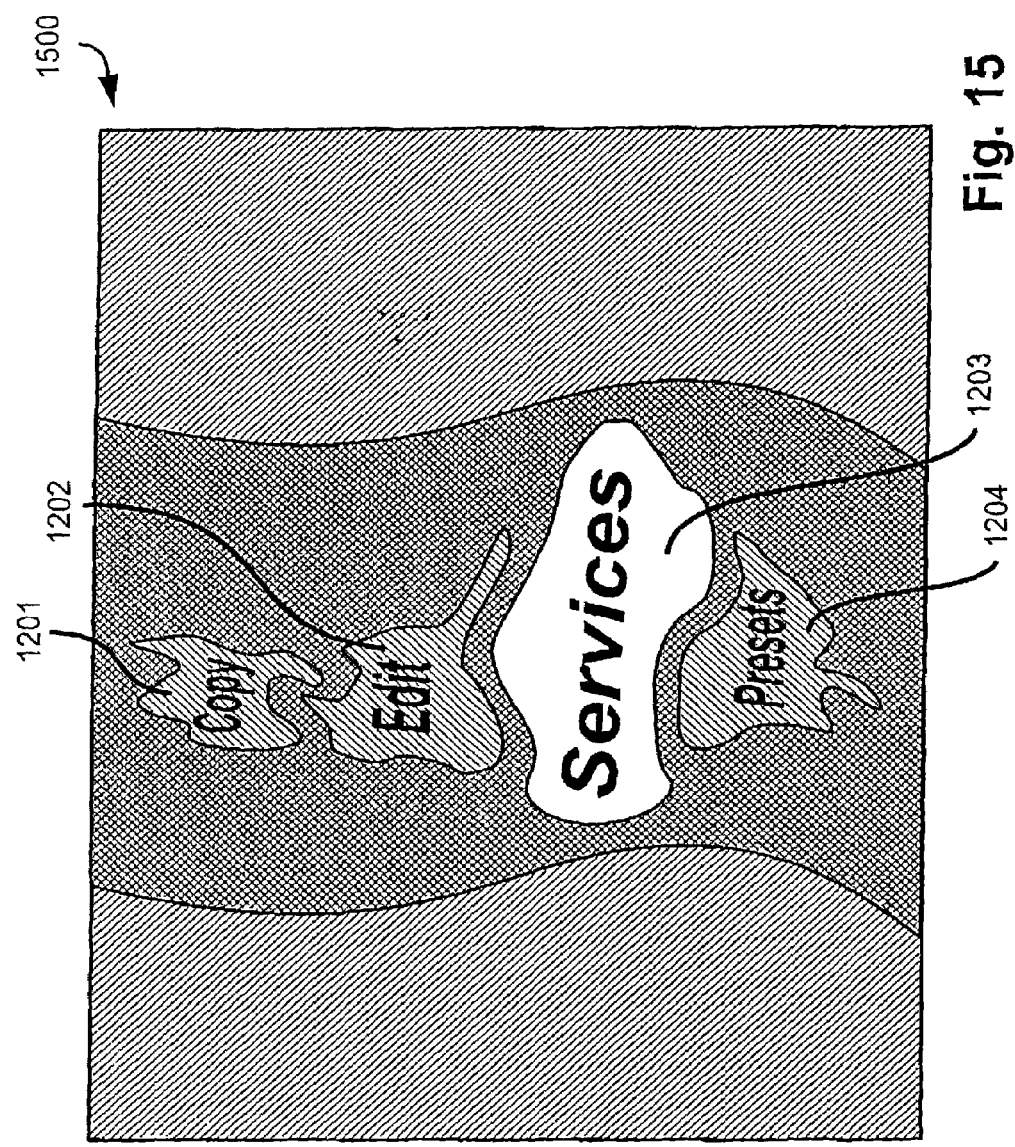
FIG. 15 shows another screen with four menu items, configured in accordance with the application program of FIG. 12.
Figure 16:
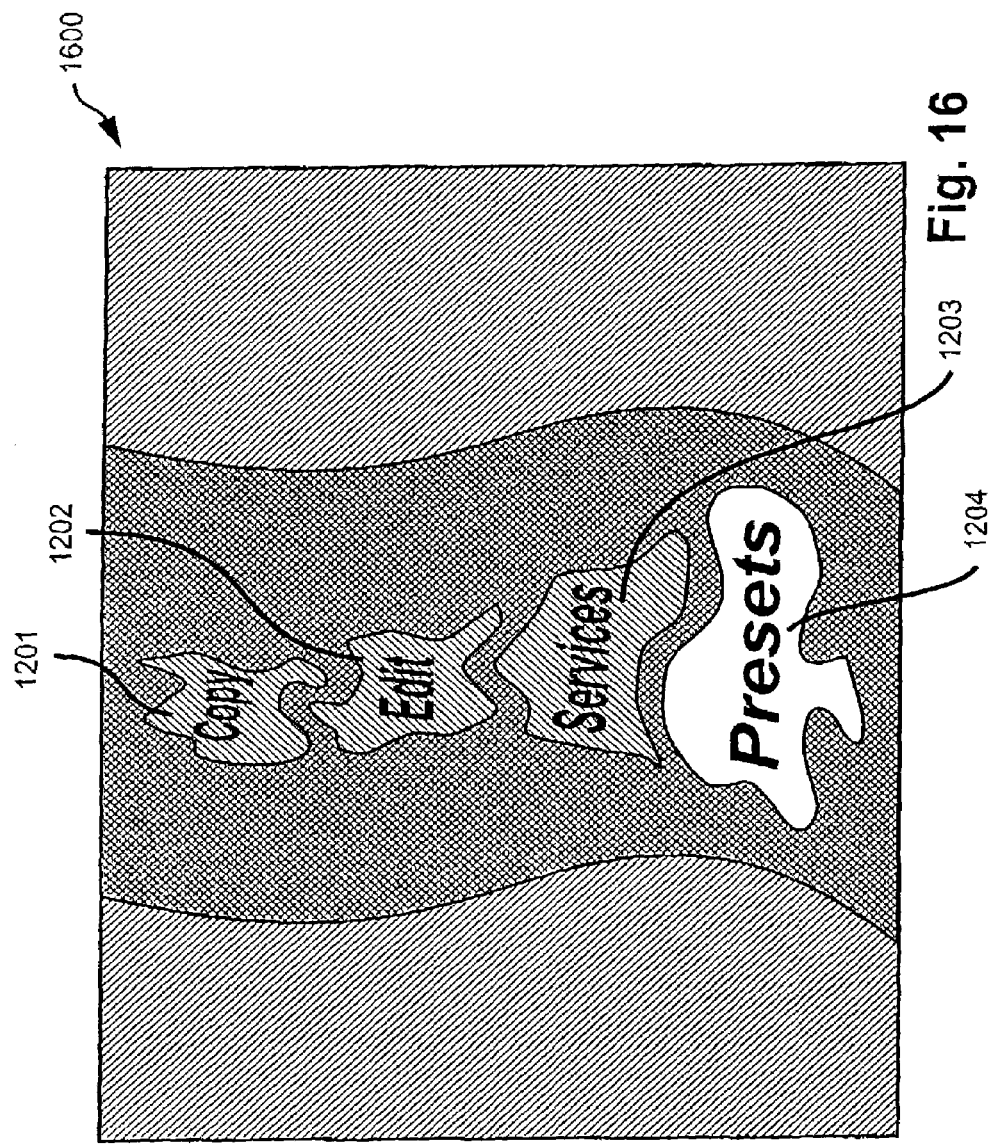
FIG. 16 shows another screen with four menu items, configured in accordance with the application program of FIG. 12.
Figure 17:
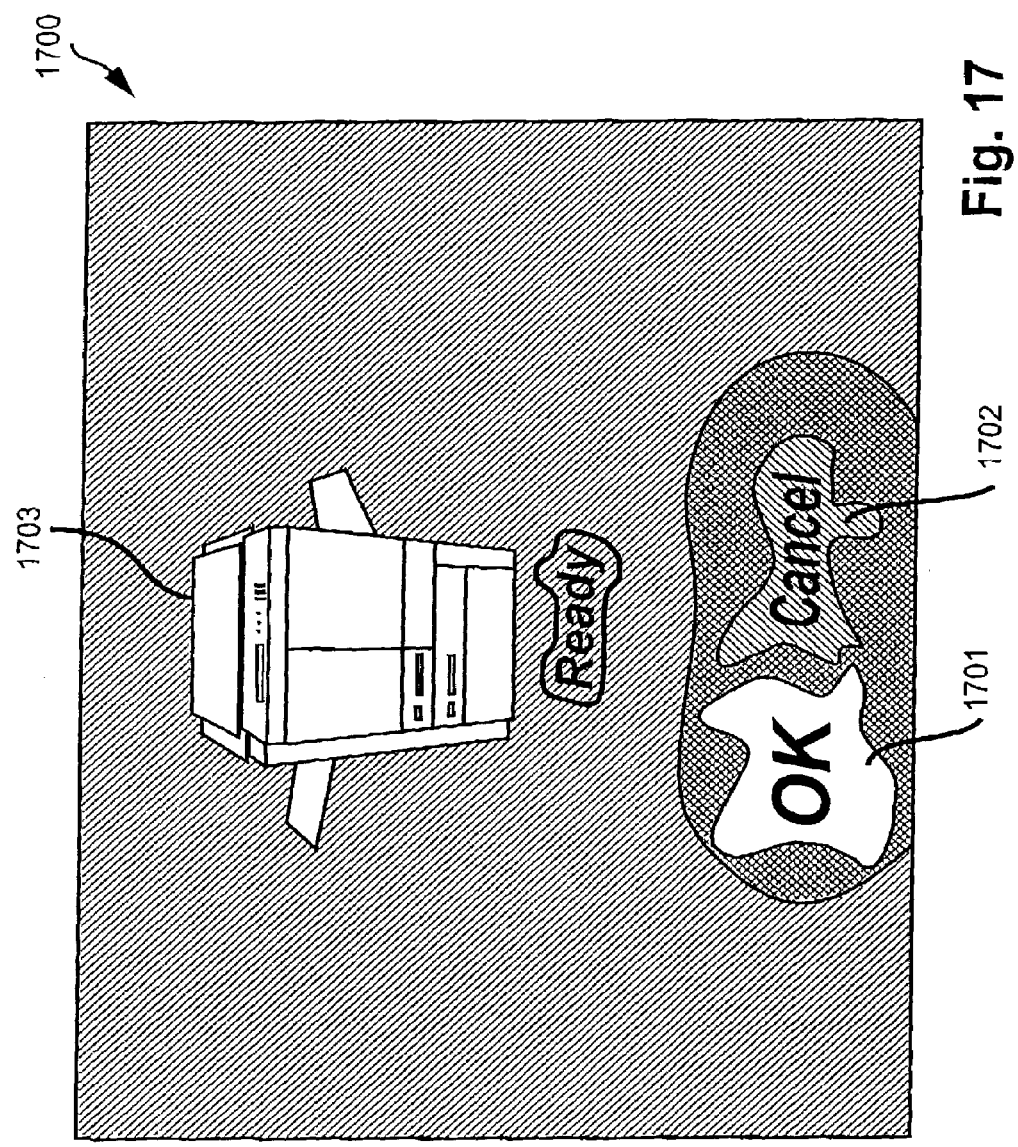
FIG. 17 shows another screen with two menu items, configured in accordance with the application program of FIG. 12.

Otherwise, after step 1311 the process 1300 proceeds directly to step 1315, where the "invoke" procedure of the menu item event handler object associated with the item 1201 transmits a "focus_transferred" message on the "mih-_parent" interface associated with the menu item event handler object of the item 1201. At the next step 1317, the menu screen event handler object associated with the item 1201, receives the "focus_transferred" message on the "mh_child" interface associated with that menu screen event handler object At the next step 1319, the invoke procedure of the menu screen event handler object associated with the item 1201, emits a set-state message to all children menu screen event handler objects, passing an argument to indicate which state any associated graphical objects should change (i.e. active or inactive). In accordance with the present example, the child menu item event handler object associated with the item 1202 changes the state of any associated graphical objects, resulting in the screen 1400 as shown in FIG. 14.

An action request on the item 1201 results in the screen 1700 being displayed. The screen 1700 includes two asso-ciated menu items, "OK" 1701 and cancel 1702. An action request on the OK item 1701 causes an animation of a copier 1703, in the process of printing, to be displayed. An action request on the cancel item 1702 results in a change to the focus from the screen 1700 to whichever menu screen had the focus previously (i.e. in accordance with this example, the screen 1200).

Figure 18:
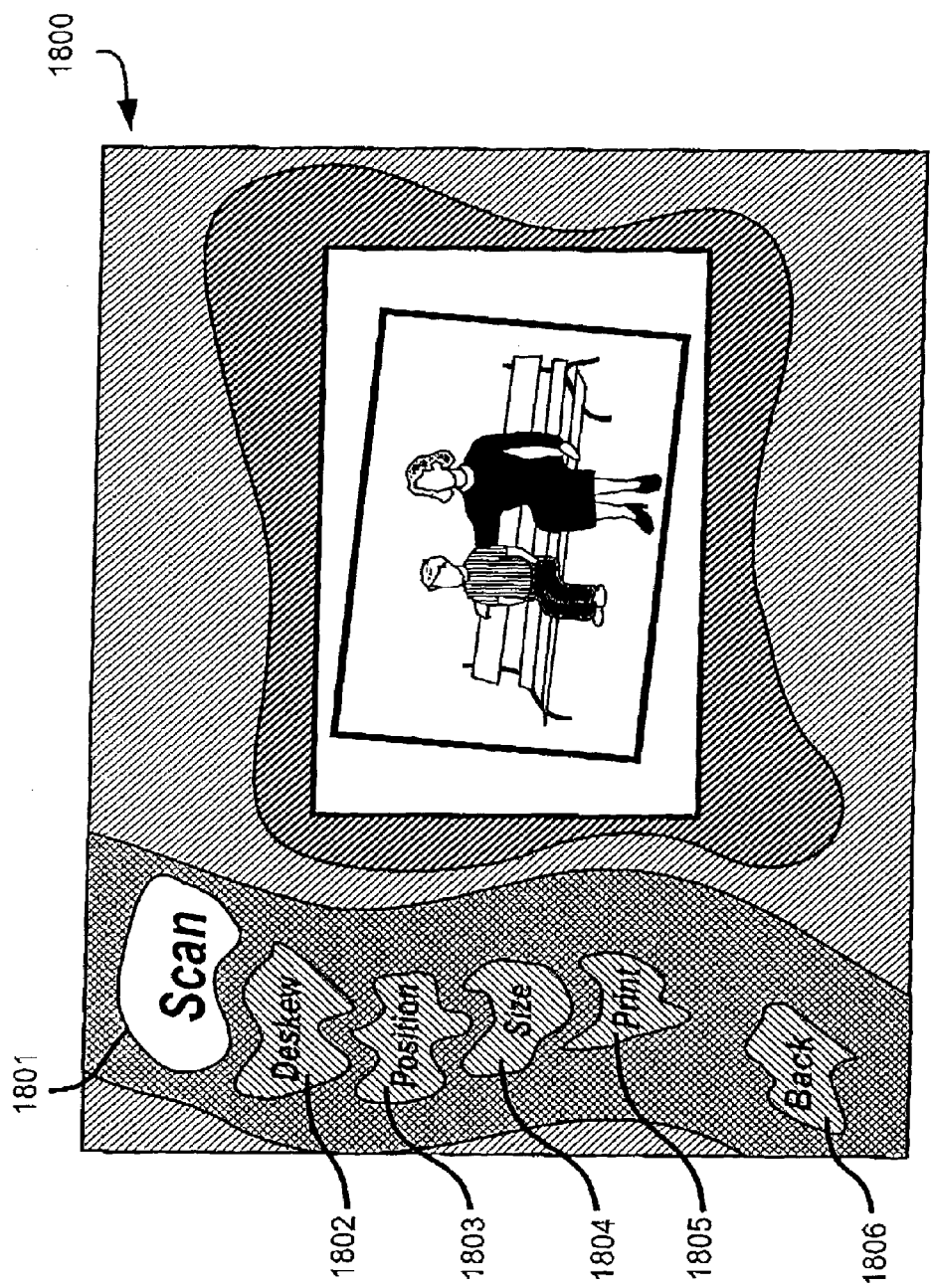
FIG. 18 shows another screen with six menu items, configured in accordance with the application program of FIG. 12.

An action request on the item 1202 results in the display of an edit screen 1800, as shown in FIG. 18, which has six menu items 1801 to 1806, of which two (i.e. scan 1801 and Back 1806), are always visible. The remaining four menu items (i.e Deskew 1802; Position 1803; Size 1804 and Print 1805), only become visible once the scan item has been activated, as shown in FIG. 18. An edit screen event handler object associated with the edit screen 1800 is an instance of a subclass of menu screen event handler objects modified so that an image appears on the display screen when the scan item is activated An action request on the item 1203 results in a services screen (not shown) being displayed on the display device 1114. The services screen has a total of four menu items (i.e. Order Toner; Order Paper, Call Technician, and Back). An action request on the call technician item results in a video of a person wearing a headset and talking to be displayed. An action request on the back item results in a change to the focused menu screen to whichever menu screen had the focus previously.

An action request on the item 1204 results in a presets screen (not shown) being displayed on the display device 1114. The presets screen has a total of five menu items (i.e. Leave Form; Organisation Chart, Telephone List, and Back).

The methods described with reference to FIGS. 1 to 18 can be used to construct radio buttons, as known in the field of image processing, activated by mode events within an application program. In this instance, when such an application receives input messages (eg. a message of the known types WM_MOUSEDOWN, WM_MOUSEUP, or WM_MOUSEMOVE), the application program attempts to call functions called mouse_down, mouse_up, and mouse_move respectively. Generally, two protocols are defined by a host graphical user interface system for distributing and responding to mouse events. These two protocols will hereinafter be referred to as "mouseraw" and "mousecooked" and are configured for processing raw and processed mouse events, respectively. The term raw mouse events refer to mouse events such as a click on a mouse button which results in a signal that is subsequently processed by an event handler object. A processed mouse event is a mouse event which has been forwarded to an event handler object after being processed by an intermediate event handler object. In accordance with the methods described herein, the "mouseraw" protocol preferably has two sides, identified as "parent" and "child" each having two sides identified as "sender" and "receiver".

Four event handler objects for processing raw and processed mouse events associated with radio buttons, will be described below. These are referred to as a mouse distribution event handler object, a mouse region event handler object, a radio button event handler object and a radio group event handler object.

The mouse distribution event handler object can be used to process mouse events. Such an event handler object preferably has an interface which uses the "parent" side of the mouseraw protocol and another interface which uses the "child" side of the mouseraw protocol. In accordance with the methods described herein, a mouse distribution event handler object receives notification of mouse events on the "child" interface and forwards the notification as a message to at least one event handler object associated with the "parent" interface of the mouse distribution event handler object. The mouse distribution event handler object can store information in order to perform 'hit-testing' in order to determine which of a number of associated event handler objects should receive the notified mouse event. Alternatively, the mouse distribution event handler object can send the notified mouse event to each event handler object associated with the sending mouse event handler object in turn, until one of the associated mouse distribution event handler objects accepts the mouse event.

The mouse region event handler object can be used to process raw mouse events. The mouse region event handler object preferably has an interface conforming to the "child" side of the "mouseraw" protocol and another interface conforming to the "sender" side of the "mousecooked" protocol. The mouse region event handler object receives "mouse_down", "mouse_up", and "mouse_move" messages, and in response to these messages can emit "pressed", "clicked", "released", "entered", and "exited" messages. An invoke procedure associated with the mouse region event handler object can be used to perform the processing necessary to emit the "pressed", "clicked", "released", "entered", and "exited" messages.

The radio button event handler object can be used to receive processed mouse events. The radio button event handler object preferably has an interface conforming to the "receiver" side of the "mousecooked" protocol to receive the processed mouse events. The radio button event handler object preferably has another interface which uses another protocol to emit "state_changed" messages and to receive "set_state" messages. When the radio button event handler object receives a "clicked" message on an interface, the radio button event handler object changes the state of any graphical objects associated with the radio button event handler object and emits a "state_changed" message on a "group member" interface.

The radio group event handler object can be used to receive "state_changed" messages and to emit "set_state" messages. Such an event handler object has an interface which uses one side of a protocol to receive "state_changed" messages and to emit "set_state" messages. When the radio group event handler object receives a "state_changed" messages, the radio group event handler object sends a "set_state" message to all other radio button event handler objects associated with the radio group event handler object, passing a set flag as an extra argument. When each of the radio button event handler objects receive the "set_state" signal, the receiving radio button event handler object examines the extra argument and, upon finding a set flag, changes the state of any graphical objects associated with the radio button event handler object to the up state.

In accordance with the methods described herein, the radio group event handler object and the radio button event handler object have no effect on the behaviour of any containing application associated with the event handler objects except for the effect on the state of any graphical objects associated with the event handler objects. inheritance can also be used to create a subclass of radio group event handler objects, which may have additional interfaces, to result in other processes being performed.

The methods of FIGS. 1 to 10 may alternatively be implemented in dedicated hardware such as one or more integrated circuits performing the functions or sub functions of FIGS. 1 to 10. Such dedicated hardware may include graphic processors, digital signal processors, or one or more microprocessors and associated memories.

The foregoing describes only some arrangements of the present invention, and modifications and/or changes can be The claims defining the invention are as follows:

1. A computer-implemented method of connecting a first object to a second object, said method comprising the steps of:
   determining if a communications protocol identified by a first one of a plurality of interfaces associated with the first object is the same as a communications protocol identified by a second one of a plurality of interfaces associated with the second object, wherein each of the interfaces associated with the first and second objects is identified by an associated interface identifier;
   determining if the first and second interfaces each identify different sides of the communications protocol using the interface identifiers associated with each of the first and second interfaces; and
   modifying the interface identifiers associated with each of the first and second interfaces to map the first object to the second interface and map the second object to the first interface based on the determining steps, thereby connecting the first object to the second object.

2. A method according to claim 1, wherein the interface identifier corresponding to the second object is associated with the first interface of the first object.

3. A method according to claim 1, wherein the interface identifier corresponding to the first object is associated with the second interface of the second object.

4. A method according to claim 1, wherein the mappings are performed in conjunction with execution of an application program associated with at least one of the first and second objects.

5. A method according to any one of claims 2 and 3, wherein said modifying step comprises the sub-step of updating a table associated with each of the first and second interfaces of the first and second objects.

6. A method according to claim 5, wherein the interface identifier corresponding to the first interface is added to the table associated with the second interface of the second object.

7. A method according to claim 5, wherein the interface identifier corresponding to the second interface is added to the table associated with the first interface of the first object.

8. A method according to claim 1, wherein the communications protocol identified by interface identifiers corresponding to the first and second interfaces defines a manner in which messages can be sent and received by the first and second objects.

9. A method according to claim 8, wherein the first object sends a message to the second object by calling at least one function associated with the second object.

10. A method according to claim 9, wherein at least one function associated with the first object sends a message to at least one other object having an associated interface conforming to a suitable side of the communications protocol identified by the interface identifiers corresponding to the first and second interface.

11. A method according to claim 9, wherein at least one function associated with the first object sends a message to a plurality of other objects having an associated interface conforming to a suitable side of the communications protocol identified by the interface identifiers corresponding to the first and second interfaces.

12. A method according to claim 9, wherein at least one function associated with the first object sends a message to each of a plurality of other objects having an associated interface conforming to a suitable side of the compatible communications protocol identified by the interface identifiers corresponding to the first and second interface.

13. A method according to claim 12, wherein at least one object having an associated interface conforming to a suitable side of the compatible communications protocol identified by the interface identifiers corresponding to the first and second interface is excluded from receiving a message from the first object.

14. A method according to claim 1, wherein at least one of the first and second objects is a graphical object.

15. A method according to claim 1, wherein the first object is associated with an application program and wherein said mapping step includes performing the association of the first and second mapping in conjunction with execution of the application program.

16. A method according to claim 1, wherein the mappings are performed dynamically.

17. An apparatus for connecting a first object to a second object, said apparatus comprising:
   a processor assembly comprising at least one processor, arranged for determining if a communications protocols identified by a first one of a plurality of interfaces associated with the first object is the same as a communications protocol identified by a second one of a plurality of interfaces associated with the second object, each of the plurality of interfaces associated with the first and second objects being identified by an associated interface identifier, and for determining if the first and second interfaces each identify different sides of that communications protocol using the interface identifiers associated with each of the first and second interfaces, and for modifying the interface identifiers associated with each of the first and second interfaces to map the first object to the second interface and map the second object to the first interface based on the determinations, thereby connecting the first object to the second object.

18. An apparatus according to claim 17, wherein the interface identifier corresponding to the second object is associated with the first interface of the first object.

19. An apparatus according to claim 17, wherein the interface identifier corresponding to the first object is associated with the second interface of the second object.

20. An apparatus according to claim 17, wherein the mappings are performed in conjunction with execution of an application program associated with at least one of the first and second objects.

21. An apparatus according to any one of claims 18 and 19, said processor assembly further comprising means for updating a table associated with each of the first and second interfaces of the first and second objects.

22. An apparatus according to claim 21, wherein the interface identifier corresponding to the first interface is added to the table associated with the second interface of the second object.

23. An apparatus according to claim 21, wherein the interface identifier corresponding to the second interface is added to the table associated with the first interface of the first object.

24. An apparatus according to claim 17, wherein the communications protocol identified by the first and second interface defines a manner in which messages can be sent and received by the interface identifiers corresponding to the first and second objects.

25. An apparatus according to claim 24, wherein the first object sends a message to the second object by calling at least one function associated with the second object.

26. An apparatus for connecting a first object to a second object, said apparatus comprising:
a memory for storing a program; and
a processor for executing the program, the program comprising:
code for determining if a communications protocol identified by a first one of a plurality of interfaces associated with the first object is the same as a communications protocol identified by a second one of a plurality of interfaces associated with the second object, wherein each of the plurality of interfaces associated with the first and second objects is identified by an associated interface identifier;
code for determining if the first and second interfaces each identify different sides of the communications protocol using the interface identifiers associated with each of the first and second interfaces; and
code for modifying the interface identifiers associated with each of the first and second interfaces to; map the first object to the second interface and map the second object to the first interface, based on the determinations, thereby connecting the first object to the second object.

27. An apparatus according to claim 17, wherein the mappings are performed dynamically.

28. A computer program stored in a computer-readable storage medium, for making a computer execute a procedure to connect a first object to a second object, said program comprising:
code for determining if a communications protocols identified by a first one of a plurality of interfaces associated with the first object is the same as a communications protocol identified by a second one of a plurality of interfaces associated with the second object, wherein each of the plurality of interfaces associated with the first and second objects is identified by an associated interface identifier;
code for determining if the first and second interface each identifiers different sides of the communications protocol using the interface identifiers associated with each of the first and second interfaces; and
code for modifying the interface identifiers associated with each of the first and second interfaces to map the first object to the second interface and map the second object to the first interface, based on the determination, thereby connecting the first object to the second object.

29. A program according to claim 28, wherein the interface identifier corresponding to the second object is associated with the first interface of the first object.

30. A program according to claim 28, wherein the interface identifier corresponding to the first object is associated with the second interface of the second object.

31. A program according to claim 28, wherein the mappings are performed in conjunction with execution of an application program associated with at least one of the first and second objects.

32. A program according to any one of claims 29 and 30, further comprising code for updating a table associated with each of the first and second interfaces of the first and second objects.

33. A program according to claim 32, wherein the interface identifier corresponding to the first interface is added to the table associated with the second interface of the second object.

34. A program according to claim 32, wherein the interface identifier corresponding to the second interface is added to the table associated with the first interface of the first object.

35. A program according to claim 28, wherein the communications protocol identified by the interface identifiers corresponding to the first and second interface defines a manner in which messages can be sent and received by the first and second objects.

36. A program according to claim 35, wherein the first object sends a message to the second object by calling at least one function associated with the second object.

37. A program according to claim 28, wherein said program is resident in memory of an apparatus and is executed by a processor of the apparatus.

38. A program according to claim 28, wherein the first object is associated with an application program, and wherein the mapping is performed in conjunction with execution of the application program.

39. A program according to claim 28, wherein the mappings are performed dynamically.

* * * * *

UNITED STATES PATENT AND TRADEMARK OFFICE
CERTIFICATE OF CORRECTION

| | | |
|---|---|---|
| PATENT NO. | : 7,225,447 B2 | |
| APPLICATION NO. | : 10/234199 | |
| DATED | : May 29, 2007 | |
| INVENTOR(S) | : Martin Paul Tlaskal et al. | |

It is certified that error appears in the above-identified patent and that said Letters Patent is hereby corrected as shown below:

<u>ON COVER PAGE AT (57) ABSTRACT</u>

Line 2, "disclosed" should read --disclosed.--.

<u>SHEET 37</u>

FIG. 24, "intefaces" should read --interfaces.--.

<u>COLUMN 3</u>

Line 8, "interface" should read --interface.--.

<u>COLUMN 4</u>

Line 58, "schematic block diagram of" should read --flow diagram showing--.

<u>COLUMN 5</u>

Line 44, "stated" should read --state--; and
    Line 46, "diagram" should read --chart--.

<u>COLUMN 6</u>

Line 26, "(i.e" should read --(i.e.--; and
    Line 35, "arc" should read --are--.

<u>COLUMN 7</u>

Line 15, "1116" should read --1116.--;
    Line 25, "IBM-PC's" should read --IBM-PCs--; and
    Line 39, "media" should read --media.--.

<u>COLUMN 8</u>

Line 36, "identifier Each" should read --identifier. Each--.

<u>COLUMN 9</u>

Line 56, "identifier" should read --identifier.--.

UNITED STATES PATENT AND TRADEMARK OFFICE
CERTIFICATE OF CORRECTION

PATENT NO. : 7,225,447 B2
APPLICATION NO. : 10/234199
DATED : May 29, 2007
INVENTOR(S) : Martin Paul Tlaskal et al.

It is certified that error appears in the above-identified patent and that said Letters Patent is hereby corrected as shown below:

COLUMN 10

Line 4, "parameters" should read --parameters:--; and
    Line 66, "both," should read --both--.

COLUMN 14

Line 50, "has" should be deleted.

COLUMN 17

Line 15, "handler object class" should read --handler object class.--; and
    Line 65, "an" should read --a--.

COLUMN 18

Line 17, "820" should read --820.--;
    Line 27, "concludes" should read --concludes.--; and
    Line 39, "concludes" should read --concludes.--.

COLUMN 19

Line 36, "screens which can be" should read --screens--.

COLUMN 21

Line 27, "mh_raw_input:" should read --msh_raw_input:--.

COLUMN 27

Line 1, "(i.e" should read --(i.e.--;
    Line 12, "S" should be deleted;
    Line 55, "rip" should read --$r_{ip}$--; and
    Line 62, "2020" should read --2020,--.

COLUMN 28

Line 7, "2076" should read --2076.--;
    Line 62, "Imp." should read --tmp.--; and
    Line 65, "imp." should read --tmp.--.

UNITED STATES PATENT AND TRADEMARK OFFICE
CERTIFICATE OF CORRECTION

PATENT NO.      : 7,225,447 B2
APPLICATION NO. : 10/234199
DATED           : May 29, 2007
INVENTOR(S)     : Martin Paul Tlaskal et al.

It is certified that error appears in the above-identified patent and that said Letters Patent is hereby corrected as shown below:

COLUMN 29

Line 30, "tr" should read --$t_r$--;
Line 39, "tr" should read --$t_r$--; and
Line 47, "is" should be deleted.

COLUMN 30

Line 26, "update needed" should read --update_needed--.

COLUMN 31

Line 49, "23 18," should read --2318,--; and
Line 51, "truck" should read --track--.

COLUMN 33

Line 48, "(ie." should read --(i.e.--; and
Line 61, "request" should read --request.--.

COLUMN 34

Line 41, "1315" should read --1315.--.

COLUMN 35

Line 8, "(i.e" should read --(i.e.--;
Line 14, "activated" should read --activated.--;
Line 18, "Toner;" should read --Toner,--;
Line 26, "five" should read --four--;
Line 27, "Form;" should read --Form,--; and
Line 32, "(eg." should read --(e.g.--.

COLUMN 37

Line 58, "interface." should read --interfaces.--.

UNITED STATES PATENT AND TRADEMARK OFFICE
CERTIFICATE OF CORRECTION

PATENT NO. : 7,225,447 B2
APPLICATION NO. : 10/234199
DATED : May 29, 2007
INVENTOR(S) : Martin Paul Tlaskal et al.

It is certified that error appears in the above-identified patent and that said Letters Patent is hereby corrected as shown below:

COLUMN 38

Line 24, "cols" should read --col--.

COLUMN 39

Line 22, "to;" should read --to--;
Line 33, "protocols" should read --protocol--; and
Line 42, "identifiers" should read --identify--.

Signed and Sealed this

Seventeenth Day of June, 2008

JON W. DUDAS
*Director of the United States Patent and Trademark Office*